(12) United States Patent
Shinohara et al.

(10) Patent No.: US 7,477,454 B2
(45) Date of Patent: Jan. 13, 2009

(54) DIGITAL CAMERA AND MOBILE INFORMATION TERMINAL APPARATUS

(75) Inventors: Junichi Shinohara, Yokohama (JP); Tohru Yamano, Yokohama (JP); Terunori Koyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/377,337

(22) Filed: Mar. 17, 2006

(65) Prior Publication Data

US 2006/0209192 A1 Sep. 21, 2006

(30) Foreign Application Priority Data

Mar. 17, 2005 (JP) .............................. 2005-077611

(51) Int. Cl.
*G02B 15/02* (2006.01)
*G02B 15/14* (2006.01)
(52) U.S. Cl. ........................ 359/676; 359/672; 359/691; 359/694; 359/699
(58) Field of Classification Search ................. 359/694, 359/363, 432, 503, 504, 506, 642, 672–677, 359/683–706, 771–797, 823–830; 396/72, 396/73, 75–77, 79–89, 103, 121, 130–133, 396/139
See application file for complete search history.

(56) References Cited

U.S. PATENT DOCUMENTS

| | | | | |
|---|---|---|---|---|
| 3,784,285 A * | 1/1974 | Watanabe et al. | ............ | 359/706 |
| 5,631,777 A * | 5/1997 | Mori | ............................ | 359/717 |
| 5,634,144 A * | 5/1997 | Mauro et al. | ................... | 396/57 |
| 6,594,450 B1 * | 7/2003 | Kao | ............................. | 396/133 |
| 6,825,991 B2 * | 11/2004 | Takanashi et al. | ............ | 359/696 |
| 7,097,367 B2 * | 8/2006 | Nomura | ....................... | 396/349 |
| 2004/0004664 A1 * | 1/2004 | Safai | ...................... | 348/231.99 |
| 2004/0229646 A1 * | 11/2004 | Cho | ......................... | 455/556.1 |
| 2005/0185950 A1 * | 8/2005 | Omiya et al. | ................ | 396/349 |
| 2005/0254140 A1 * | 11/2005 | Sakamoto | .................... | 359/695 |

FOREIGN PATENT DOCUMENTS

| | | |
|---|---|---|
| JP | 2003-149723 | 5/2003 |
| JP | 2003-315861 | 11/2003 |
| JP | 2005-044909 | 2/2005 |
| JP | 2006-330657 | 12/2006 |

\* cited by examiner

*Primary Examiner*—Ricky L Mack
*Assistant Examiner*—Brandi N Thomas
(74) *Attorney, Agent, or Firm*—Oblon, Spivak, McClelland, Maier & Neustadt, P.C.

(57) ABSTRACT

A digital camera and a mobile information terminal apparatus including a lens barrel including a first lens group and a second lens group disposed on an optical axis and configured to be related to operations concerned with changing overall relative magnification, a third lens group disposed on the optical axis and configured to be related to operations concerned with changing overall relative magnification and to be retracted from the optical axis in a collapsed state, a first driving device configured to drive the first lens group and the second lens group, a second driving device configured to drive the third lens group, a CCD disposed on the optical axis and configured to photograph a subject, a distance determining device configured to determine a distance to the subject, and a floating control device configured to drive at least one of the first driving device and the second driving device based on distance information obtained from the distance determining device to change an interval between the first lens group and the second lens group to provide an image quality balance between different parts of the image.

14 Claims, 40 Drawing Sheets

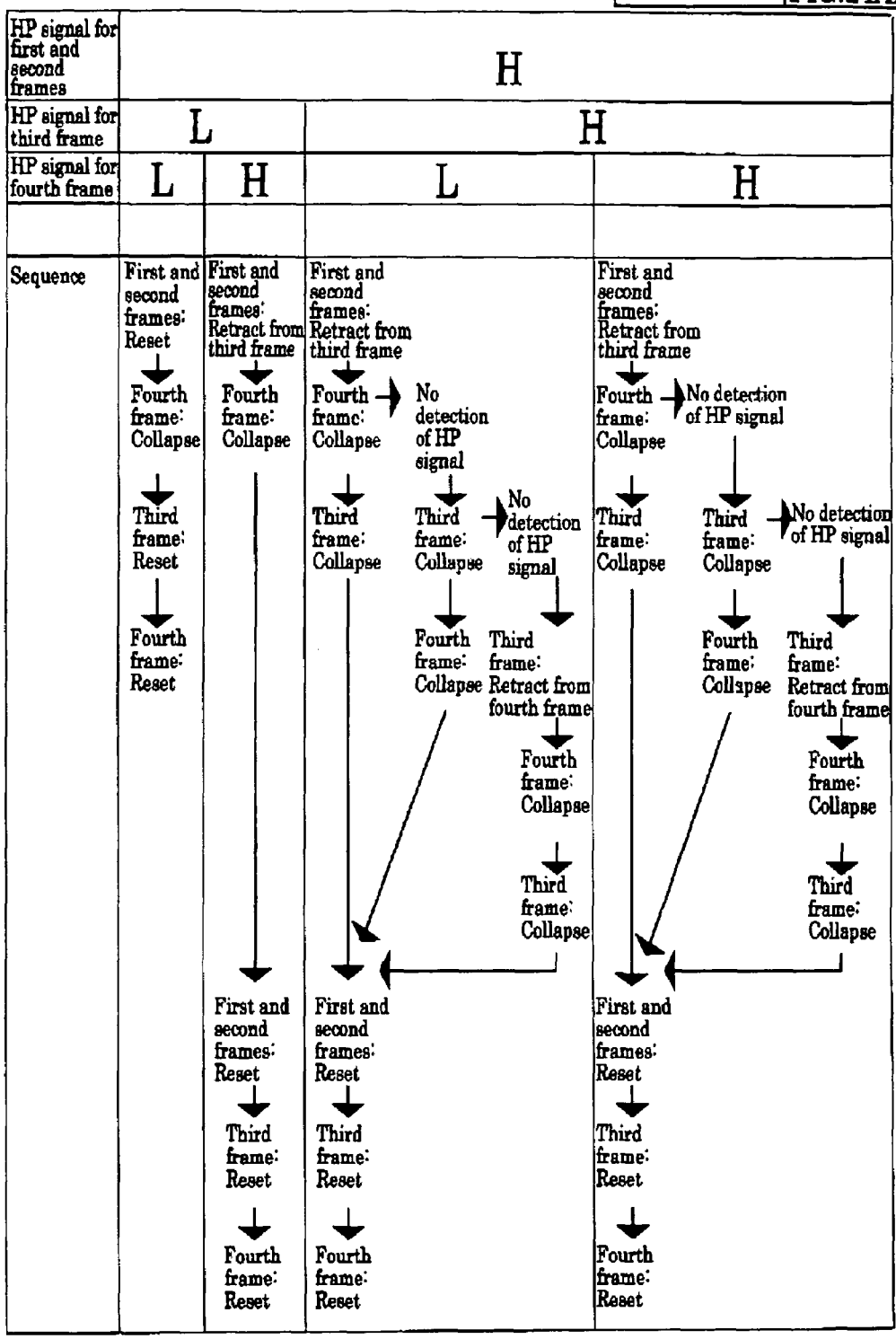
FIG.24A1     FIG.24A [FIG.24A1 / FIG.24A2]

FIG.24A2
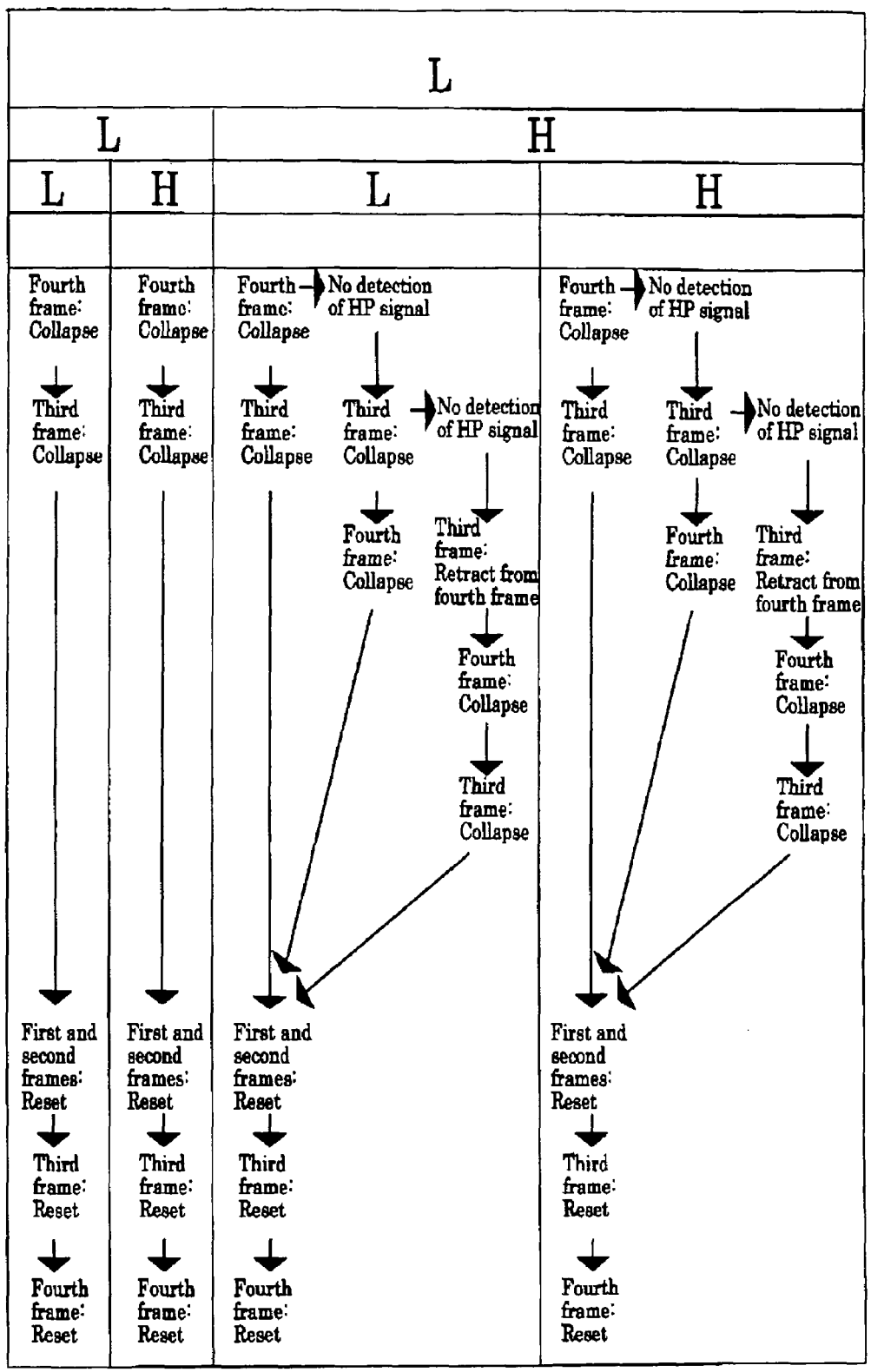

Tele ∞ (Without floating control)

Tele 1m (Without floating control)

Tele 30cm

Tele 10cm

DIGITAL CAMERA AND MOBILE INFORMATION TERMINAL APPARATUS

CROSS-REFERENCE TO THE RELATED APPLICATION

The present application claims the priority benefit of Japanese Patent Application 2005-077611 filed on Mar. 17, 2005, the contents of which are incorporated herein by reference.

BACKGROUND OF THE INVENTION

1. Field of the Invention

The present invention relates to a digital camera including a lens barrel capable of retracting at least one of a plurality of lens groups out of an optical axis when the lens barrel is in a collapsed position, and a mobile information terminal apparatus using the digital camera.

2. Description of Related Art

A high performance imaging device, such as a digital camera, is often provided with a lens barrel having a zoom lens function capable of changing a focal distance. Such imaging devices can be made more compact when they have a collapsible lens barrel in which a plurality of lens groups can be collapsed when not in use for making a photograph. Furthermore, because of the demand for such compact imagine devices having a greatly reduced thickness, it is important to reduce the thickness of the lens barrel in collapsed condition to the maximum extent possible.

As a technology to cope with the demand for reduction in thickness of the lens barrel, there has been used a collapsible lens barrel in which a lens frame retaining therein a plurality of lens groups is collapsed into the imaging device when not in use, and one of the lens groups is retracted out of an optical axis of the lens groups when the lens groups are collapsed. A technology for retracting one of lens groups out of an optical axis is disclosed in, for example, JP No. 2003-315861 A (Patent Document 1) and JP No. 2003-149723 A (Patent Document 2). According to the structures disclosed in these Patent Documents 1 and 2, since one of a plurality of lens groups disposed on the optical axis is retracted out of the optical axis when the lens groups are collapsed, the entire dimension of the lens barrel in a direction of the optical axis can be reduced.

However, in the structures disclosed in Patent Documents 1 and 2 as described above, the lens retracted out of the optical axis is substantially positioned within a collapsible lens frame provided in the lens barrel to retain therein the lens groups, even after the lens is retracted. Therefore, a space sufficient to contain the retracted lens must be provided in the lens frame. Providing such space in the lens frame results in a larger diameter of the lens frame, eventually a larger size of the lens barrel within a plane transverse to the optical axis. Accordingly, there is a problem that the conventional lens barrel has a large diameter by provision of the space containing the retracted lens in the lens barrel.

Therefore the inventors of this application disclosed formally in JP No. 2006-330657A (Patent Document 3, Referring to Specification and FIGS.) a lens barrel that reduces thickness of the imaging device without enlarging the size of it. The lens barrel disclosed in the Patent Document 3 includes a first lens group, a second lens group, a third lens group and a fourth lens group disposed in a sequence from a subject side to an image side wherein each is retained in a frame respectively. In particular, the third lens group is configured as that it is restrained in a retractable frame rotatable around a main-guide shaft member parallel to the optical axis in such a way that the third lens group is retracted out of the optical axis where the other lens groups (the first, second and third lens group) are positioned in a collapsed position. Moreover, the retractable frame is biased by a compression torsion spring provided on a main-guide shaft with a rotation biasing force to move it toward the optical axis where the other lens groups are positioned and a biasing force to move it along the main-guide shaft toward the collapsed position.

In photographing, an axial position of the lens group retained in the retractable frame is determined by a contact of the retractable frame biased by the rotation biasing force of the spring to a sub-guide shaft member with a guide function along the optical axis of the other lens groups. In collapsing, the retractable frame is rotated around the main-guide shaft against the rotation biasing force of the spring to be retracted out of a maximum diameter of the lens barrel. As a result, comparing with that a retracted position of the conventional retractable lens groups is within the maximum diameter of the lens barrel, it is possible to inhibit diameter-increasing of the lens barrel.

SUMMARY OF THE INVENTION

For a general zoom lens, photographing is performed after a zoom system is driven by its driving system to change magnification and focus is made when the zoom system is in a fixed state. In other words, as a zoom position is fixed, image optimization is depended only on a focus lens group.

However, in recent years possible photographing range of a digital camera is becoming wider. This change creates a problem as to an image quality balance between a central part and the surroundings of an image that is known to the skilled artisan as the modulation transfer function (MTF) which describes the ability of a lens or lens system to transfer object contrast to the image. In this regard, a lens or lens system can be considered to be a transfer system for optical signals much the same as the standard electrical engineering convention relating a degree of modulation of an output signal to a function of the signal frequency. This problem as to an image quality balance between a central part and the surroundings of an image (MTF), or an image quality balance between a radial direction and a concentric direction (MTF) is used to evaluate how well optical signals are transferred. A subtle loss of this image quality balance (MTF) can occur even though the image is optimally focused if only the focus lens group is used.

An object of the present invention is to provide a digital camera capable of perfectly maintaining an image quality balance between a central part and the surroundings of an image, or an image quality balance between a radical direction and a concentric direction, and a mobile information terminal device having such digital camera.

To achieve the above object, a digital camera according to one embodiment of the present invention includes a first lens group disposed on an optical axis and configured to be related to operations on changing magnification, a second lens group disposed on the optical axis and configured to be related to operations on changing magnification and being retracted from the optical axis when a lens barrel is at a collapsed position, a first driving device configured to drive the first lens group, a second driving device configured to drive the second lens group, a photographing device disposed on the optical axis and configured to photograph a subject, a distance determining device configured to determine a distance to the subject, and a floating control device configured to drive at least one of the first driving device and the second driving device based on distance information obtained from the distance determining device to change an interval between the first lens group and the second lens group.

BRIEF DESCRIPTION OF THE DRAWINGS

FIG. 24A is a table showing a reset sequence of the lens barrel.

DETAILED DESCRIPTION OF THE PREFERRED EMBODIMENTS

Hereinafter, modes for the present invention will be described in detail with reference to the drawings.

Embodiment 1

FIGS. 1 to 16 and 20 illustrate configurations of main parts of an optical system device having a lens barrel and various operations.

Figure 1:
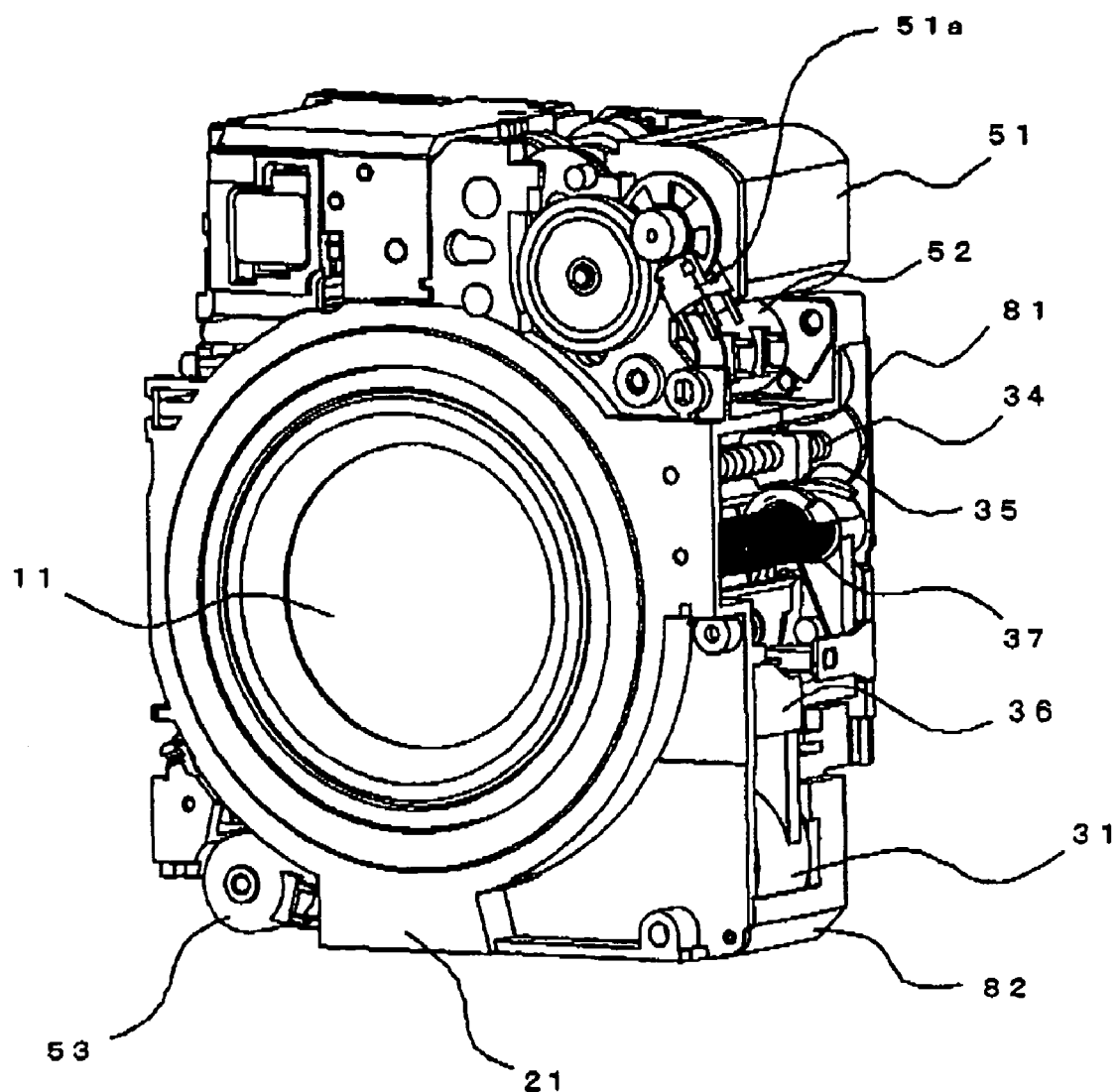
FIG. 1 is a perspective view showing a structure of a main part of an optical system device including a lens barrel with lens groups collapsed, as view from a subject.

FIG. 1 shows a structure of a main part of an optical system device including a lens barrel with lens groups collapsed, as view from a subject.

Figure 2:
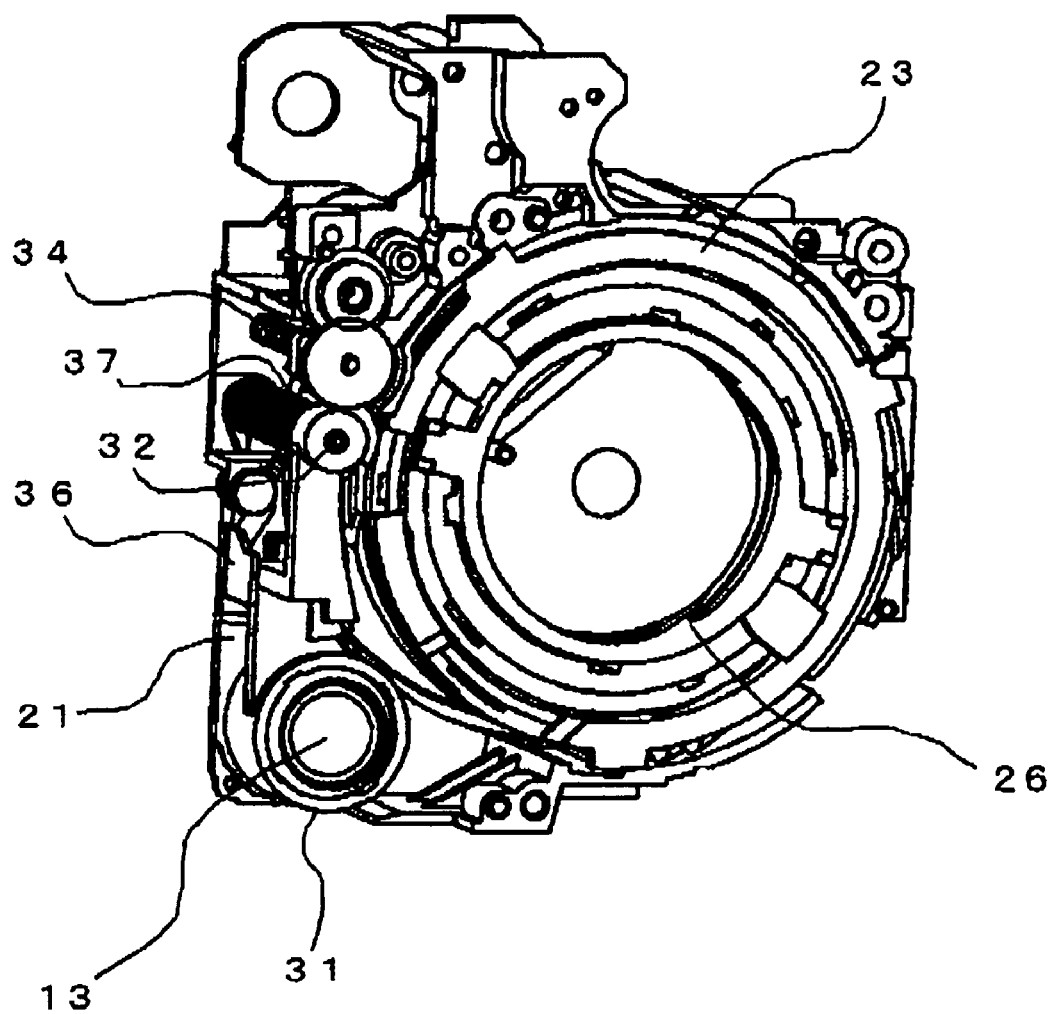
FIG. 2 is a perspective view showing the main part of the lens barrel shown in FIG. 1, as viewed from an imaging plane.

FIG. 2 shows the main part of the lens barrel shown in FIG. 1, as viewed from an imaging plane.

Figure 3:
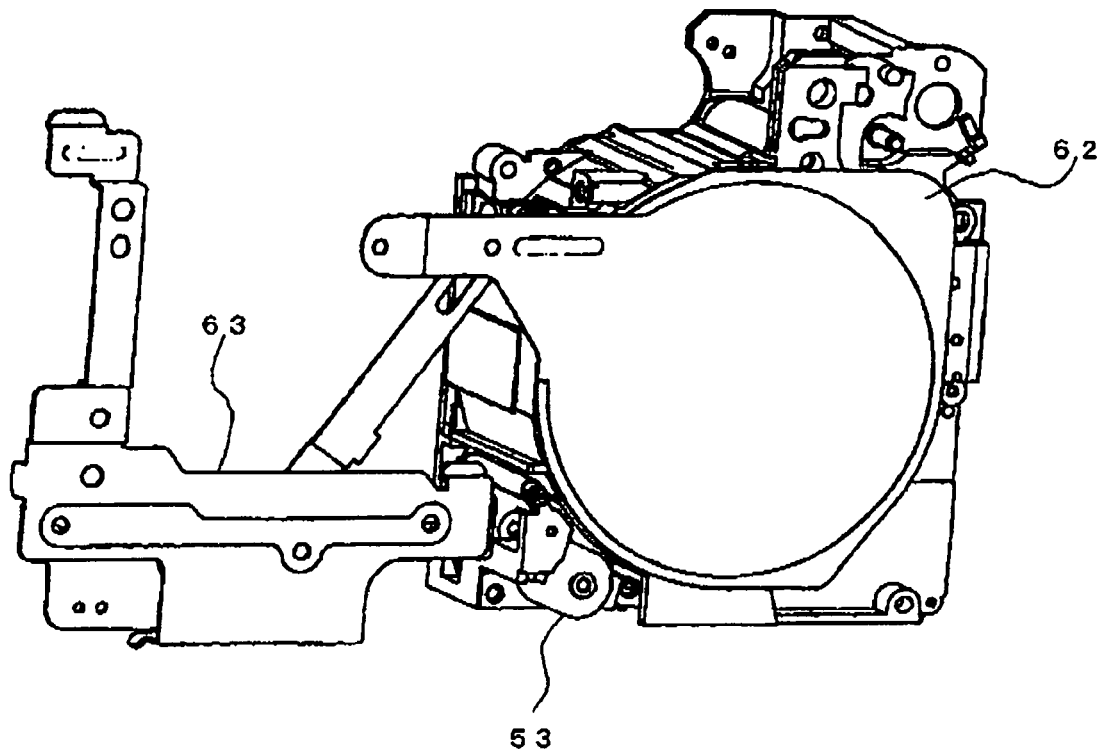
FIG. 3 is a schematic perspective view showing a structure of a main part of the optical system device including the lens barrel in which a lens barrier is closed, as viewed from the subject.

FIG. 3 shows a structure of a main part of the optical system device including the lens barrel in which a lens barrier is closed, as viewed from the subject.

Figure 4:
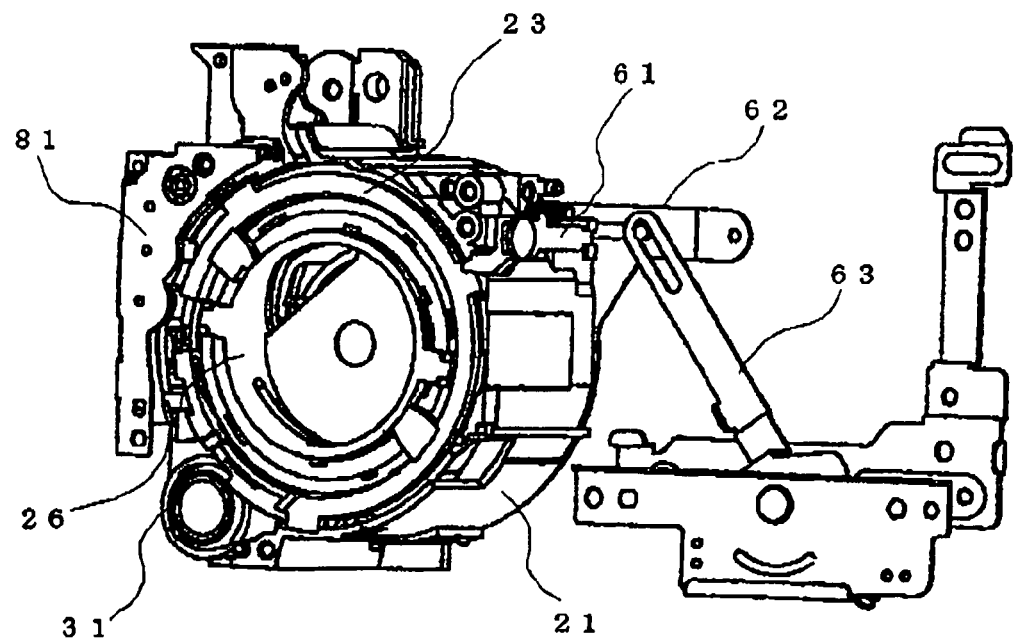
FIG. 4 is a schematic perspective view showing the structure of the main part of the lens barrel shown in FIG. 3, as viewed from the imaging plane.

FIG. 4 shows the structure of the main part of the lens barrel shown in FIG. 3, as viewed from the imaging plane.

Figure 5:
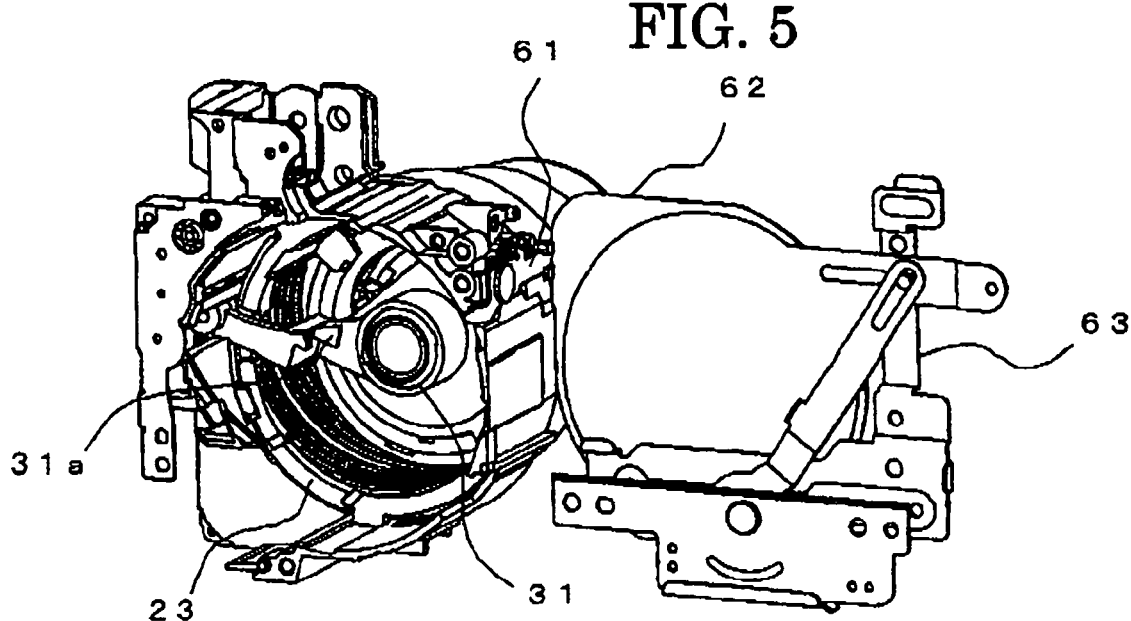
FIG. 5 is a schematic perspective view of the structure of the main part of the lens barrel in a state in which the lens barrier is opened in a photographing state with the lens groups extended, as viewed from the imaging plane.

FIG. 5 shows the structure of the main part of the lens barrel in a state in which the lens barrier is opened in a photographing state with the lens groups extended, as viewed from the imaging plane.

Figure 6:
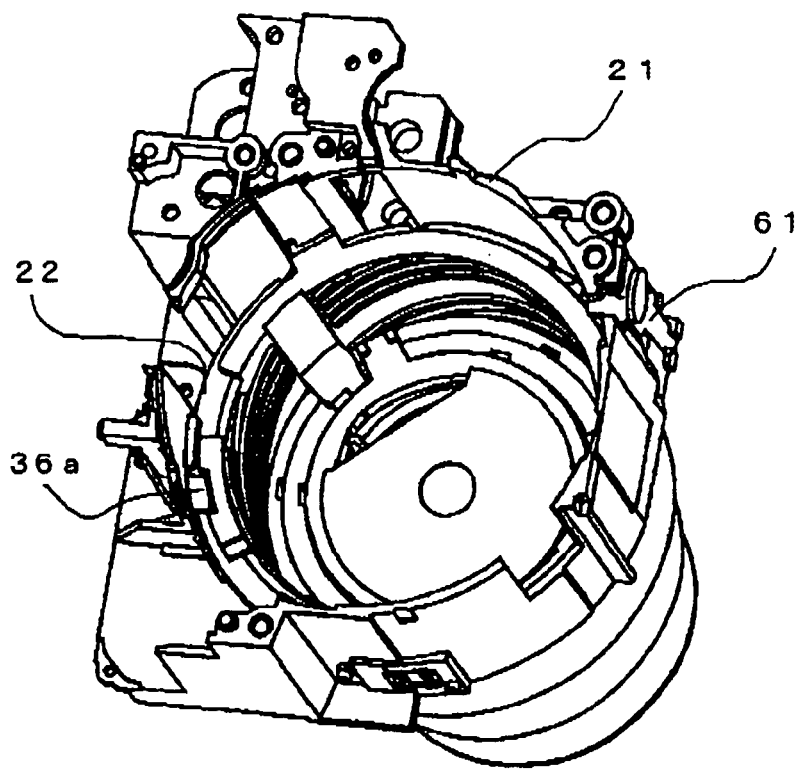
FIG. 6 is a perspective view of the structure of the main part of the lens barrel in the photographing state with the lens groups extended, as viewed from the imaging plane.

FIG. 6 shows the structure of the main part of the lens barrel in the photographing state with the lens groups extended, as viewed from the imaging plane.

Figure 7:
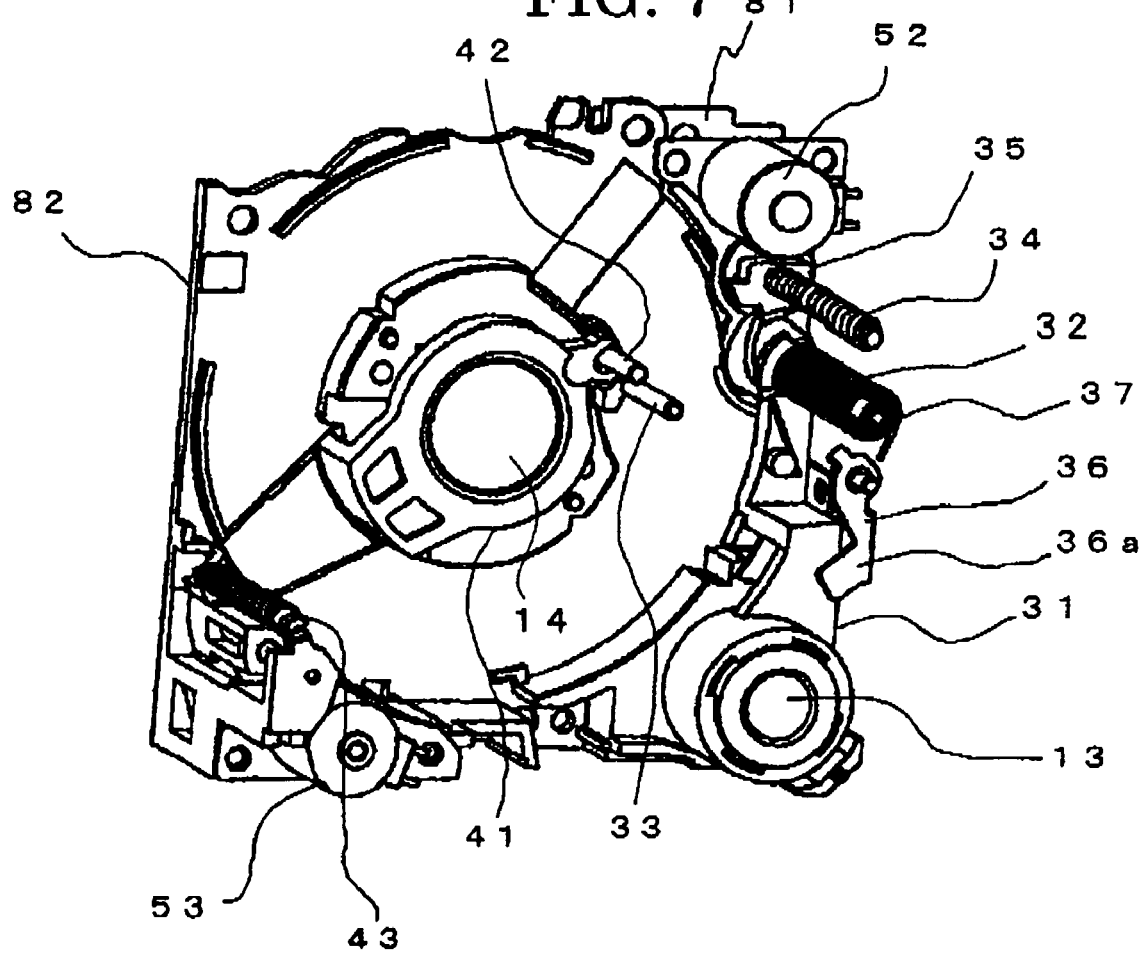
FIG. 7 is a perspective view of a layout of a third frame, an impact preventing strip, and a fourth frame in a state in which the lens groups are in a collapsed position, for explaining operations of the third frame which retains the third lens group and the impact preventing strip, as viewed from the subject.

FIG. 7 shows a layout of a third frame, an impact preventing strip, and a fourth frame in a state in which the lens groups are in a collapsed position, for explaining operations of the third frame which retains the third lens group and the impact preventing strip, as viewed from the subject.

Figure 8:
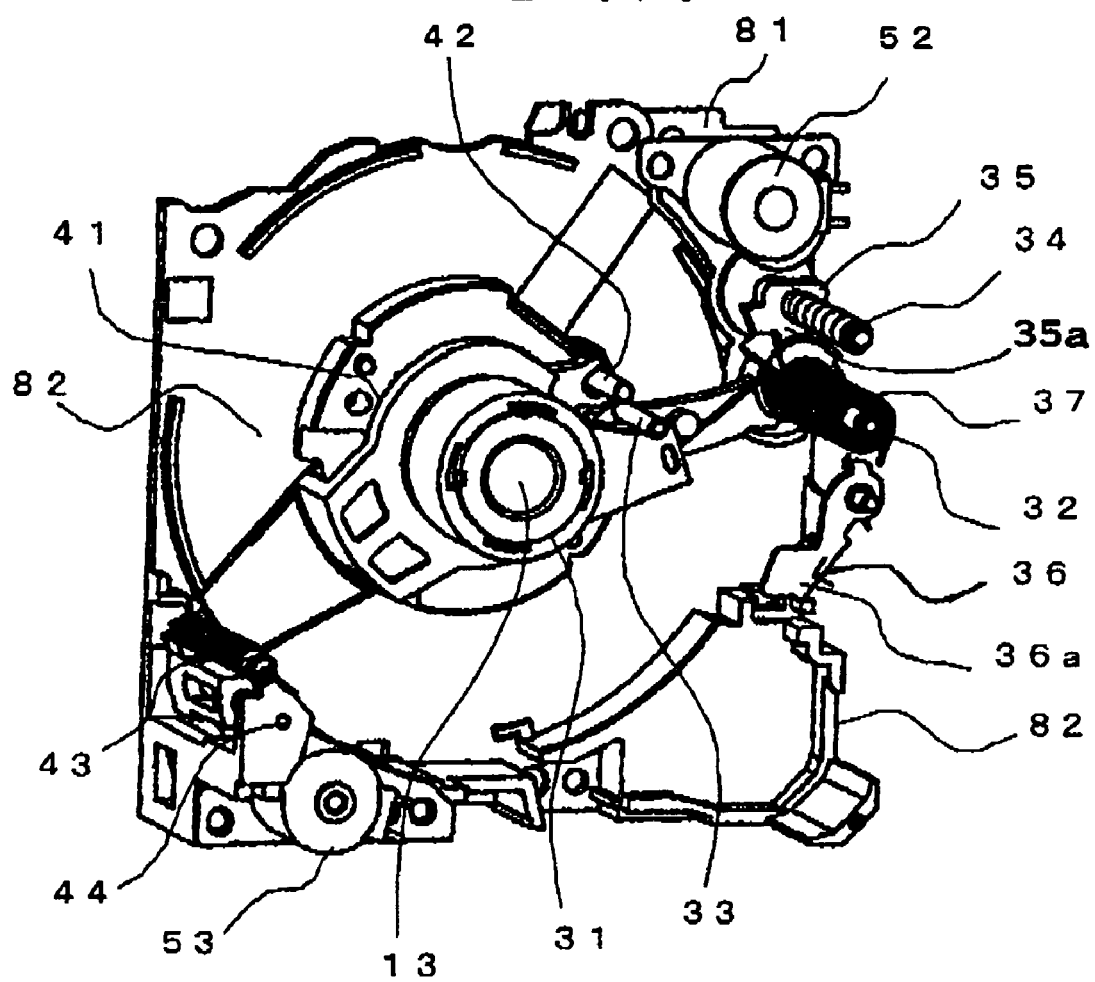
FIG. 8 is a perspective view of a layout of the third frame, the impact preventing strip, and the fourth frame for explaining operations of the third frame, which retains the third lens group, and the impact-preventing strip in the photographing state with the lens groups projected, as viewed from the subject side.

FIG. 8 shows a layout of the third frame, the impact preventing strip, and the fourth frame for explaining operations of the third frame, which retains the third lens group, and the impact-preventing strip in the photographing state with the lens groups projected, as viewed from the subject side.

Figure 9A:
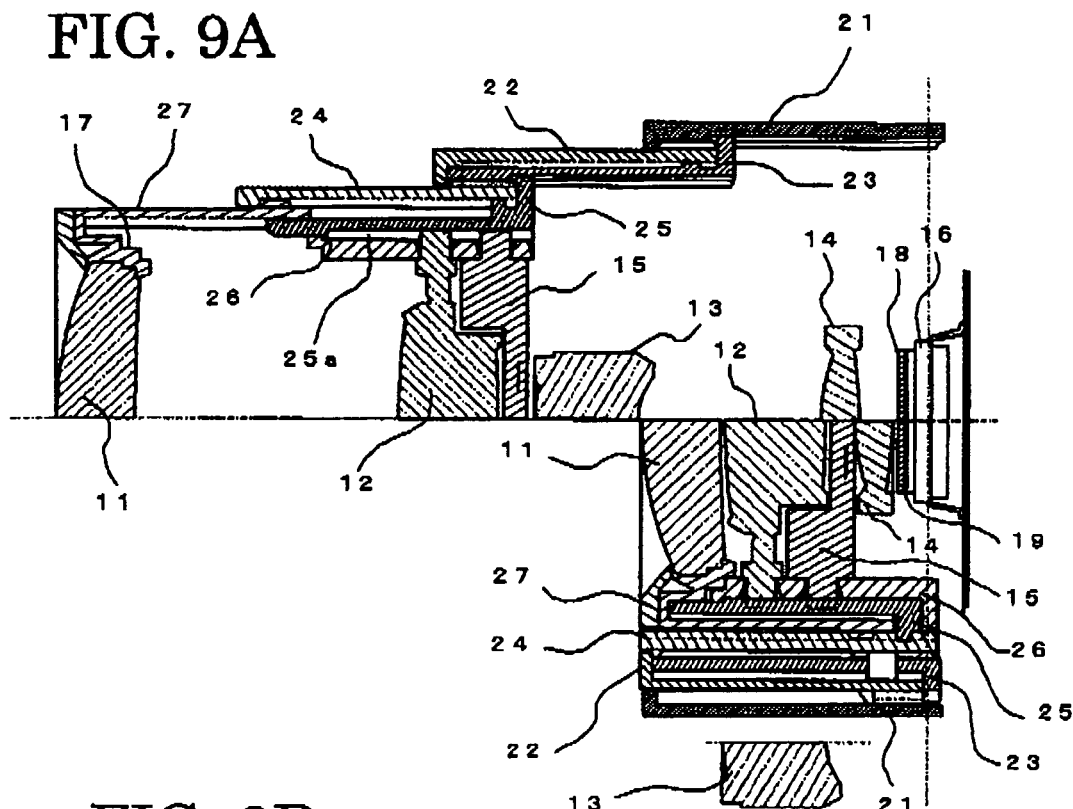
FIG. 9A is a vertical cross sectional view showing each of the lens groups, the lens retaining frames, and various main parts of the lens barrel in the photographing state in which the lens groups are extended in a telephoto state and in a collapsed state.

FIG. 9A shows each of the lens groups, the lens retaining frames, and various main parts of the lens barrel in the photographing state in which the lens groups are extended in a telephoto state and in a collapsed state.

Figure 9B:
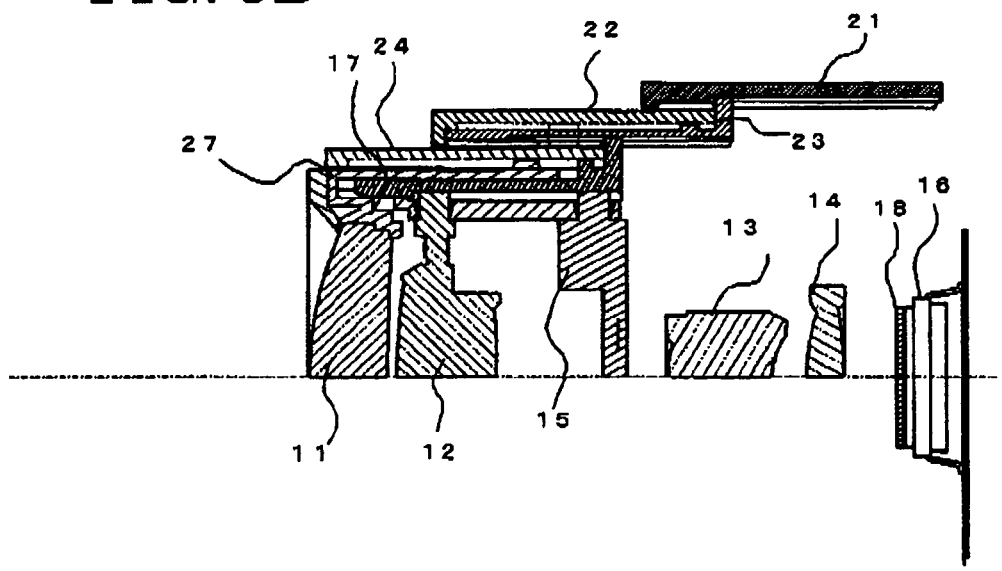
FIG. 9B is a vertical cross sectional view showing each of the lens groups, the lens retaining frames, and various main parts of the lens barrel in the photographing state in which the lens groups are extended in a wide-angle state.

FIG. 9B shows each of the lens groups, the lens retaining frames, and various main parts of the lens barrel in the photographing state in which the lens groups are extended in a wide-angle state.

Figure 10:
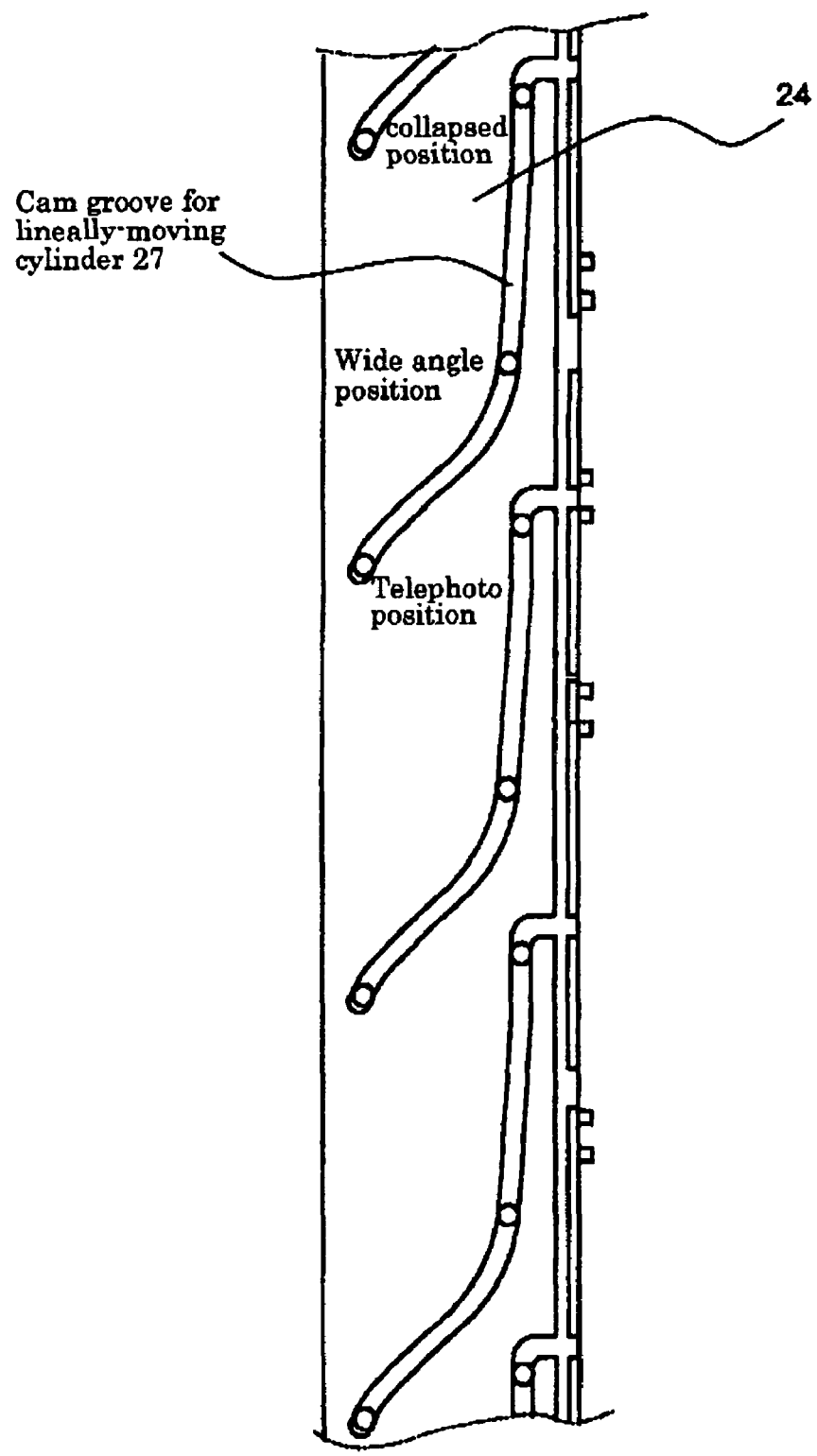
FIG. 10 is a schematic development view showing a shape of cam grooves formed on a second rotary frame in a developed state.

FIG. 10 shows a shape of cam grooves formed on a second rotary frame in a developed state.

Figure 11:
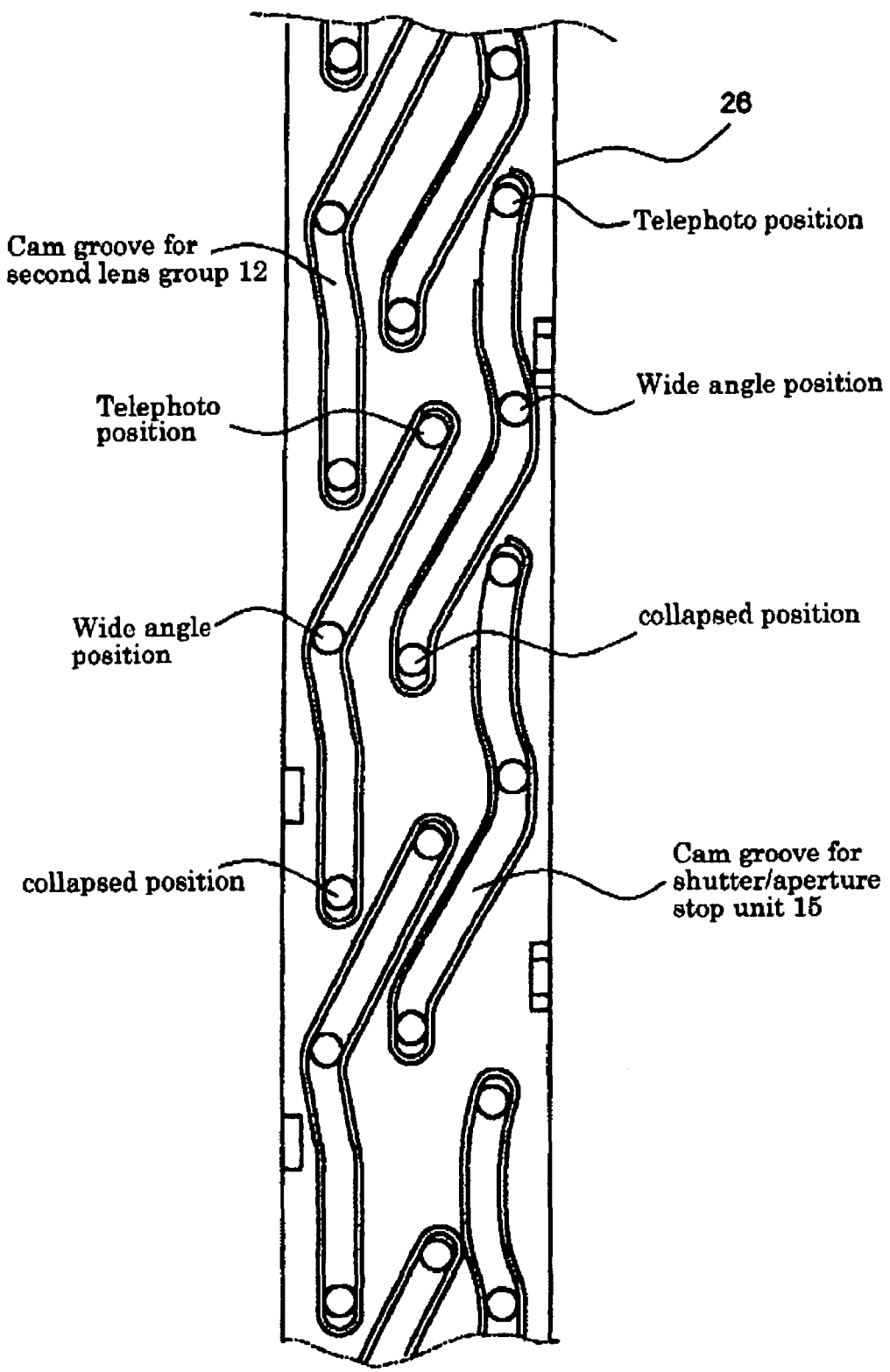
FIG. 11 is a schematic development view showing a shape of cam grooves formed on a cam cylinder in a developed state.

FIG. 11 shows a shape of cam grooves formed on a cam cylinder in a developed state.

Figure 12:
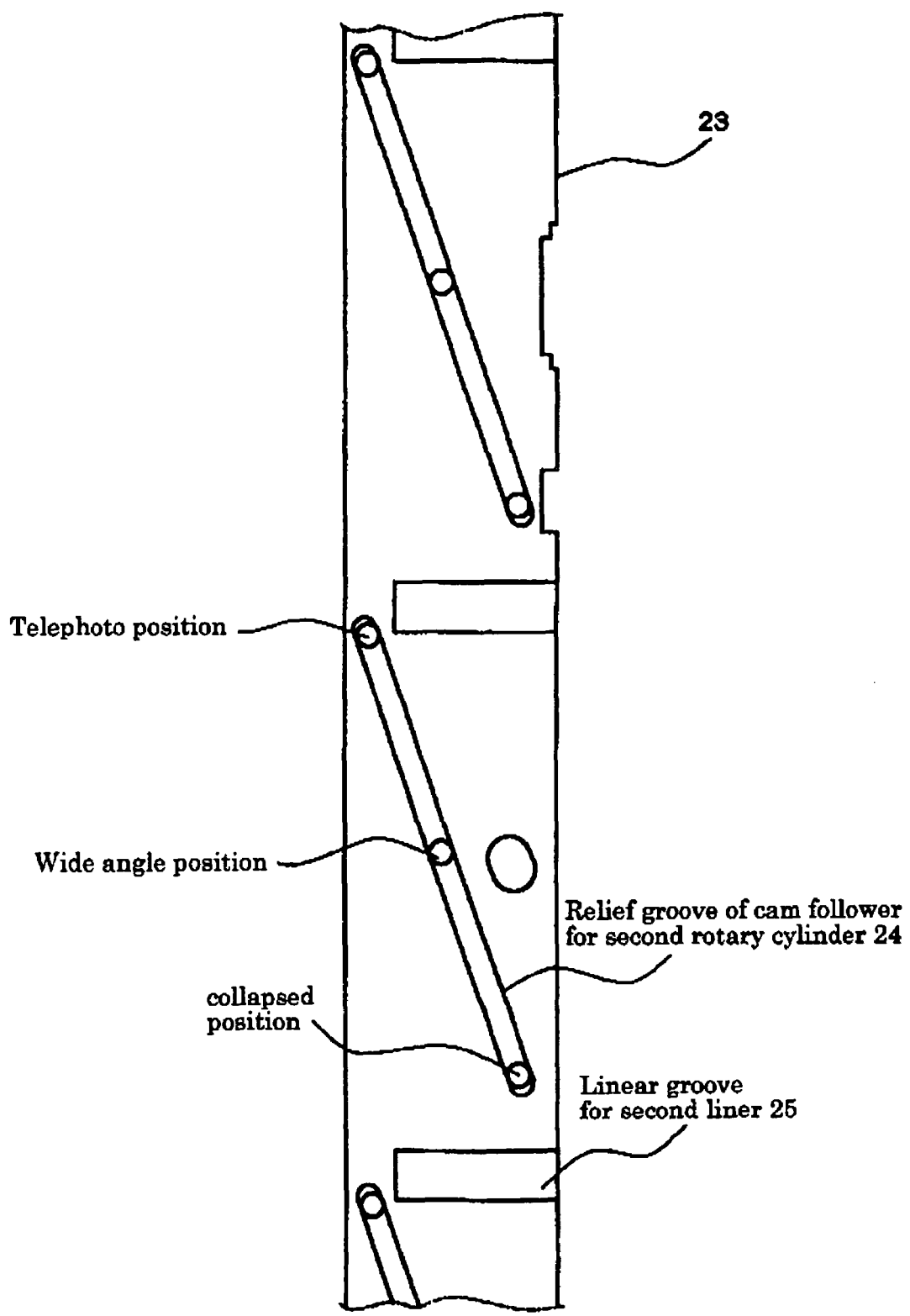
FIG. 12 is a schematic development view showing a shape of cam grooves and key grooves formed on a first liner in a developed state with helicoids omitted.

FIG. 12 shows a shape of cam grooves and key grooves formed on a first liner in a developed state with helicoids omitted.

Figure 13A:
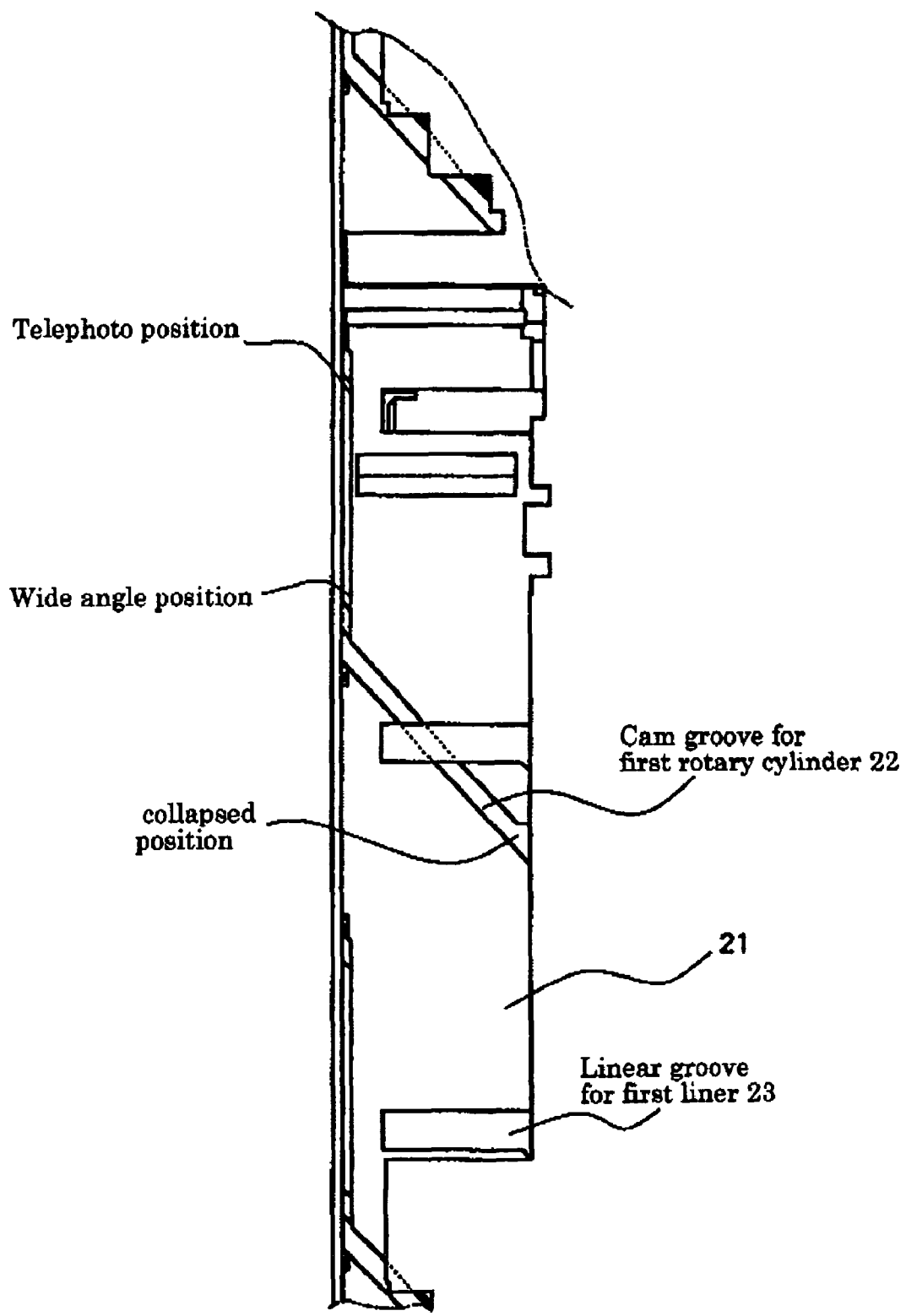
FIG. 13A is a schematic development view showing a shape of cam grooves and key grooves formed on a fixed frame in a developed state with the helicoids omitted.

FIG. 13A is a schematic development view showing a shape of cam grooves and key grooves formed on a fixed frame in a developed state with the helicoids omitted.

Figure 13B:
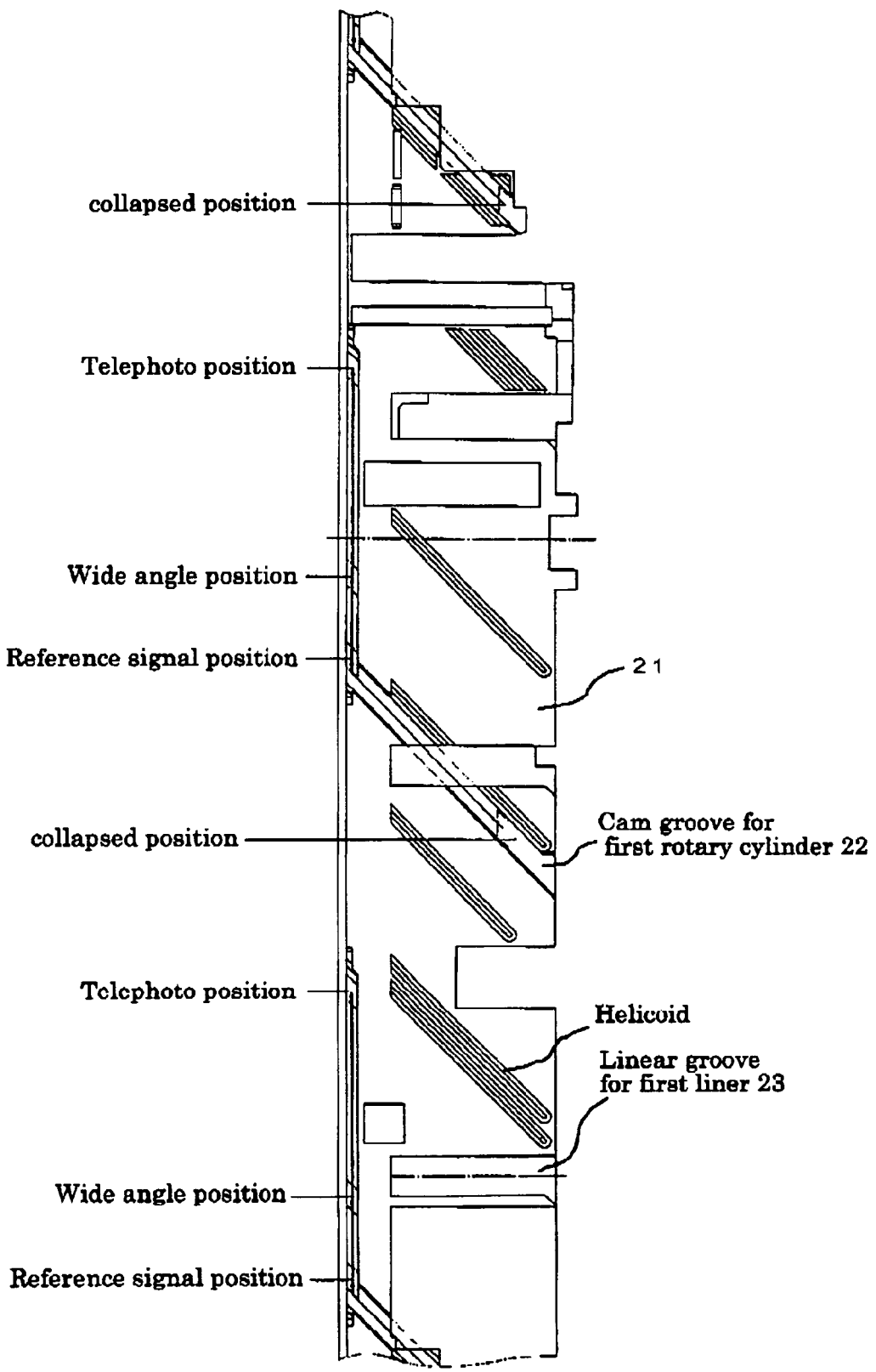
FIG. 13B is a detailed view with the helicoids included.

FIG. 13B is a detailed view with the helicoids included.

Figure 13C:
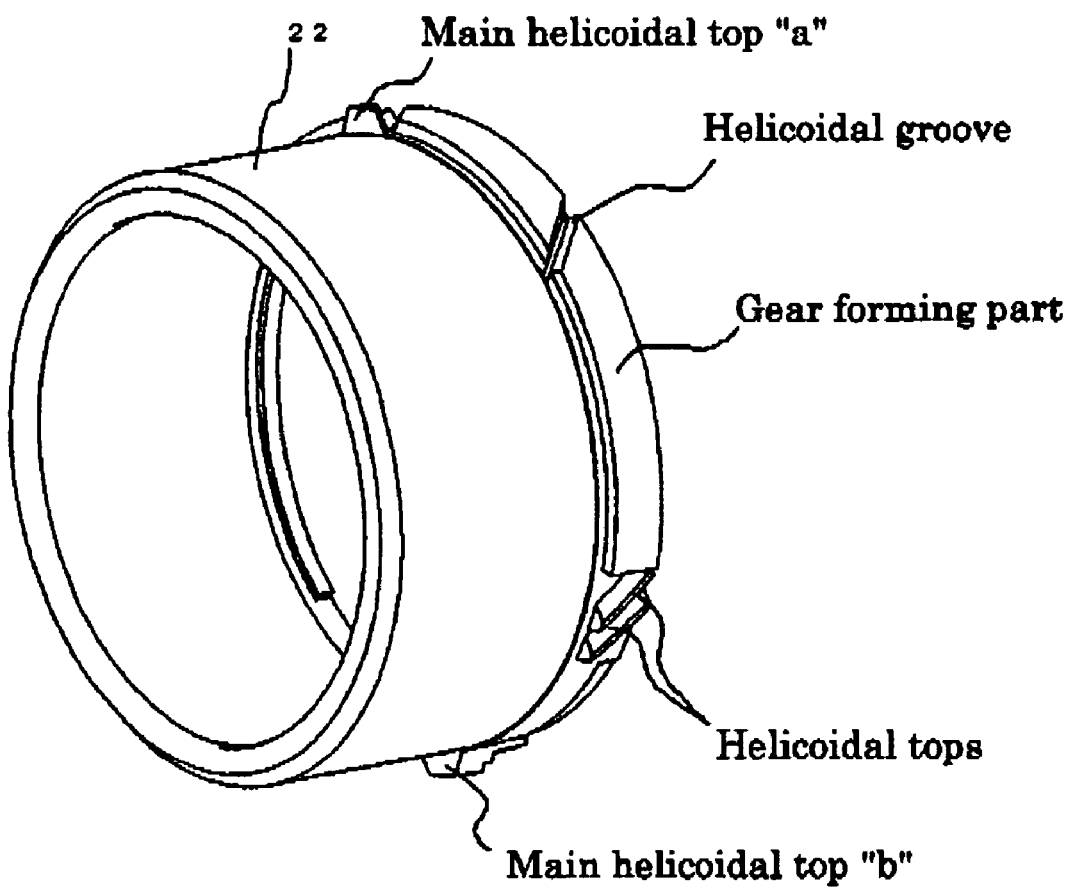
FIG. 13C is a perspective view showing a first rotary cylinder embedded in the helicoids.

FIG. 13C is a perspective view showing a first rotary cylinder embedded in the helicoids.

Figure 14A:
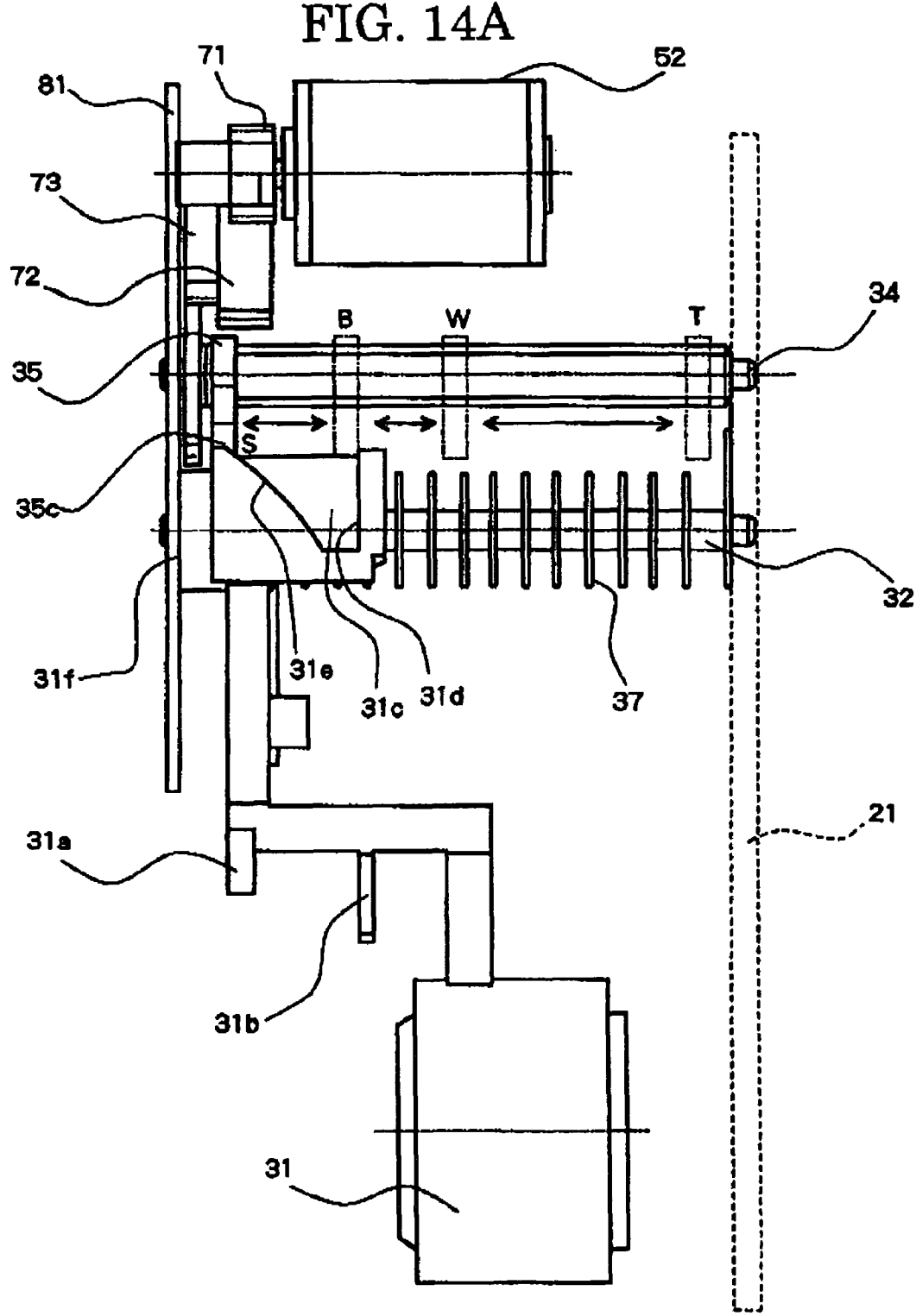
FIG. 14A is a side view showing a structure of the third frame and its driving system.

FIG. 14A shows a structure of the third frame and its driving system.

Figure 14B:
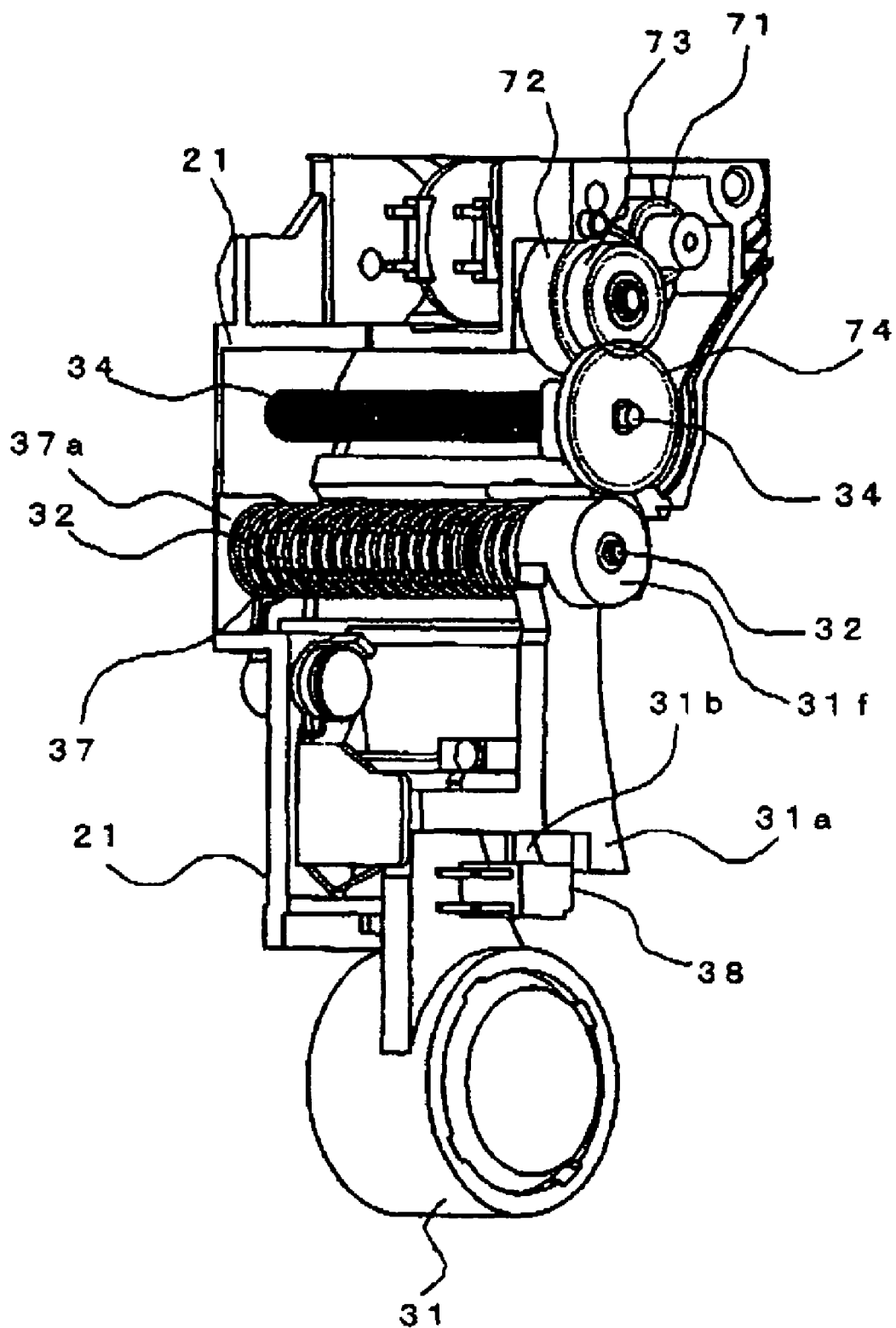
FIG. 14B is a perspective view of that in FIG. 14A.

FIG. 14B is a perspective view of that in FIG. 14A.

Figure 15:
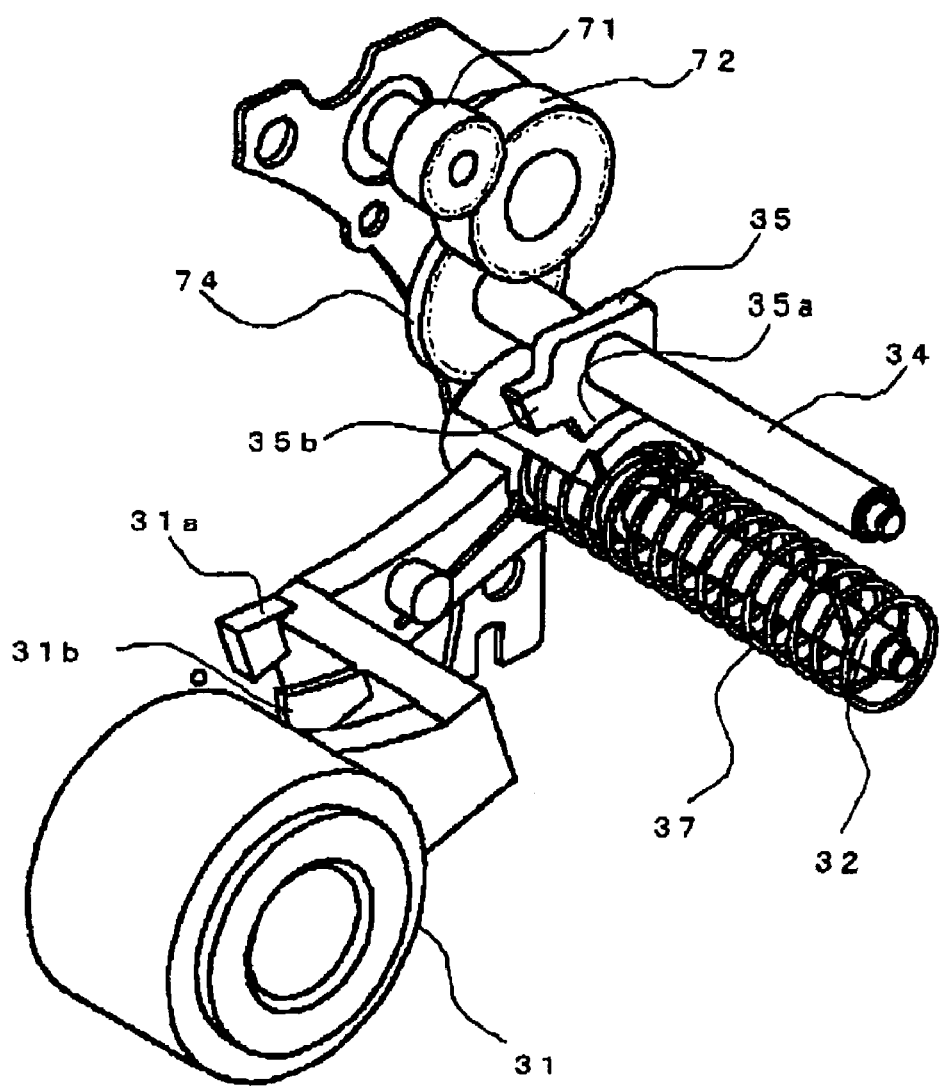
FIG. 15 is a perspective view showing the structure of the third frame and its driving system.

FIG. 15 shows the structure of the third frame and its driving system.

Figure 16A:
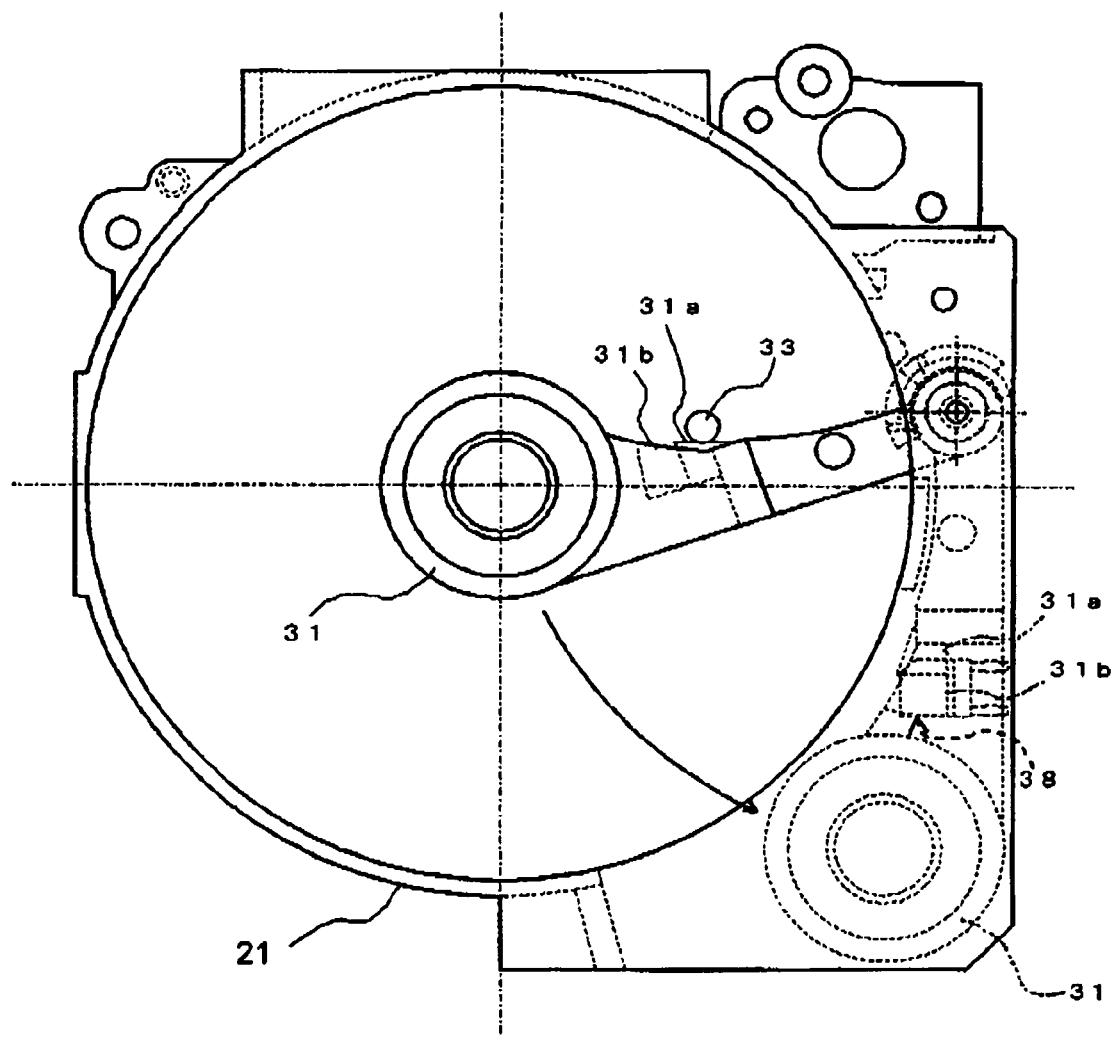
FIG. 16A is a back view of the third frame portion for explaining operation of the third frame, as viewed from the subject side.

FIG. 16A shows the third frame portion for explaining operation of the third frame, as viewed from the subject side.

Figure 16B:
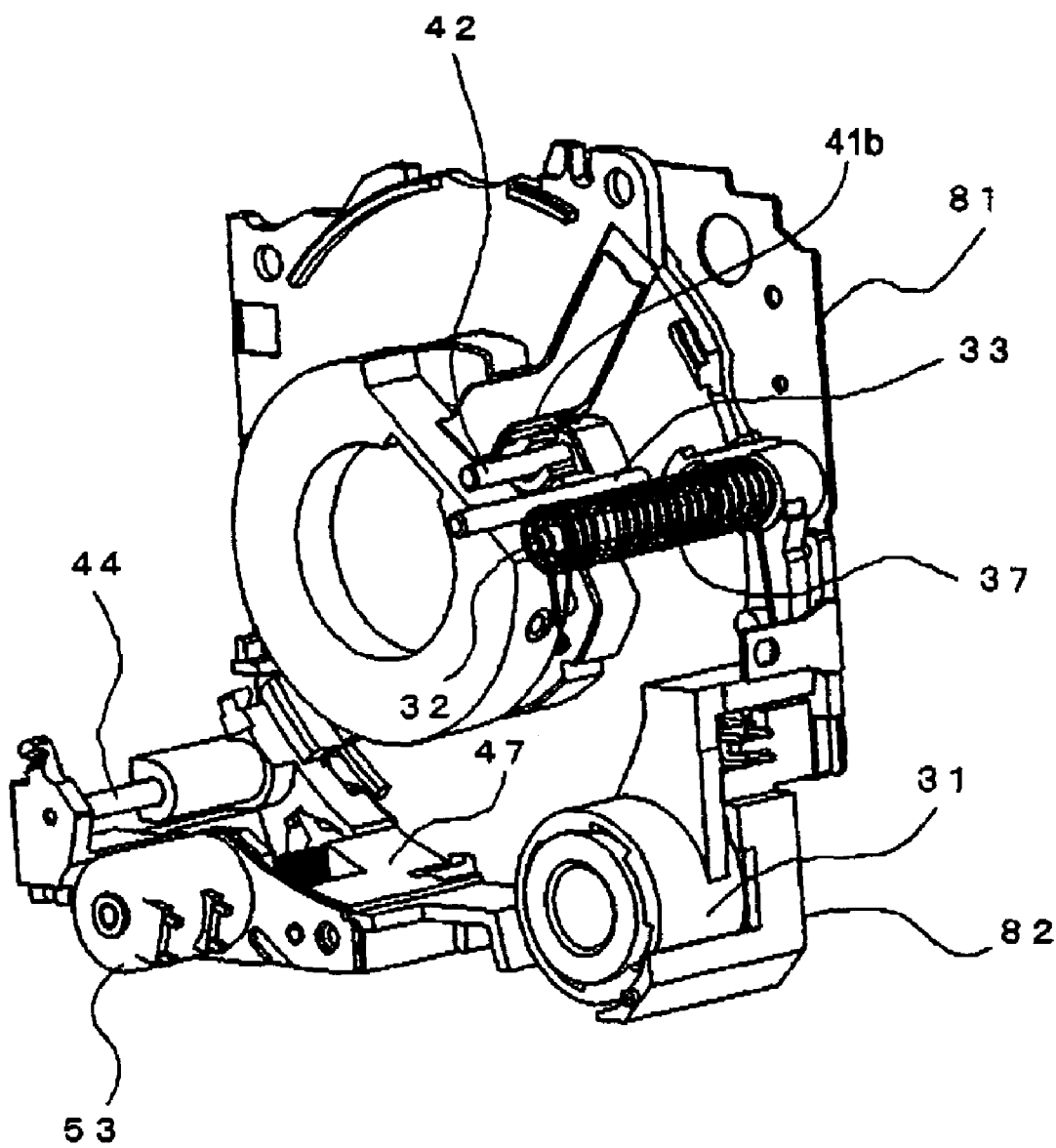
FIG. 16B is a perspective view of a shutter.

FIG. 16B is a perspective view of a shutter.

Figure 20A:
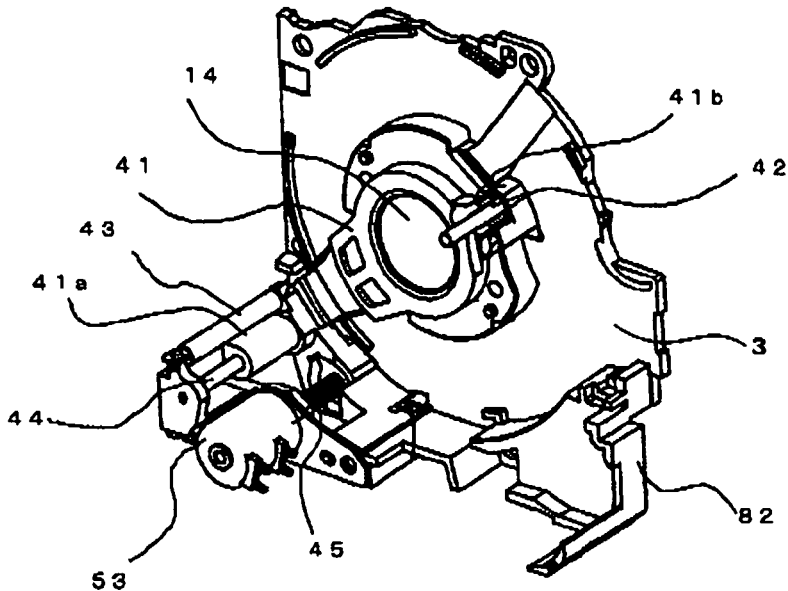
FIG. 20A is a perspective view showing the structure of the fourth frame and its driving system.

Furthermore,

FIG. 20A shows the structure of the fourth frame and its driving system and

Figure 20B:
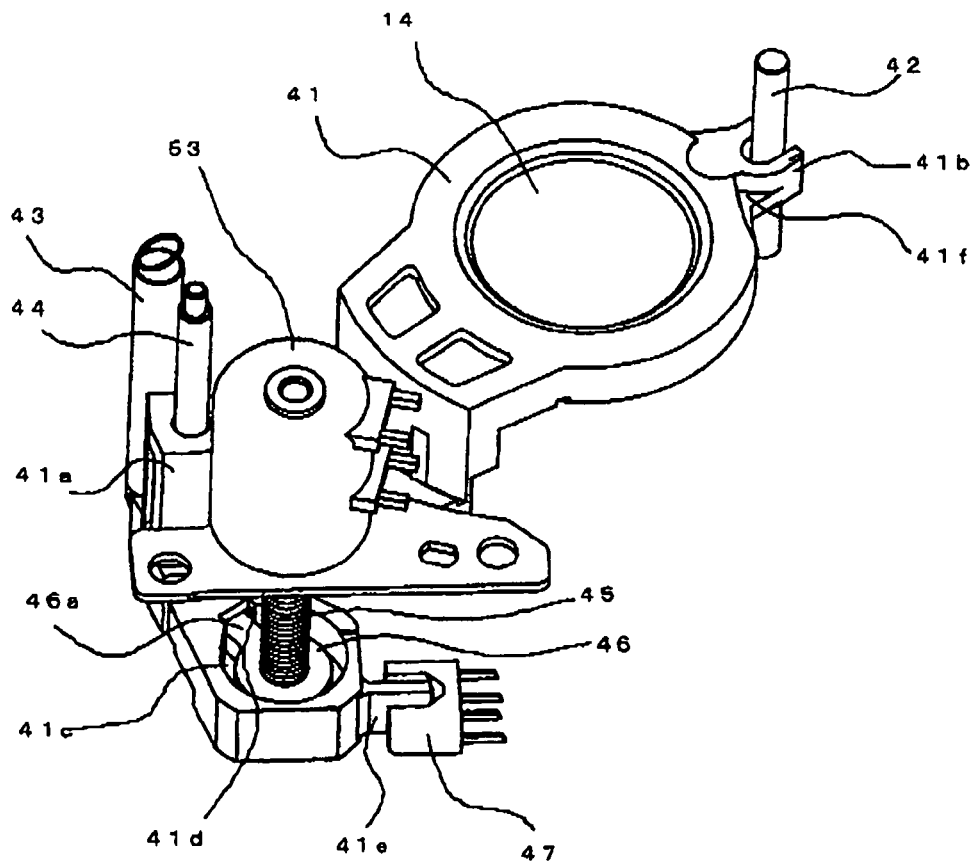
FIG. 20B is a perspective view of that in FIG. 20A with some parts omitted, viewed in a different angle.

FIG. 20B is a perspective view of that in

FIG. 20A with some parts omitted, viewed in a different angle.

As shown in FIGS. 1 to 16 and 20, the optical system device having the lens barrel includes a first lens group 11, a second lens group 12, a third lens group 13, a fourth lens group 14, shutter/aperture stop unit 15, a solid-state image-sensing device 16, a first frame 17, a cover glass 18, a low-pass filter 19, a fixed frame 21, a first rotary cylinder 22, a first liner 23, a second rotary cylinder 24, a second liner 25, a cam cylinder 26, a lineally-moving cylinder 27, a third frame 31, a third frame main-guide shaft 32, a third frame sub-guide shaft 33, a third frame lead screw 34, a third frame female screw member 35, an impact-preventing strip 36, a compression torsion spring 37, a third frame photo-interrupter 38 (See FIG. 14b and 16a), a fourth frame 41, a fourth frame sub-guide shaft 42, a fourth frame spring 43 (see FIGS. 7 and 8), a fourth frame main-guide shaft 44, a fourth frame lead screw 45, a fourth frame female screw member 46, a fourth frame photo-interrupter 47, a zoom motor 51 (See FIG. 1), a third frame driving motor 52, a fourth frame driving motor 53, a barrier control strip 61, a lens barrier 62, a barrier drive system 63, gears 71, 72, 73 and 74, a retainer plate 81 and a lens barrel base 82.

Referring to FIG. 9, the first lens group 11, the second lens group 12, the third lens group 13 and the fourth lens group 14 are sequentially disposed starting from the subject side. The shutter/aperture stop unit 15 is disposed between the second lens group 12 and the third lens group 13. The solid-state image-sensing device 16 comprising a CCD (charge-coupled device) or the like is disposed adjacent to the side of an image forming plane of the fourth lens group 14.

The first lens group 11, the second lens group 12, the third lens group 13 and the fourth lens group 14 constitute a zoom lens with a variable focus length. The first lens group 11 includes one lens or more and is fixed in the lineally-moving cylinder 27 through the first frame 17 which integrally retain the first lens group 11.

The second lens group 12 includes one lens or more. A cam follower formed on the second frame (not shown) for integrally retailing the second lens group 12 is inserted into a cam groove for the second lens group 12 formed on the cam cylinder 26 shown in FIG. 11, and engages with a linear groove 25a of the second liner 25, and the second lens group 12 is supported by the cam cylinder 26 and the second liner 25.

The shutter/aperture stop unit 15 includes a shutter and an aperture. A cam follower formed integrally with the shutter/aperture stop unit 15 is inserted into a cam groove for the shutter/aperture stop of the cam cylinder 26 shown in FIG. 11 and is engaged with the linear groove 25a on the second liner 25 so that the shutter/aperture stop unit is supported by the cam cylinder 26 and the second liner 25.

The fixed frame 21 includes a fixed cylinder having an inner surface which is formed with a linear groove and a helicoidal cam groove along an axial direction, as shown in FIGS. 13A and 13B.

A helicoidal cam follower formed on an outer peripheral surface of a base portion of the first rotary cylinder 22 engages with the helicoidal cam groove, as shown in FIG. 13C, and a key portion formed on an inner surface of a base portion of the first liner 23 engages with the linear groove of the fixed cylinder of the fixed frame 21.

An inner surface of the first rotary cylinder 22 is formed with a guide groove extending along a plane transverse to the optical axis. Engaged with the guide groove is a follower or key which is formed to project from the outer peripheral surface of the first liner 23 in the vicinity of the base portion thereof and acts as a linear member. An inner surface of the first liner 23 is formed with a linear groove along the optical axis and a helicoid, in addition, the first liner 23 is formed with a clearance groove in which a cam follower formed to project from an outer peripheral surface of a base portion of the second rotary cylinder 24 in the vicinity of the base portion is inserted.

A helicoid is formed on the outer peripheral surface of the base portion of the second rotary cylinder 24, and is engaged with the helicoid of the first liner 23.

A cam follower formed to project from the outer peripheral surface of the second rotary cylinder 24 in the vicinity of the base portion engages with the linear groove formed in the inner periphery of the first rotary cylinder 22 through the clearance groove of the cam follower on the first liner 23.

A key portion formed to project from the outer peripheral surface of the base portion of the second liner 25 engages with the linear groove provided on the inner peripheral surface of the first liner 23. An inner surface of the second rotary cylinder 24 is provided with a guide groove along a plane transverse to the optical axis, a follower or key provided to project from the outer peripheral surface of the second liner 25 is engaged in the guide groove of the second rotary cylinder 24.

With such a structure, the second liner 25 moves integrally with the second rotary cylinder 24 in the movement along the optical axis, while the second rotary cylinder 24 is rotatable relative to the second liner 25.

The cam cylinder 26 fitted to the inner periphery of the second liner 25 is configured in such a manner that an engaging projection formed on the outer peripheral surface of the base portion is fitted to and engaged with the base portion of the second rotary cylinder 24 so as to rotate integrally with the second rotary cylinder 24.

The inner surface of the second liner 25 is provided with a guide groove along a surface transverse to the optical axis, and a follower or key provided on the outer peripheral surface (front side) of the cam cylinder 26 engages with the cam groove.

With such a structure, the cam cylinder 26 moves with the second liner 25 in the movement along the optical axis, while is rotatable relative to the second liner 25.

The base portion of the lineally-moving cylinder 27 is inserted between the second rotary cylinder 24 and the second liner 25, and a cam follower is formed to project from the outer peripheral surface of the lineally-moving cylinder 27 in the vicinity of the base portion, and the cam follower engages with the cam groove formed in the inner peripheral surface of the second rotary cylinder 24.

A linear groove is formed on the inner peripheral surface of the lineally-moving cylinder 27 along the axial direction, and the key portion formed on the outer peripheral surface of the second liner 25 engages with the linear groove.

A gear portion is formed on the outer periphery of the base portion of the first rotary cylinder 22, the gear portion is engaged with one or more gears which are driven by a drive force from the zoom motor 51 which is transmitted to rotate the gear portion via appropriate gears, whereby the first lens group 11, the second lens group 12, and the shutter/aperture stop unit 15 are zoomed in a predetermined manner.

The clearance groove of the cam follower of the second rotary cylinder 24 on the first liner 23 and the linear groove on the first liner 23 which engages with the key groove on the second liner 25 are shown in FIG. 12.

The cam groove on the cam cylinder 26 which engages with the cam follower on a second frame of the second lens group 12 and the cam groove of the cam cylinder 26 which engages with the cam follower of the shutter/aperture stop unit 15 are shown in FIG. 11.

The clearance groove of the cam follower of the second rotary cylinder 24 on the first liner 23 and the linear groove on the first liner 23 which engages with the key groove on the second liner 25 are shown in FIG. 12.

A linear groove on the fixed frame 21 engaging with the key portion of the first liner 23 of the fixed cylinder and the cam groove of the fixed frame 21 engaging with the cam follower of the first rotary cylinder 22 are shown in FIG. 13.

Generally, the rotary cylinder, which is the closest to the fixed cylinder and positioned on the outermost circumference is generally screwed onto the fixed cylinder through a helicoid, and the helicoid is configured to move the rotary cylinder at a constant speed relative to the fixed cylinder.

Therefore, the rotary cylinder is in a half-extended state out of the fixed cylinder in a wide angle position when the rotary cylinder is moved gradually from the collapsed position through the wide angle position to the telephoto position.

On the contrary, in the structure described above, the first rotary cylinder 22 is not only threaded with the fixed cylinder of the fixed frame 21 via a helicoid but also engaged with it via a helicoid-shaped cam groove. The first rotary cylinder 22 is moved completely to the maximum extended position when driven from the collapsed position to the wide angle position.

Thereafter, as shown in FIG. 13, because the subject side end of the cam groove becomes parallel with the end surface of the fixed cylinder, the first rotary cylinder 22 rotates at a constant position without moving along the optical axis when driven from the wide angle position to the telephoto position.

As the first rotary cylinder 22 is moved from the collapsed position to the wide angle position, it is extended with rotation toward the subject. When it reaches the maximum extended position, a zoom position-detector which is provided on the fixed frame 21 and comprising a photo-reflector, photo-interrupter, leaf switch or the like, for example, generates a zoom position-reference signal.

Therefore, when the zoom position-reference signal is generated, the first rotary cylinder 22 may be considered to have reached the maximum extended position, it is possible for the retractable lens frame, in this embodiment that is the third frame 31, to be initiated to move along the optical axis.

Consequently, by completely extending out the first rotary cylinder 22 and the first liner 23 adjacent to the fixed cylinder at the earlier step of the extension action, a space for inserting the third frame 31 (will be described hereinafter) into the optical axis can be secured preliminarily.

As described below, as soon as the first rotary cylinder 22 reaches the maximum extended position, the zoom position-reference signal is generated. As the space for inserting the third frame 31 has been secured, the insertion of the third lens group is initiated immediately.

Therefore, a time needed to move from the collapsible position to the wide angle position when an electric source is turned on can be shortened to a minimum.

The third lens group 13 is retained in the third frame 31. The third frame 31 has the third lens group 13 retained at one end thereof, and the other end is supported by the third frame main-guide shaft 32 which extends substantially in parallel with the optical axis of the third lens group 13 so as to be able of rotate and elide along the third frame main-guide shaft 32.

The third frame 31 is rotatable around the third frame main-guide shaft 32 between a set position in which the third lens group 13 is disposed onto the optical axis in the photographing state, as shown in FIG. 8 and the retracted position in which the third lens group 13 is retracted out of the fixed cylinder of the fixed frame 21, as shown in FIG. 2.

In the vicinity of the third lens group 13 on the side of the rotating end of the third frame 31, a crank-shaped bent portion for differentiating the position of the third lens group 13 in the direction parallel with the main-guide shaft between the side of the rotation axis and the side of the supporting portion, a stopper 31a (FIG. 15) and a light-shielding strip 31b are provided on the rotating end to project from the bent portion substantially toward the rotating end.

On optical performance, in order to enlarge the focus length in the telephoto state, a position of the third lens group 13 in the telephoto state is in an extended position closer to the subject.

However, a possible moving amount of the third frame 31 is limited by a length of the lens barrel in the collapsed state along the optical axis. While it is possible to maximize the focus length in the telephoto state by setting a position for retaining the third lens group by the third frame 31 to the closest position to the subject.

However, if the stopper 31a along the optical axis is set to a position nearly the same as the third lens group 13, a length of the third frame sub-guide shaft 33 becomes longer and thus a size of the lens barrel in the collapsible position becomes greater. Therefore, it is required that the stopper 31a is set on a side of a focus position and the third frame 31 is formed into a shape having the crank-shaped bent portion.

Meanwhile, the third frame 31 may be formed from two parts and in this case, one is a member having the crank-shaped bent portion, the other is a member for retaining the third lens group 13. The two parts are fixed together and operate integrally.

As shown in FIGS. 14A and 14B, the third frame female screw member 35 screwed on the third frame lead screw 34 is positioned in the closest position to an image plane of the CCD in the retracted state in which the third frame 31 is retracted.

In this state, a compression torsion spring 37 is fully compressed so as to charge constantly the clockwise moment as viewed from the front of the lens barrel to the third frame 31. A cylindrical outer peripheral surface of a supported part provided on the main-guide shaft 32 for the third frame 31 is provided with a cam portion 31e of an inclined surface disposed inside a stepped portion 31c, as shown in FIG. 14A.

From this state, when the third frame driving motor 52 is rotated clockwise as viewed from the front of the lens barrel, the third frame lead screw 34 is rotated clockwise through a gear mechanism including gears 71 to 74, and the third frame female screw member 35 moves toward the subject along the optical axis.

At this time, the third frame 31 is rotated clockwise by the moment force from the compression torsion spring 37, the cam portion 31e engages with a first abutting portion 35a provided on the third frame female screw member 35.

Thereafter, when the third frame female screw member 35 is moved to the closest position to the subject, the light-shielding strip 31b of the third frame 31 is moved to a position out of the third frame photo-interrupter 38 for detecting the position of the third lens group 13, thereby the third frame photo-interrupter 38 generates a reference signal in a range from L or a low level to H or a high level.

Accordingly, the position of the third lens group 13 is controlled by pulse count based on the reference signal from the third frame photo-interrupter 38.

From this state, when the third frame female screw member 35 is moved to the position B shown in FIG. 14A, the third frame 31 further rotates clockwise, the stopper 31a comes into abutment with the third frame sub-guide shaft 33 as shown in FIGS. 8 and 16A, as a result, the position of the third frame 31 on the optical axis is determined.

Consequently, approach operation of the third lens group 13 to the optical axis is completed.

Meanwhile, the light-shielding strip 31b shields the third frame photo-interrupter 38 shown in FIG. 16A so that it is possible to detect and confirm that the third frame 31 is in the collapsed position.

When the third frame female screw member 35 is moved to the position B as shown in FIG. 14A, the first abutting portion 35a of the third frame female screw member 35 contacts a front engaging portion 31d of the stepped portion 31c of the third frame 31.

Again, the stepped portion 31c of the third frame 31 has the cam portion 31e and the front engaging portion 31d which forms a planner surface generally perpendicular to the third frame main-guide shaft 32. The third frame 31 is constantly biased by the compression torsion spring 37 provided on the third frame main-guide shaft 32 to move in a direction from the collapsed position to the optical axis and a direction from the subject to the retainer plate 81 beside the image plane.

In addition, a portion of the fixed frame 21 to which the compression torsion spring 37 contacts includes a step 37a which is formed as a concave portion for inserting one end of the compression torsion spring 37, as shown in FIG. 14B, to limit the position of the compression torsion spring 37, that is to prevent the compression torsion spring from deviating out of a center of the third frame main-guide shaft 32 considerably.

Next, when the third frame female screw member 35 is moved to the wide angle position or position W as shown in FIG. 14A, because the first abutting portion 35a of the third frame female screw member 35 presses the front engaging portion 31d, the third frame 31 is movable to the wide angle position along the optical axis toward the subject.

Moreover, while the third frame female screw member 35 is positioned between the position B and the telephoto position T as shown in FIG. 14, because the third frame 31 is constantly pressed along the optical axis toward the image plane by the compression torsion spring 37, all spaces generated among the third frame lead screw 34, the third frame female screw member 35 and the retainer plate 81 are directed to the image plane, the third frame 31 can secure a positional accuracy in the direction of the optical axis.

The third frame female screw member 35 is screwed on the third frame lead screw 34 disposed substantially in parallel with the optical axis.

The third frame female screw member 35 includes a rotation-preventing projection 35b in addition to the first abutting portion 35a which engages with the above-described front engaging portion 31d or the cam portion 31e of the third frame 31 (FIG. 15).

The rotation-preventing projection 35b is fitted slidably into a guide groove formed on the cylindrical part of the fixed frame 21 in parallel with the optical axis as a rotation-preventing device for preventing the third lens female screw member 35 from rotating along with the rotation of the third frame lead screw 34.

In other words, the third frame female screw member 35 is moved in the back and forth direction along the optical axis by the rotation of the third frame lead screw 34, because the third frame female screw member 35 is prevented from rotating by the rotation-preventing projection 35b fitting into the guide groove of the fixed frame 21.

As shown in detail in FIG. 14A, when the third frame female screw member 35 is moved toward the image plane (left side in the drawing) further than the position B shown in FIG. 14A, the third frame female screw member 35 engages with the cam portion 31e of the stepped portion 31c of the third frame 31.

The third frame 31 comes into contact with the retainer plate 81 by the clockwise biasing force of the compression torsion spring 37, the third frame 31 is rotated counterclockwise against the clockwise biasing force exerted by the compression torsion spring 37. Therefore, the third frame 31 can be retracted.

On the other hand, while the third frame female screw member 35 is moved from the telephoto position T through the wide angle position W to the retract-initiating position B by the reverse rotation or counterclockwise rotation of the third frame lead screw 34, because the first abutting portion 35a of the third frame female screw member 35 engages with the front engaging portion 31d of the stepped portion 31c of the third frame 31, the third frame 31 moves gradually from the subject to the image plane while maintaining a position on the optical axis limited by the third frame sub-guide shaft 33 by the biasing force toward the optical axis and the biasing force toward the image plane from the compression torsion spring 37.

Meanwhile, when the third frame female screw member 35 reaches the retract-initiating position B, a base end surface 31f abuts with the retainer plate 81, the third frame female strew member 35 departs from the front engaging portion 31d to contact with the cam portion 31e of the stepped portion 31c.

While the third frame female screw member 35 moves from the retract-initiating position B to the collapsed position S, the second abutting portion 35c of the third frame female screw member 35 comes into sliding contact with the cam portion 31e of the stepped portion 31c of the third frame 31 and rotates the third frame 31 against the rotational biasing force exerted by the compression torsion spring 37, whereby the third frame 31 rotates from the position on the optical axis to the collapsed position S.

The collapsed position S of the third frame 31 corresponds to a position at which it is moved toward the image plane by a predetermined pulse count number after the generation of the reference signal of the range from The H to the L generated from the third frame photo-interrupter 38.

After the third frame 31 is moved to the collapsed position S, the first lens group 11, the second lens group 12, and the shutter/aperture stop unit 15 are moved to the collapsed position.

In this example, before the third frame 31 is moved to the collapsed position S, the fourth frame 41 for retaining the fourth lens group 14 is moved to the collapsed position.

A first collapsed position of the fourth frame 41 corresponds to a position at which it is moved toward the image plane by a predetermined pulse count number after the generation of a collapsed reference signal of a range from The H to the L generated by a fourth group reference detector or a fourth frame photo-interrupter 47.

After the fourth frame 41 reaches the first collapsed position, the collapsed operation of the third frame 31 is initiated.

That is to say, the third frame female screw member 35 moves toward the image plane by a predetermined pulse count number from the generation of the collapsed reference signal from the H to the L by the third frame photo-interrupter 38 (see FIG. 16A) and the collapsed operation of the third frame 31 is completed.

After the completion of the collapsed operation of the third frame 31, the first rotary cylinder 22 and structural parts disposed inside the first rotary cylinder 22 and the first liner 23 and so on are collapsed before contacting with the third frame 31.

This results in the collapsed operation of the first rotary cylinder 22 and so on without interfering with the third frame 31. Positions of the first rotary cylinder 22 and so on can be set by a drive pulse count generated by a zoom count detector comprising a pinion gear attached directly to an output shaft of the zoom motor 51 composed from a common DC motor and an encoder structure and for example, a first and second frames photo-interrupter 51a disposed adjacent the pinion gear.

Although the DC motor is used as the drive source for moving the first rotary cylinder 22 and the position of the first rotary cylinder 22 is detected by a detector comprising the encoder and the photo-interrupter in the above-mentioned example, it is clear that the similar functions can be accomplished by substituting a pulse motor structure for the whole of the above-mentioned structure.

To prevent the third frame 31 from collision with the other parts, an impact-preventing strip 36 as shown particularly in FIGS. 2 and 7 is rotatably supported on the fixed frame 21 in the vicinity of the third frame main-guide shaft 32 and includes a rotated portion provided at one end of the impact-preventing strip and an engaging projection 36a.

The impact-preventing strip 36 is constantly biased to cause the engaging projection 36a to move toward the optical axis by a spring or the like. When the third frame 31 is positioned in the collapsed position, the impact-preventing strip 36 is pushed out by a rotating force of the third frame 31 against the biasing force, and is deviated outside the third frame 31 (see FIG. 2 and FIG. 7 in particular).

When the third frame 31 is rotated and moving on the optical axis, the impact-preventing strip 36 is released from engagement with the third frame 31, and is rotated to cause the engaging projection 36a to be projected toward the optical axis by the biasing force, thereby causing the engaging projection 36a to project from the inner surface of the fixed cylinder of the fixed frame 21.

At this time, in addition to the first rotary cylinder 22 and the first liner 23, the second rotary cylinder 24, the second liner 25, the cam cylinder 26 and the lineally-moving cylinder 27 are all positioned on the subject side with respect to the projected position of the engaging projection 36a.

Therefore, the engaging projection 36a is positioned to project inwardly of an outer peripheral edge of the base portion of each of the first rotary cylinder 22 and the first liner 23 (see FIG. 5, FIG. 6, and FIG. 8 in particular).

With such a structure, even if the first rotary cylinder 22 is manually forced rotating and moving to the collapsed position, the impact-preventing strip 36 will contact with the first rotary cylinder 22 at first. Therefore, because the base portion of the first rotary cylinder 22 cannot be moved toward the image plane than the position of the impact-preventing strip 36 along the optical axis, the first rotary cylinder 22 is prevented from contacting with the third frame 31.

Accordingly, it is possible to accomplish the prevention of breaking, damage or the like to the third frame 31 by a strong external force. Moreover, only after the third frame 31 reaches the collapsed position normally, it is possible for the first rotary cylinder 22 to be moved to the collapsed position.

Therefore, when the lens barrel is in a photographing state, wherein the movable cylinders such as the first rotary cylinder 22 and so on are extended, if the strong external force is exerted to a leading end of the lens barrel and so on by dropping of the lens barrel or the like, the engaging projection 36a of the impact-preventing strip 36 engages with the first rotary cylinder 22 and the first liner 23, and hence further retraction of the first rotary cylinder 22 and the first liner 23 (as well as the second rotary cylinder 24, the second liner 25, the cam cylinder 26, and the lineally-moving cylinder 27) toward the third lens group 13 is prevented, so that the third frame 31 and the third lens group 13 are prevented from being damaged.

The third frame lead screw 34 is rotated in forward and reverse directions by the third frame driving motor 52. The rotation of the third frame driving motor 52 is transmitted to the third frame lead screw 34 via the gears 71, 72, 73, and 74 in sequence.

Next, a driving structure for the fourth lens group 14 is explained with reference to FIGS. 7, 8, 20A and 20B.

The fourth lens group 14 used as a focusing lens groups in the illustrated embodiment is retained by the fourth frame 41, as shown in FIGS. 20A and 20B.

The fourth frame 41 includes a sleeve portion 41a in which the fourth frame main-guide shaft 44 disposed in parallel with the optical axis and fixed in the lens barrel base 82, and a rotation-preventing portion 41b for limiting the rotation of the fourth frame 41 in which the fourth frame sub-guide shaft 42 disposed in parallel with the optical axis and fixed in the lens barrel base 82. With such a structure, the fourth frame 41 can be moved freely along the fourth frame main-guide shaft 44, that is, the optical axis.

The fourth frame driving motor 53 comprising a stepping motor is used as a driving source for the fourth frame 41 in the illustrated embodiment. The fourth frame lead screw 45, which is threaded into a threaded hole provided in the fourth frame female screw member 46, forms an output shaft of the fourth frame driving motor 53.

The fourth frame 41 has an opening for inserting the fourth frame female screw member 46. The opening has an engaging portion 41c for engaging with the fourth frame female screw member 46 in a perpendicular plane to the optical axis in a side of the image plane.

The fourth frame 41 is always engaged with the fourth frame female screw member 46 by biasing the fourth frame 41 to the subject by the fourth frame spring 43.

The fourth frame female screw member 46 has a protrusion 46a projected radially. The protrusion 46a is engaged in a bore 41d provided in one side of the opening for inserting the fourth frame female screw member 46 of the fourth frame 41 so that the rotation of the fourth frame female screw member 46 is stopped.

In this way, when the fourth frame lead screw 45 is driven to rotate by the fourth frame driving motor 53 which is the stepping motor, the fourth frame female screw member 46 is moved in the forward and reverse directions along an axis of the fourth frame lead screw 45, that is, the optical axis.

Because the fourth frame 41 engages with the fourth frame female screw member 46, the fourth frame 41 is moved along the optical axis following the movement of the fourth frame female screw member 46.

In this case, although the fourth frame lead screw 45 is formed on the output shaft of the fourth frame driving motor 53, the fourth frame lead screw 45 may be rotated by constituting the fourth frame driving motor 53 and the fourth frame lead screw 45 separately and connecting them through gears or the like.

The fourth frame 41 is provided with a light-shielding strip 41e which shields an optical passage of the fourth frame photo-interrupter 47 provided on the lens barrel base 82, the light-shielding strip 41e is capable of shielding light from or passing light through the optical passage of the fourth frame photo-interrupter 47 in response to the movement of the fourth frame 41.

In this case, the fourth frame 41 can be moved in a predetermined position by recognizing as a reference position a time at which the light-shielding strips is set from the light-shielding state to the light-passing state, energizing a pulse wave of any pulse number from the reference position, rotating the fourth frame driving motor 53.

Meanwhile, the fourth frame 41 has a concave portion 41f which is provided in an outer peripheral edge thereof and allows the light-shielding strip 31b of the third frame 31 as the photo-interrupter to move toward the optical axis to avoid interfering with the fourth frame 41, thereby the moved amount of the fourth frame 41 can be increased and a range capable of focusing can be enlarged.

Moreover, as described above, there is a clearance between the fourth frame 41 and the fourth frame female screw member 46 in the direction of the optical axis, but the position in the direction of the optical axis of the fourth frame 41 can be controlled accurately by constantly biasing the fourth frame 41 toward the subject by the fourth frame spring 43.

The collapsed position of the first rotary cylinder 22, the first liner 23, the first lens group 11, the second lens group 12 and the shutter/aperture stop unit 15 is determined according to the zoom position-reference signal generated by the zoom position detector comprising the photo-reflector and so on disposed in the fixed frame 21.

That is to say, it is possible to complete the collapse operation by moving them toward the image plane by the predetermined pulse count number of the drive pulse generated by the pinion gear acting as the encoder and the zoom count detector disposed adjacent to the pinion gear after the change of from the H to the L of the zoom position collapse reference signal occurs.

In collapsing, the fourth frame 41 is positioned in the first collapsed position as described above, while, when the first rotary cylinder 22 is moved to the collapsed position, the most distal surface of the first rotary cylinder 22 or the first liner 23 contacts with the fourth frame 41 and presses the fourth frame 41 to move to the second collapsed position finally.

By such an operation, even if variations of the attached position of the fourth frame photo-interrupter 47 in the direction of the optical axis occur, the fourth frame 41 can be moved to the collapsed position accurately without requiring a complicated adjustment.

Such an operation can be accomplished for the reason that a length of the engaging space formed in the fourth frame 41, in the direction of the optical axis is larger than a thickness of the fourth frame female screw member 46.

The zoom motor 51 for moving the first lens group 11, the second lens group 12 and the shutter/aperture stop unit 15 is structured by the DC motor as described above in the illustrated embodiment, the third frame driving motor 52 for driving the third lens group 13 and the fourth frame driving motor 53 for driving the fourth lens group 14 are generally configured to use a pulse motor, for example, are driven in conjunction with each other in a software-like manner to achieve an appropriate zoom action performed mainly by the first lens groups 11 to the third lens groups 13 and an appropriate focusing action performed mainly by the fourth lens group 14, for example.

Here, a drive control system for the lens groups constituting the lens barrel is described in detail with reference to FIGS. 21 to 28.

Figure 21:
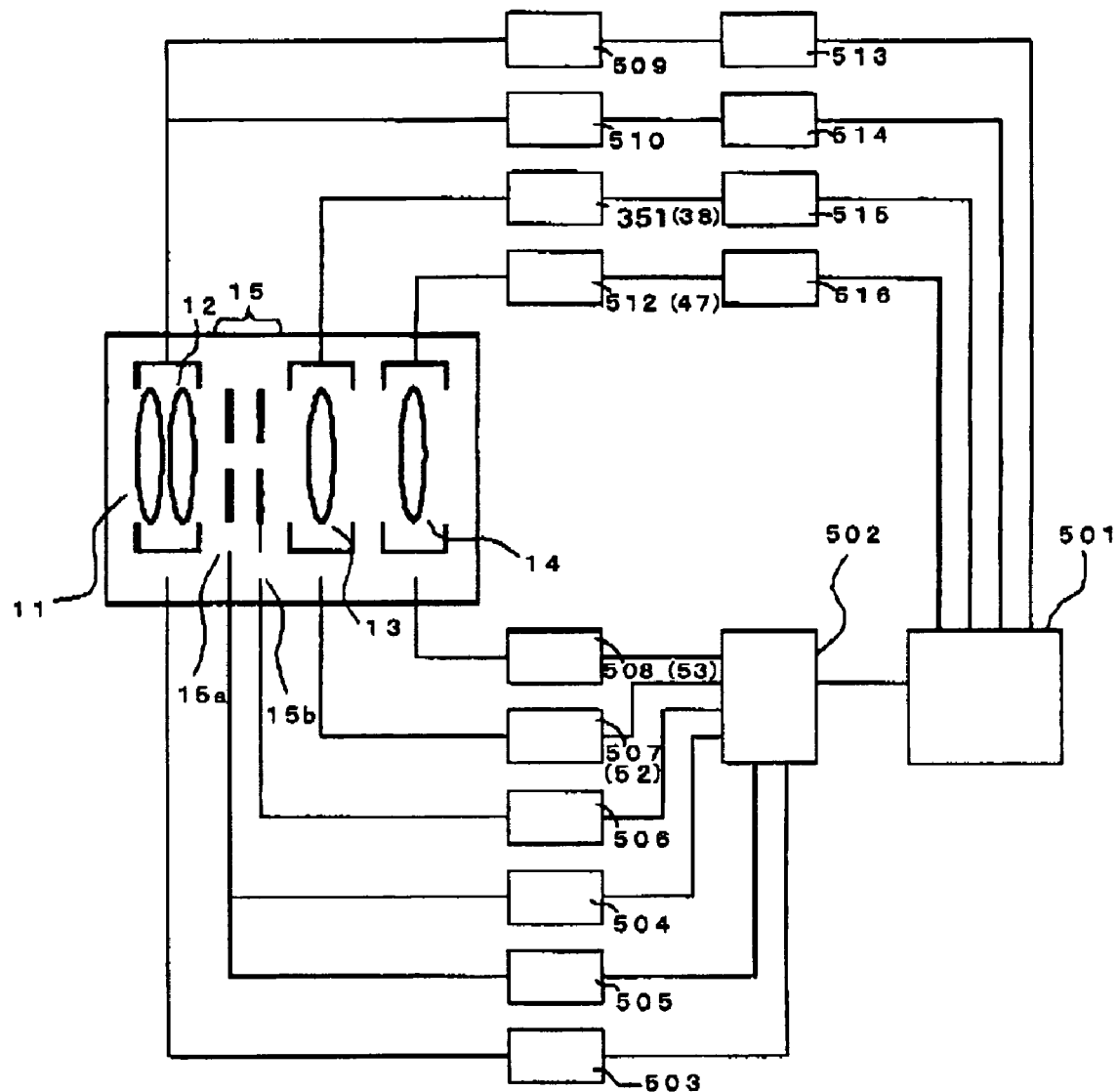
FIG. 21 is a block view schematically showing a structure of a drive control system.
Figure 22:
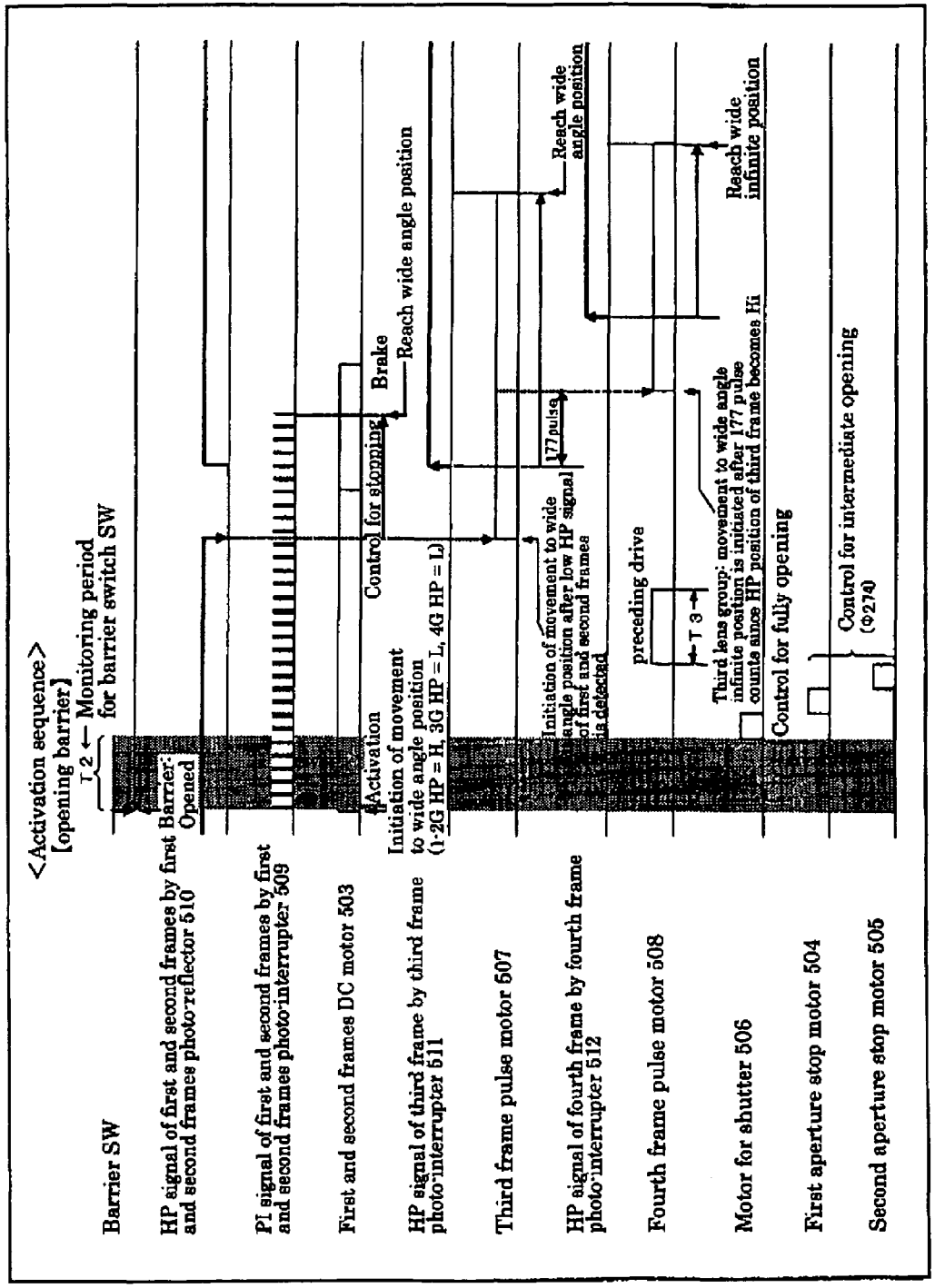
FIG. 22 is a timing chart showing a lens barrier opening sequence in an actuation sequence.

FIG. 21 shows a structure of the drive control system. FIG. 22 is a timing chart showing a lens barrier opening sequence in an actuation sequence.

Figure 23:
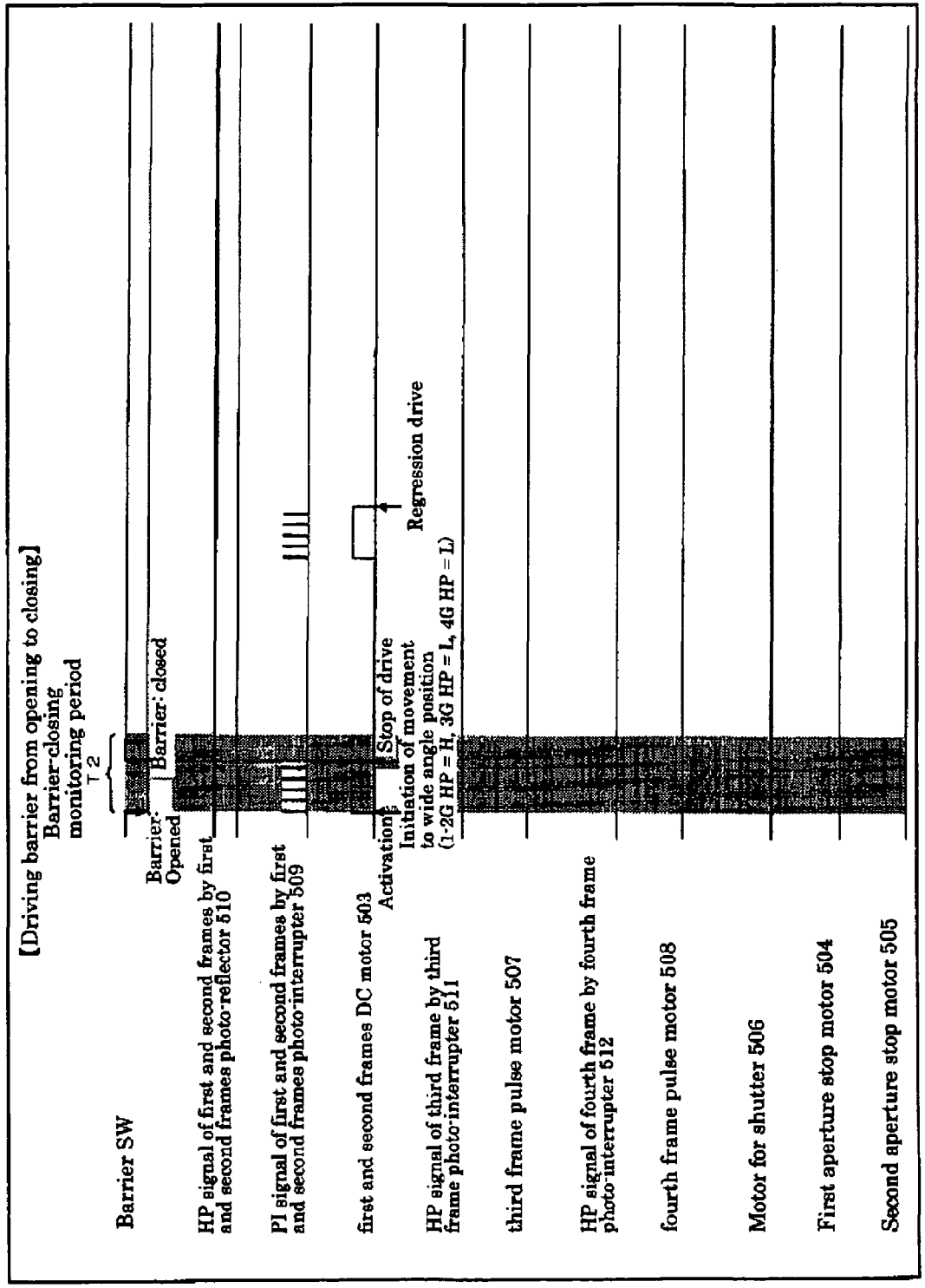
FIG. 23 is a timing chart showing a state from the lens barrier opening sequence to the lens barrier closing sequence in an actuation sequence.

FIG. 23 is a timing chart showing a state from the lens barrier opening sequence to the lens barrier closing sequence in an actuation sequence.

FIG. 24A is a table showing a reset sequence of the lens barrel.

Figure 24B:
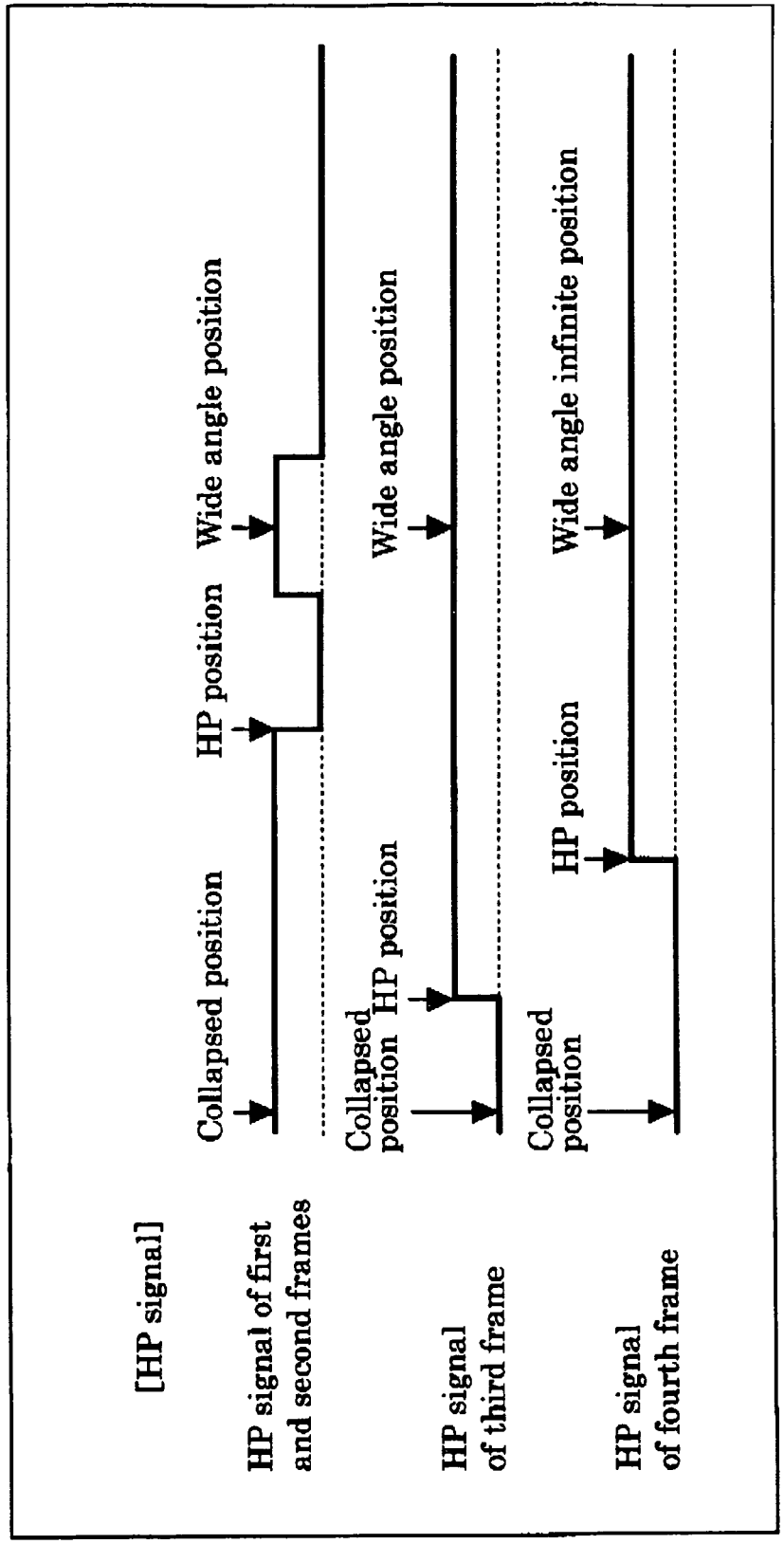
FIG. 24B is a timing chart of an H signal.

FIG. 24B is a timing chart of an H signal.

Figure 25:
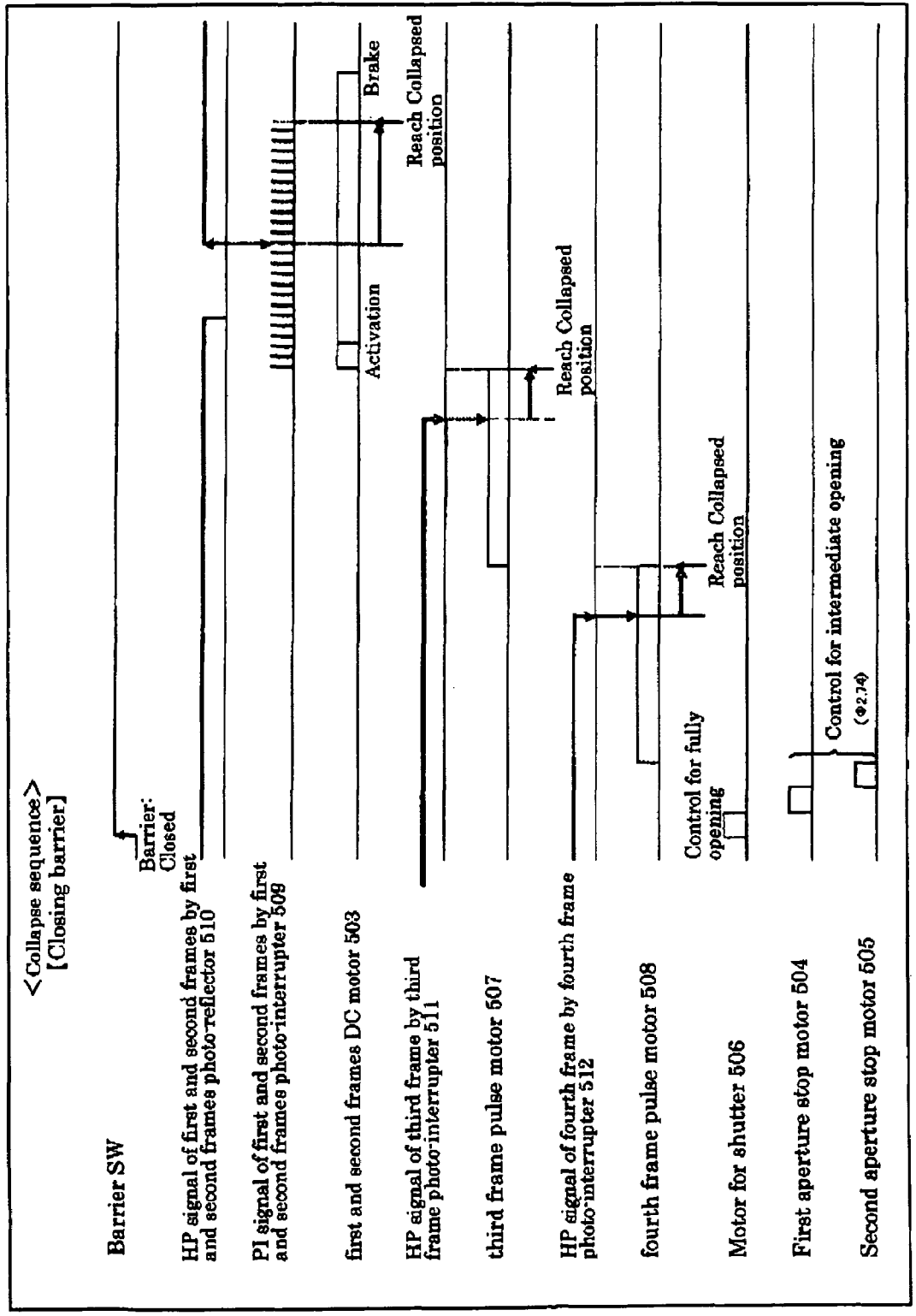
FIG. 25 is a timing chart showing a collapse sequence when the lens barrier is closed.

FIG. 25 is a timing chart showing a collapse sequence when the lens barrier is closed.

Figure 26:
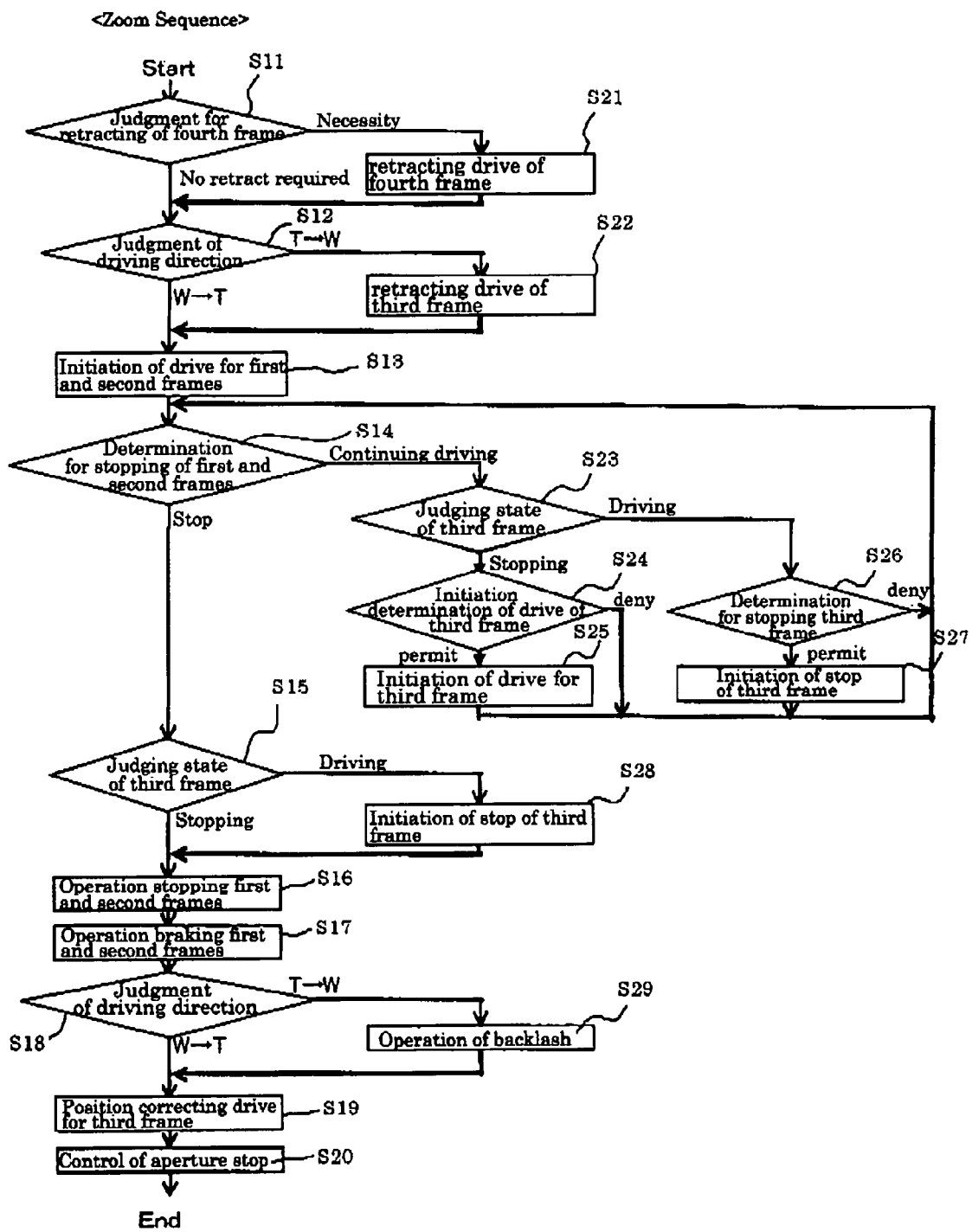
FIG. 26 is a flow chart showing a zoom sequence.

FIG. 26 is a flow chart showing a zoom sequence.

Figure 27:
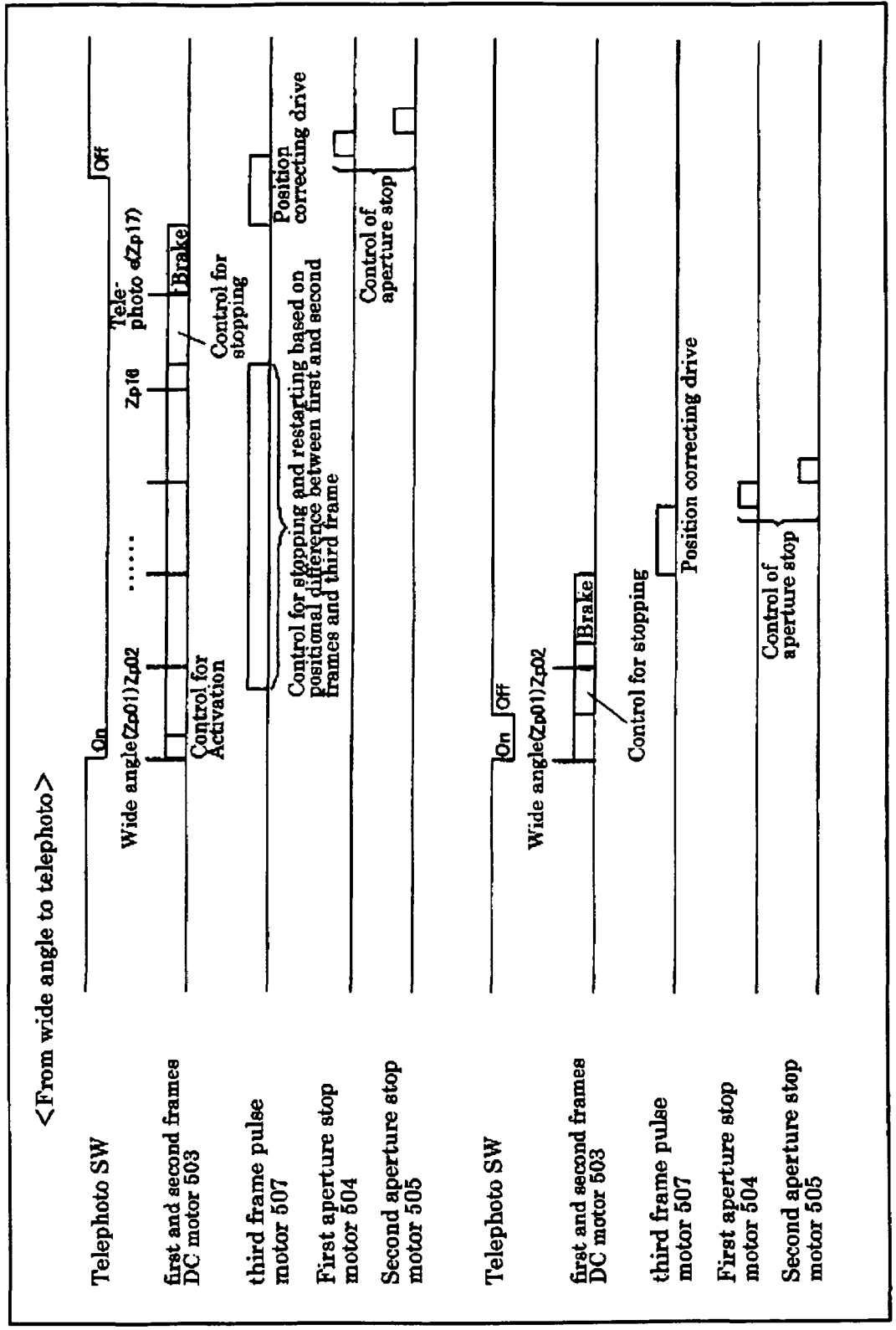
FIG. 27 is a timing chart showing the zoom sequence zooming from a wide angle position to a telephoto position.

FIG. 27 is a timing chart showing the zoom sequence zooming from a wide angle position to a telephoto position.

Figure 28:
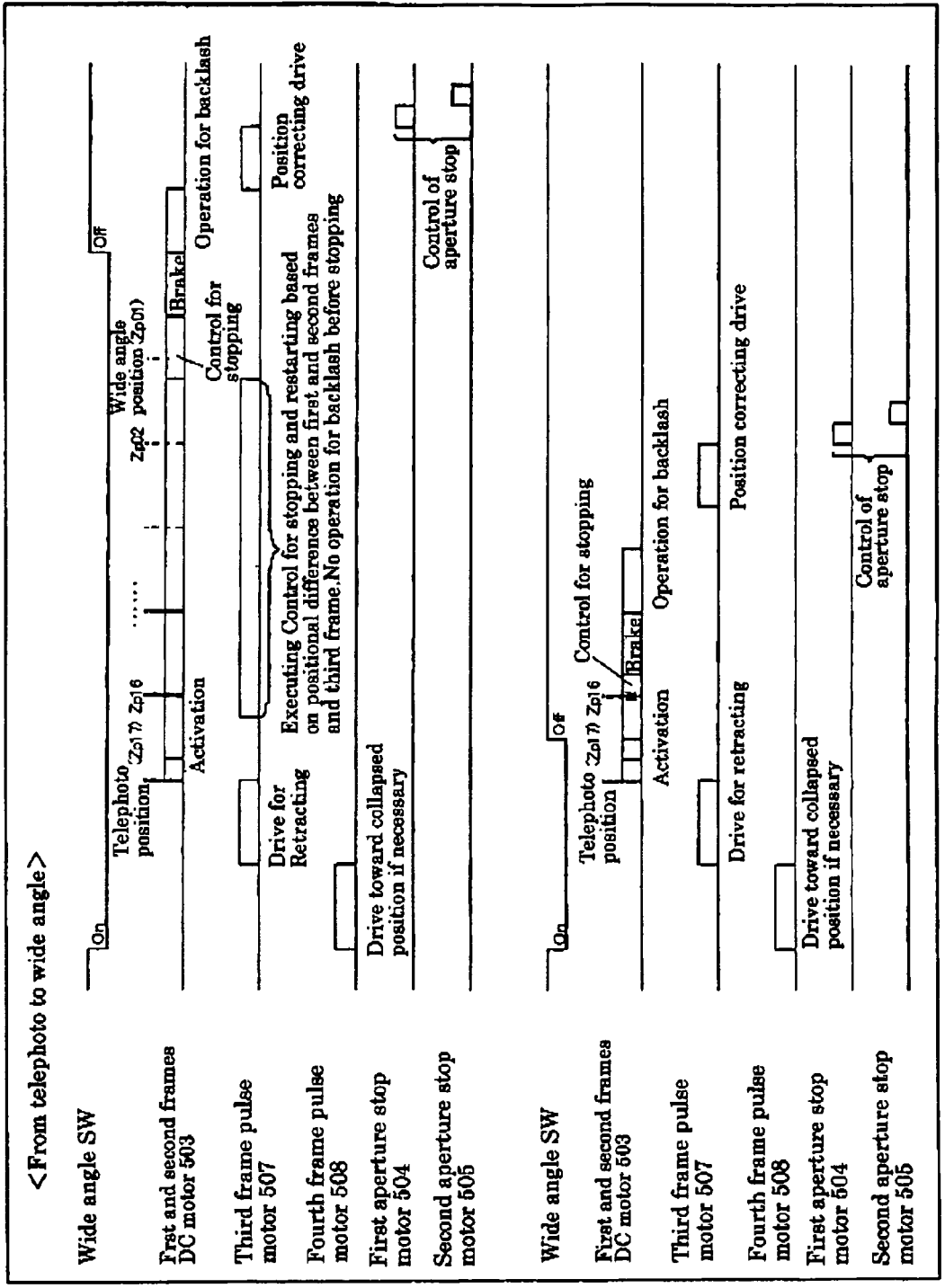
FIG. 28 is a timing chart showing the zoom sequence zooming from a telephoto position to a wide angle position.

FIG. 28 is a timing chart showing the zoom sequence zooming from a telephoto position to a wide angle position.

The drive control system shown in FIG. 21 includes a central processing unit (CPU) 501, a motor driver 502, a first and second frames DC motor 503, a first aperture stop motor 604, a second aperture stop motor 505, a shutter motor 506, a third frame pulse motor 507, a fourth frame pulse motor 508, a first and second frames photo-interrupter 509, a first and second frames photo-reflector 510, a third frame photo-interrupter 511, a fourth frame photo-interrupter 512, a first and second frames photo-interrupter driving circuit 513, a first and second frames photo-reflector driving circuit 514, a third frame photo-interrupter driving circuit 515, and a fourth frame photo-interrupter driving circuit 516.

The CPU 501 issues a command such as an initial setting of the motor driver 502, a selection for a drive motor, a setting of a drive voltage, a driving direction and so on to the motor driver 502.

The motor driver 502 controls the motor system of the first and second frames DC motor 503, the first aperture stop motor 504, the second aperture stop motor 505, the shutter motor 506, the third frame pulse motor 507, the fourth frame pulse motor 508 and so on, in accordance with the command from the CPU 501.

The first and second frames DC motor 503 drives the first and second lens groups 11 and 12. In general, the first and second groups 11 and 12 are driven separately with respect to each other through a cam mechanism in response to the drive of the first and second frames DC motor 503.

The first aperture stop motor 504 and the second aperture stop motor 505 are configured to drive an aperture stop of the shutter/aperture stop unit 15. The shutter motor 506 drives a shutter of the shutter/aperture stop unit 15.

The third frame pulse motor 507 drives the third lens group 13. The fourth frame pulse motor 508 drives the fourth lens group 14.

The CPU 601 performs an electricity supply to the first and second frames photo-interrupter 509, the first and second frames photo-reflector 510, the third frame photo-interrupter 511, and the fourth frame photo-interrupter 512 as a position-detecting device through the first and second frames photo-interrupter driving circuit 513, the first and second frames photo-reflector driving circuit 514, the third frame photo-interrupter driving circuit 515, and the fourth frame photo-interrupter driving circuit 516.

The CPU 501 also acquires a position information signal detected by the first and second frames photo-interrupter 509, the first and second frames photo-reflector 510, the third frame photo-interrupter 511, and the fourth frame photo-interrupter 512.

The first and second frames photo-interrupter driving circuit 513, the first and second frames photo-reflector driving circuit 514, the third frame photo-interrupter driving circuit 515, and the fourth frame photo-interrupter driving circuit 516 have a function to appropriately control a level of a projecting current and an output signal of each of the first and second frames photo-interrupter 509, the first and second frames photo-reflector 510, the third frame photo-interrupter 511, and the fourth frame lens photo-interrupter 512.

The motor driver 502 receives a command from the CPU 501 and executes the command. The CPU sets a designated voltage to one or more selected motors of the first and second frames DC motor 503, the first aperture stop motor 504, the second aperture stop motor 505, the shutter motor 506, the third frame pulse motor 507, the fourth frame pulse motor 508, and controls them in accordance with a timing of drive command.

<Actuation Sequence>

Such a lens barrier opening sequence in an actuation sequence driven by the drive control system is described with reference to FIG. 22.

By opening the lens barrier 62, a barrier switch signal from a barrier switch (not shown) changes from the H to the L and an initial setting of the lens barrel is initiated.

Meanwhile, the barrier switch 62 is operated by opening mechanically the lens barrier 62 with an operating lever or the like (not shown), while the lens barrier may be opened by operation of the barrier switch.

Executing the initial setting causes the initialization of the motor driver 502 for driving the motor system, and the initialization of the first and second frames photo-interrupter 509, the first and second frames photo-reflector 510, the third frame photo-interrupter 511, and the fourth frame photo-interrupter 512, as the position detecting device for a position through the first and second frames photo-interrupter driving circuit 513, the first and second frames photo-reflector driving circuit 514, the third frame photo-interrupter driving circuit 515, and the fourth frame photo-interrupter driving circuit 516.

In the case that detected results by the first and second frames photo-interrupter 509, the third frame photo-interrupter 511 and the fourth frame photo-interrupter 512 indicate the collapsed position, the first and second frames DC motor 503 is adapted to drive to the wide angle position.

A driven amount of the first and second frames DC motor 503 is detected by the first and second frames photo-interrupter 509 for detecting the moving amount of the first and second lens groups.

The moving amount is detected by counting edge portions of the pulse signal (PI signal) by the first and second frames photo-interrupter 509.

During actuation period right after the first and second frames DC motor 503 is actuated, a driving voltage is set lower than a constant voltage in order to prevent an incoming current from the DC motor.

After the actuation period is completed, the driving voltage is increased to the constant voltage.

A period for monitoring the barrier switch or barrier SW right after the actuation of the first and second frames DC motor 503 is set and a state of the barrier switch signal is monitored by the CPU 501.

During monitoring period, if the barrier switch signal indicates the opening state of the lens barrier, the shutter is set in the full opening by the shutter motor 50 for driving the shutter. Then, the aperture stop is set in an intermediately restricted state by the first and second aperture stop motors 504 and 505.

In this example, although the aperture stop is set in an intermediate stop value, it may be set in an open stop value or maximum stop value.

Next, the fourth lens group 14 is previously driven through the fourth pulse motor 508.

By achieving the previous drive of the fourth lens group 14, the total time from the initiation of the drive of the first and second lens groups to the completion of the drive of the final fourth lens group 14 can be reduced.

Moreover, it is possible to enlarge a driving torque to prevent the interference of the fourth lens group with the other parts by setting a pulse rate of the fourth frame pulse motor 508 in the previous drive thereof lately than that in the normal driving state.

Meanwhile, the driven amount of the fourth lens group by the fourth frame pulse motor 508 is set so that the third and fourth lens groups will not interfere with each other.

When the previous drive of the fourth lens group 14 is completed, the waiting for detecting reference position by the first and second frames photo-reflector 510 is set.

A place where the reference position signal changes from the H to the L becomes the reference position or HP position of the first and second lens groups 11 and 12. When the reference position or HP position of the first and second lens groups 11 and 12 is detected, positional information of the first and second lens groups 11 and 12 is reset.

The movement of the first and second lens groups is controlled by counting the pulse-like signal (PI signal) by the first and second frames photo-interrupter 509 based on the positional information to acquire the moved amount of the first and second lens groups until the wide angle position.

The wide angle position is previously set, but it can be changed by storing it or rewriting it in a nonvolatile memory such as EEPROM and so on.

A specified pulse period before reaching the wide angle position is a stop controlling period, overrun in reaching the wide angle position can be reduced by lowering the driving voltage in accordance with residual pulse numbers to the wide angle position.

If the first and second lens groups reach the wide angle position by counting the PI signal by the first and second frames photo-interrupter 509, a braking control is made in order to stop the first and second lens groups.

An overrun amount during the braking period is counted so as to determine the final position of the first and second lens groups 11 and 12.

Moreover, when the reference position or HP position of the first and second lens groups 11 and 12 is detected, the drive of the third frame pulse motor 507 in the direction of wide angle position is initiated to control the third lens group 13 with the first and second lens groups 11 and 12.

The driving time of the third lens group 13 can be reduced by setting the pulse rate in driving the third group pulse motor highly or rapidly than that in the normal drive.

The third lens group 13 is waited for detecting the reference position by the third frame photo-interrupter 511. A place where the reference position signal or HP signal by the third frame photo-interrupter 511 changes from the L to the H becomes the reference position or HP position of the third lens group 13.

When the reference position or HP position is detected, positional information of the third lens group 13 is reset. The third lens group 13 is pulse-driven by the third frame pulse motor 507 based on the positional information to obtain the moved amount of the third lens group 13 to the wide angle position. The wide angle position is previously set, but it can be changed by storing it in a nonvolatile memory such as an EEPROM or the like and rewriting it.

In addition, the final stopping position of the third lens group 13 becomes a position in consideration of an overrun of the first and second lens groups 11 and 12.

That is to say, because the stopping position of the first and second lens groups 11 and 12 is the wide angle position plus an overrun amount, the stopping position of the third lens group 13 is also the wide angle position plus α in consideration of an overrun of the first and second lens groups 11 and 12.

A value of the α is obtained by a linear calculation depending on pulse numbers between the zoom positions of the first and second lens groups 11 and 12, the overrun amount and a pulse number between the zoom positions of the third lens group 13. The zoom position is one of sections divided into 16 equally between the wide angle position and the telephoto position (between W and T).

If the drive of the first and second lens groups 11 and 12 is completed, the reference position or HP position of the third lens group 13 is detected, and the third lens group 13 is driven more than the specified pulse number, the drive of the fourth frame pulse motor 508 in the direction of an infinite wide angle position is initiated.

If the drive of the first and second lens groups 11 and 12 is not completed, or the third lens group 13 is not driven more than the specified pulse from the reference position, the drive of the first and second lens groups 11 and 12 is completed, and a standby state is set until the third lens group 13 is driven more than the specified pulse from the reference position.

When the drive of the first and second lens groups 11 and 12 are not completed and the fourth frame pulse motor 508 is driven, the three motors are driven simultaneously to increase current consumption. Therefore, in the example, only the third and fourth lens groups are driven simultaneously.

Moreover, when the fourth lens group 14 is driven before the third lens group 13 reaches the position more than the specified pulse number, the interference between the third and fourth lens groups 13 and 14 occurs. Therefore, the drive of the fourth lens group 14 is initiated after the third lens group 13 is driven more than the specified pulse number.

The fourth lens group 14 is waited for detecting the reference position by the fourth frame photo-interrupter 512.

In addition, current consumption can be reduced by setting the driving voltage of the fourth frame pulse motor 508 to be lower than that of the normal drive. A place where the reference position signal or HP signal by the fourth frame photo-interrupter 512 changes from the L to the H becomes the reference position or HP position of the fourth lens group 14.

When the reference position or HP position of the fourth lens group is detected, the positional information of the fourth lens group 14 is reset. The fourth lens group 14 is pulse-driven by the fourth frame pulse motor 508 based on the positional information to obtain the moved amount of the fourth lens group 14 to the wide angle position.

The wide angle position is previously set, but it can be changed by storing it in a nonvolatile memory such as an EEPROM or the like and rewriting it.

In the embodiment, as described above and shown in the timing chart of FIG. 22, the current consumption can be reduced by limiting the simultaneously driven motors to two motors, and a time for actuating the motors can be shortened by the optimum driving of the motors.

Next, a case in which the barrier switch signal is changed in a closed state during a period for monitoring the barrier switch right after the actuation of the first and second frames DC motor 503 is initiated is explained with reference to FIG. 23.

If the barrier switch signal is changed from the opened state to the closed state during the period, the drive of the first and second frames DC motor 503 is stopped.

Thereafter, the drive of the first and second frames DC motor 503 is initiated by a moved amount in the direction of the collapsed position or the specified pulse number.

In this case, the driving voltage is lower, the breaking and damage can be prevented even if operating parts of the lens barrier impact with the first and second lens groups and so on in the end of a collapsed position.

By such a control, the first and second lens groups are prevented from interfering with the lens barrier.

[Reset Sequence]

Moreover, if the detected result of the first and second frame photo-reflector 510 is not the collapsed position (reference position HP, signal L), the detected result of the third frame photo-interrupter 511 is not the collapsed position (reference position HP, signal H), or the detected result of the fourth frame photo-interrupter 512 is not the collapsed position (reference position HP, signal H), the reset sequence drive is executed.

The reset sequence is described referring to FIG. 24. FIG. 24A is a table showing a reset sequence of the lens barrel. FIG. 24B is a timing chart of an H signal.

<With Respect to First and Second Group HP Signal=H, Third Group HP Signal=L, Fourth Group HP Signal=L>

First, as the reset operation of the first and second lens groups 11 and 12, the reference position or HP position of the first and second lens groups is detected, and the first and second lens groups are moved to the wide angle position (first and second groups: Reset).

Next, as the storing operation of the fourth lens group 14, the reference position or HP position of the fourth lens group 14 is detected, and the fourth lens group is moved to the collapsed position (fourth group: storage).

Subsequently, as the reset operation of the third lens group 13, the reference position or HP position of the third lens group 13 is detected, and the third lens group is moved to the wide angle position (third group: Reset).

Finally, as the reset operation of the fourth lens group 14, the reference position or HP position of the fourth lens group 14 is detected, and the fourth lens group is moved to the infinite wide angle position (fourth group: Reset).

<With Respect to First and Second Group HP Signal=H, Third Group HP Signal=L, Fourth Group HP Signal=H>

First, as the retraction operation of the first and second lens groups 11 and 12, the first and second lens groups are driven in the direction of the telephoto and pulse-driven by the specified pulse after the lowering of the reference signal is detected (first and second groups: retraction).

Next, as the collapse operation of the fourth lens group 14, the reference position or HP position of the fourth lens group 14 is detected, and the fourth lens group is moved to the collapsed position (fourth group: collapse).

Subsequently, as the reset operation of the first and second lens groups 11 and 12, the reference position or HP position of the first and second lens groups 11 and 12 is detected, and the first and second lens groups are moved to the wide angle position (first and second groups: Reset).

Next, as the reset operation of the third lens group 13, reference position or HP position of the third lens group 13 is detected, and the third lens group is moved to the wide angle position (third group: Reset).

Finally, as the reset operation of the fourth lens group 14, the reference position or HP position of the fourth lens group 14 is detected, and the fourth lens group is moved to the infinite wide angle position (fourth group: Reset).

<With Respect to First and Second Group HP Signal=H, Third Group HP Signal=H, Fourth Group HP Signal=L, First and Second Group HP Signal=H, Third Group HP Signal=H, Fourth Group HP Signal=H>

First, as the retraction operation of the first and second lens groups 11 and 12, the first and second lens groups are driven in the direction of the telephoto and pulse-driven by the specified pulse after the lowering of the reference signal is detected (first and groups; retraction).

Next, as the collapse operation of the fourth lens group 14, the reference position or HP position of the fourth lens group 14 is detected, and the fourth lens group is moved to the collapsed position (fourth group: collapse).

If the reference position or HP position of the fourth lens group 14 can be detected, as the collapse operation of the third lens group, the reference position or HP position of the third lens group 13 is detected, and the third lens group is moved to the collapsed position (third group: collapse).

If the reference position or HP position of the fourth lens group 14 cannot be detected, because it is considered that the fourth lens group is interfered with the third lens group 13, the collapse operation of the third lens group 13 is previously carried out (third group: collapse).

If the collapse operation of the third lens group 13 is completed, and then the collapse operation of the fourth lens group 14 is carried out (fourth group: collapse).

If the HP position is not detected at the time of operating the collapse of the third lens group 13, because it is considered that the third lens group 13 is interfered with the fourth lens group 14, as the collapse operation of the third lens group 13, the third lens group 13 is driven by the specified pulse count in the direction of the telephoto position (third group: collapse).

Thereafter, the collapse operation (fourth group: collapse) of the fourth lens group 14 and the collapse operation (third group: collapse) of the third lens group 13 are carried out.

Subsequently, as the reset operation of the first and second lens groups 11 and 12, the reference position or HP position of the first and second lens groups 11 and 12 is detected, and the first and second lens groups are moved to the wide angle position (first and second groups: Reset).

Next, as the reset operation of the third lens group 13, the reference position or HP position of the third lens group 13 is detected, and the third lens group is moved to the wide angle position (third group: Reset).

Finally, as the reset operation of the fourth lens group 14, the reference position or HP position of the fourth lens group 14 is detected, and the fourth lens group is moved to the infinite wide angle position (fourth group: Reset).

<With Respect to First and Second Group HP Signal=L, Third Group HP Signal=L, Fourth Group HP Signal=L, First and Second Group HP Signal=L, Third Group HP Signal=L, Fourth Group HP Signal=H>

First, as the collapse operation of the fourth lens group 14, the reference position or HP position of the fourth lens group 14 is detected, and the fourth lens group is moved to the collapsed position (fourth group: collapse).

Next, as the collapse operation of the third lens group 13, the reference position or HP position of the third lens group 13 is detected, and the third lens group is moved to the collapsed position (third group: collapse).

Next, as the reset operation of the first and second lens groups 11 and 12, the reference position or HP position of the first and second lens groups is detected, and the first and second lens groups are moved to the wide angle position (first and second groups: Reset).

Subsequently, as the reset operation of the third lens group 13, the reference position or HP position of the third lens group 13 is detected, and the third lens group is moved to the wide angle position (third group: Reset).

Finally, as the reset operation of the fourth lens group 14, the reference position or HP position of the fourth lens group 14 is detected, and the fourth lens group is moved to the infinite wide angle position (fourth group: Reset).

<With Respect to First and Second Group HP Signal=L, Third Group HP Signal=H, Fourth Group HP Signal=L, First and Second Group HP Signal=L, Third Group HP Signal=H, Fourth Group HP Signal=H>

First, as the collapse operation of the fourth lens group 14, the reference position or HP position of the fourth lens group 14 is detected, and the fourth lens group is moved to the collapsed position (fourth group: collapse).

If the reference position or HP position of the fourth lens group 14 can be detected, as the collapse operation of the third lens group 13, the reference position or HP position of the third lens group 13 is detected, and the third lens group is moved to the collapsed position (third group: collapse).

If the reference position or HP position of the fourth lens group 14 cannot be detected, because it is considered that the fourth lens group is interfered with the third lens group 13, the collapse operation of the third lens group 13 is previously carried out (third group: collapse).

If the collapse operation of the third lens group 13 is completed, and then the collapse operation of the fourth lens group 14 is carried out (fourth group: collapse).

If the HP position is not detected at the time of operating the collapse of the third lens group 13, because it is considered that the third lens group 13 is interfered with the fourth lens group 14, as the retraction operation of the third lens group 13, the third lens group 13 is driven by the specified pulse count in the direction of the telephoto position (third group: retraction).

Thereafter, the collapse operation (fourth group: collapse) of the fourth lens group 14 and the collapse operation (third group: collapse) of the third lens group 13 are carried out.

Subsequently, as the reset operation of the first and second lens groups 11 and 12, the reference position or HP position of the first and second lens groups 11 and 12 is detected, and the first and second lens groups are moved to the wide angle position (first and second groups: Reset).

Next, as the reset operation of the third lens group 13, the reference position or HP position of the third lens group 13 is detected, and the third lens group is moved to the wide angle position (third group: Reset).

Finally, as the reset operation of the fourth lens group 14, the reference position or HP signal of the fourth lens group 14 is detected, and the fourth lens group is moved to the infinite wide angle position (fourth group: Reset).

[Collapse Sequence]

The barrier switch signal changes from L to H by closing the lens barrier 62 to initiate the collapse operation. Meanwhile, the barrier switch may be operated by mechanically closing the lens barrier 62 by device of an operating lever or the like, or the lens barrier 62 may be closed by operation of the barrier switch.

The shutter of the shutter/aperture stop unit 15 is set in the fully closed state through the full closing control of the shutter by the shutter motor 506.

Next, the aperture stop of the shutter/aperture stop stop unit 15 is set in the intermediately restricted state through the intermediate restricting control of the aperture stop by the first and second aperture stop driving motors 504 and 505.

Subsequently, the collapse driving of the fourth lens group 14 is achieved through the fourth frame pulse motor 508. The standby for detecting the reference position of the fourth frame pulse motor 508 by the fourth frame photo-interrupter 512 is set after the driving of the fourth frame pulse motor 608 to the collapsed position is initiated.

The fourth frame pulse motor 508 is pulse-driven by a moved amount to the collapsed position from a place where the reference positional signal or HP signal by the fourth frame photo-interrupter 512 changes from H to L to the collapsed position. The moved amount to the collapsed position is previously set, but the moved amount can be changed by storing it in a nonvolatile memory such as an EEPROM or the like and rewriting it.

Next, the collapse driving of the third lens group 13 is executed through the third frame pulse motor 507. The third lens group 13 is waited for detecting the reference position by the third frame photo-interrupter 511 by initiating the driving of the third frame pulse motor 507 in the direction of the collapsed position.

The third lens group 13 is pulse-driven by the moved amount to the collapsed position from the place where the reference position signal or HP signal by the third frame photo-interrupter 511 changes from the H to the L to the collapsed position.

Although the moved amount to the collapsed position is set previously, the moved amount can be changed by storing it in a nonvolatile memory such as an EEPROM or the like and rewriting it.

The drive pulse rate of the third frame pulse motor 507 between the reference position and the collapsed position is lower than the drive pulse rate until the reference position.

In this way, a smooth pulse drive can be accomplished by changing the pulse rate in accordance with an area in which a torque is necessary.

Next, the collapse driving of the first and second lens groups 11 and 12 is executed through the first and second frames DC motor 503. The first and second lens groups are waited for detecting the reference position by the first and second frames photo-reflector 510 by initiating the driving of the first and second frames DC motor 503 in the direction of the collapsed position.

The control for the moved amount of the first and second lens groups 11 and 12 is achieved by counting the pulse-like signal or PI signal by the first and second frames photo-interrupter 509 to acquire the moved amount to the collapsed position from the place where the reference position signal or HP signal by the first and second frames photo-reflector 510 changes from L to H to the collapsed position.

Although the moved amount to the collapsed position is set previously, the moved amount can be configured to be changed by storing it in a nonvolatile memory such as an EEPROM or the like and rewriting it.

In the collapse driving for the first and second lens groups 11 and 12, if the first and second lens groups 11 and 12 reach the collapsed position by counting the PI signal by the first and second frames photo-interrupter 509 without dropping the voltage of the first and second frames DC motor 503 before stopping it, a breaking control is achieved in order to stop the driving of the first and second lens groups 11 and 12.

This will prevent the first and second frame DC motor from stopping at the middle of drive due to the dropping of voltage.

[Changing Magnification Sequence]

A sequence for a changing magnification operation is described with reference to a flow chart shown in FIG. 26.

When a changing magnification process is initiated by operating a zoom lever, zoom button or the like, whether it is necessary to retract the fourth lens group 14 is determined (step S11).

It is determined in the step S11 that the retract process for the fourth lens group is retracted if the fourth lens group 14 is disposed in a nearer position than a predetermined position in the changing magnification process from the telephoto to the wide angle.

Next, a direction of drive of the changing magnification is determined (step S12). If it is the changing magnification from the wide angle to the telephoto, the drive of the first and second lens groups 11 and 12 is initiated by operating the first and second frames DC motor 503 (step S13).

Next, whether the first and second lens groups 11 and 12 are stopped is determined (step S14).

It is determined in the step S14 that the first and second lens groups 11 and 12 are stopped in a case satisfying either one of conditions in which if a zoom driving switch operated by changing magnification manipulation through the zoom lever or zoom button or the like becomes off, if the first and second lens groups reach a position in front of a predetermined amount from the telephoto position in the drive from the wide angle to the telephoto, and if the first and second lens groups reach a position in front of a predetermined amount from the wide angle position in the drive from the telephoto to the wide angle.

If the first and second lens groups 11 and 12 are stopped, whether the third lens group 13 is driving is determined (step S15), if the third lens group 13 is stopping, the stopping operation of the first and second lens groups 11 and 12 is executed (step S16) and the breaking operation of the first and second lens groups 11 and 12 is executed (step S17).

Subsequently, the driving direction of the changing magnification is determined (step S18), if it is the changing magnification from the wide angle to the telephoto, drive for correcting a position of the third lens group 13 is achieved (step S19), the drive of the aperture stop is executed (step S20), and the process is completed and returned from the step S20 to a operating idle state.

In the step S11, if it is determined that the retract process of the fourth lens group 14 is required, the retract process of the fourth lens group 14 is executed (step S21), and the process is shifted from the step S21 to the step S12.

In the step S12, if it is determined the changing magnification driving direction is the changing magnification from the telephoto to the wide angle, the retract process of the third lens group 13 is executed (step S22), the process is shifted from the step S22 to the step S14.

In the step S14, if it is determined that the first and second lens groups 11 and 12 continue to drive without stopping them, whether the third lens group 13 is driving is determined (step S23), if the third lens group 13 is stopping, whether the drive of the third lens group 13 is initiated is determined (step S24).

It is determined in the step S24 that the drive of the third lens group 13 is permitted in a case satisfying one of conditions in which if the first and second lens groups 11 and 12 are driven more than the specified driven amount after the initiation of the drive of the first and second lens groups, if the position of the third lens group 13 is away a predetermined amount or more from the position of the first and second lens groups 11 and 12 when the first and second lens groups pass a predetermined zoom point in the driving state that the third lens group 13 is re-driven from the wide angle to the telephoto, and if the position of the third lens group 13 is approaching a predetermined amount or more to the position of the first and second lens groups 11 and 12 when the first and second lens groups pass the predetermined zoom point in the driving state that the third lens group 13 is re-driven from the telephoto to the wide angle.

In the step S24, if the drive of the third lens group 13 is permitted, the drive of the third lens group is initiated (step S25), the process is returned from the step S25 to the step S14. In the step S24, if the drive of the third lens group 13 is not permitted, the process is returned from the step S24 to the step S14 directly.

In the step S23, if it is determined that the third lens group 13 is driving, whether the drive of the third lens group 13 is stopped is determined (step S26).

It is determined in the step S26 that the third lens group 13 is permitted in a case satisfying one of conditions in which if the position of the third lens group 13 approaches a predetermined amount or more to the position of the first and second lens groups 11 and 12 in the drive from the wide angle to the telephoto, and if the position of the third lens group 13 is away a predetermined or more from the position of the first and second lens groups 11 and 12 in the drive from the telephoto to the wide angle.

In the step S26, if the stop of the third lens group 13 is permitted, the stop of the third lens group is initiated (step S27), the process is returned from the step S27 to the step S14. In the step S26, if the stop of the third lens group 13 is not permitted, the process is returned the step S26 to the step S14 directly.

In the step S15, if it is determined that the third lens group 13 is driving, the stop of the third lens group 13 is initiated (step S28), the process is shifted from the step S28 to the step S16.

In the step S18, if it is determined that the changing magnification driving direction is the changing magnification from the telephoto to the wide angle, a backlash operation is executed (step S29), the process is shifted from the step S29 to the step S19.

Next, the changing magnification operation according to the flow chart is explained in every direction of changing magnification in detail.

[From Wide Angle to Telephoto]

First, the changing magnification operation from the wide angle to the telephoto is explained referring to the timing chart shown in FIG. 27.

By pressing down the zoom button, which is in a telephoto mode, the telephoto switch signal changes from H to L, a variable sequence to the telephoto direction is initiated. Initially, a retract determination of the fourth lens group 14 is executed (step S11).

As described above, in the retract determination of the fourth lens group 14, the fourth lens group is retracted only if the following conditions (AND conditions) are satisfied simultaneously.

(1) Changing magnification drive from telephoto to the wide angle.

(2) The fourth lens group 14 is positioned in a nearer position to the subject or drawing out position away from a predetermined position or retracted threshold position.

However, because the above-mentioned conditions are not satisfied in the drive from the wide angle to the telephoto, the fourth lens group 14 is not retracted.

Next, the driving direction, whether the third lens group 13 is retracted is determined (step S12).

In the case of the changing magnification drive from the wide angle to the telephoto, the retracting drive of the third lens group 13 is not required.

The drive of the first and second lens groups 11 and 12 is initiated through the first and second frames DC motor 503 (step S13).

In an actuating period right after the initiation of actuation of the first and second frames DC motor 503, the drive voltage is set to be lower than the stationary voltage in order to prevent an incoming current by the first and second group DC motor.

After the actuating period is lapsed, the drive voltage is increased to the stationary voltage. The drive voltage between the wide angle and the telephoto is set to be lower than that between the collapsed position and wide angle position.

Since a higher speed is required between the stored and wide angle positions, a higher voltage is set and a suitable voltage setting is made between the wide angle and the telephoto to allow the first and second frames DC motor 503 to stop at a desired position by operation of the zoom button.

The control of the moved amount of the first and second lens groups 11 and 12 is achieved by counting the pulse-like signal or PI signal by the first and second frames photo-interrupter 509. The zoom points each of which is a control reference position are set in 17 points in which a distance between the wide angle and the telephoto is divided into 16 equally.

Next, whether the first and second lens groups 11 and 12 are stopped is determined (step S14).

In the determination for stopping the drive of the first and second lens groups 11 and 12, a stopping process is executed if either one of the following conditions (OR conditions) is satisfied.

(1) A telephoto zooming drive switch operated by the changing magnification operation through the zoom lever or zoom button or the like is turned off, in other words, changed from L to H.

(2) The first and second lens groups reach a position in front of the telephoto position when driving from the wide angle to the telephoto.

During the first and second lens groups 11 and 12 continue to drive, the determination of driving initiation/driving stop of the third lens group 13 is executed in response to the status (during driving or stopping) of the third lens group 13 (step S23).

If the third lens group 13 is stopping, the determination of drive initiation of the third lens group 13 is executed (step S24), if the initiation is permitted, the drive of the third lens group 13 is initiated.

In the step S24, the drive of the third lens group 13 is initiated if either one of the following conditions is satisfied.

(1) The first and second lens groups 11 and 12 are driven the specified driven amount or more after the initiation of the drive of the first and second lens groups.

(2) During the third lens group 13 is re-driving in the drive from the wide angle to the telephoto, the position of the third lens group 13 is away by a predetermined amount from the position of the first and second lens groups 11 and 12 when the first and second lens groups 11 and 12 pass a predetermined zoom point.

Moreover, if the third lens group is driving, whether the third lens group 13 is stopped is determined (step S26), if the stop is permitted, the drive of the third lens group 13 is stopped.

In the determination whether the third lens group 13 is stopped, the third lens group 13 is stopped if the following condition is satisfied: The position of the third lens group 13 is positioned closer than the predeterminate amount to the positions of the first and second lens groups 11 and 12 in the drive from the wide angle to the telephoto.

That is to say, the first and second lens group 11 and 12 are actuated, if the driven amount of the first and second lens groups 11 and 12 becomes the specified pulse or more, the drive of the third lens group 13 is initiated.

During simultaneous drive of the first, second and third lens groups, if the position of the third lens group 13 approaches by the predetermined amount to the position of the first and second lens groups 11 and 12, the drive of the third lens group 13 is stopped.

Thereafter, the first and second lens groups 11 and 12 are away from the third lens group 13, if they are away from the third lens group 13 by a predetermined amount, the drive of the third lens group 13 is re-started. The drive and stop of the third lens group 13 are repeated in response to a positional relationship among the first and second lens groups 11 and 12, and the third lens group 13.

Thereby, it is possible to achieve the changing magnification drive while maintaining a distance among the first, second and third lens groups 11, 12 and 13. When actuating these lens groups, the influence of the incoming current can be avoided by initiating the drive of the third lens group 13 after the drive of the specified amount or more is carried out, therefore it is possible to avoid the current from entering the first and second frames DC motor 503 and reduce the current consumption.

If the telephoto switch signal changes from L to H before the initiation of the initial drive of the third lens group 13, the stop of the first and second lens groups 11 and 12 is controlled without the simultaneous drive of the third lens group 13 therewith.

If the first and second lens groups 11 and 12 are stopped after the stop of them is determined, if the third lens group 13 is driving, the stop operation of the third lens group 13 is initiated. The stop of the first and second lens groups 11 and 12 is also initiated.

During the stop operation of the first and second lens groups 11 and 12, a lower speed control period is set, and the drive voltage of the first and second frames DC motor 503 is lowered depending on a residual pulse number to a target position.

Thereby, the overrun amount of the first and second lens groups when reaching the target position is decreased. If the first and second lens groups reach the target position by counting the PI signal by the first and second frames photo-interrupter 509, a breaking operation is executed in order to stop the drive of the first and second lens groups 11 and 12.

A final position of the first and second lens groups 11 and 12 is determined by further counting the overrun amount during the period of breaking.

After the first and second lens groups 11 and 12 are stopped, a correction drive for the position of the third lens group 13 is executed.

This is configured to compute the stopping position of the third lens group 13 corresponding to the final stopping position of the first and second lens groups 11 and 12 and drive the third lens group 13 to the stopping position.

A target stopping position of the third lens group 13 corresponding to the stopping position of the first and second lens groups 11 and 12 is computed from the positional information of the first and second lens groups for every zoom point and the positional information of the third lens group 13 for every zoom point.

Thereafter, the drive of the aperture stop is achieved to set a position of the aperture stop corresponding to the stopped zoom position of the third lens group 13 (step S20).

[From the Telephoto to the Wide Angle]

Next, a changing magnification operation from the telephoto to the wide angle is described with reference to the timing chart shown in FIG. 28.

By pressing down the zoom button, which is in a wide angle mode, the wide angle switch signal changes from H to L, a variable sequence with respect to the wide angle direction is initiated. Initially, a retraction determination of the fourth lens group 14 is executed.

As described above, in the retire determination of the fourth lens group 14, the fourth lens group is retired only if the following conditions (AND conditions) are satisfied simultaneously.

(1) Changing magnification drive from telephoto to the wide angle.

(2) The fourth lens group 14 is positioned in a closer position to the subject or drawing out position away from a predetermined position or retracted position threshold.

If the position of the fourth lens group 14 is in the closer position than the predetermined position when driving from the telephoto to the wide angle. The retract amount is set to a range in which the third lens group 13 does not interfere with the fourth lens group 14 in the variable operation of the third lens group 13.

Next, the third lens group 13 is retracted. In order to prevent the interference of the third lens group with the first and second lens groups 11 and 12 depending on the drive of the first and second lens groups 11 and 12, the third lens group 13 is driven previously by the specified amount.

The drive of the first and second lens groups 11 and 12 is then initiated through the first and second frames DC motor 503.

As described above, in the actuating period right after the initiation of actuation of the first and second frames DC motor 503, the drive voltage is set to be lower than the stationary voltage in order to prevent the incoming current by the first and second group DC motor. After the actuating period is lapsed, the drive voltage is increased to the stationary voltage.

The control of the moved amount of the first and second lens groups 11 and 12 is achieved by counting the pulse-like signal or PI signal by the first and second frames photo-interrupter 509.

As described above, the zoom points, each of which is a control reference position, are set in 17 points in which a distance between the wide angle and the telephoto is divided into 16 equally.

In the determination for stopping the drive of the first and second lens groups 11 and 12, the stopping process is executed if either one of the following conditions (OR conditions) is satisfied as described above.

(1) A telephoto zoom drive switch operated by the changing magnification operation through the zoom lever or zoom button or the like is turned off, in other words, changed from L to H.

(2) The first and second lens groups 11 and 12 reach a position in front of the telephoto position when driving from the telephoto to the wide angle.

During the first and second lens groups 11 and 12 continue to drive, the determination of driving initiation/stop of the third lens group 13 is executed in response to the status (during driving or stopping) of the third lens group 13.

If the third lens group 13 is in stopping, the determination for the initiation of drive of the third lens group 13 is executed, if the initiation is permitted, the drive of the third lens group 13 is initiated.

In the determination for initiating the drive of the third lens group 13, the drive of the third lens group 13 is initiated if either one of the following conditions is satisfied.

(1) The first and second lens groups 11 and 12 are driven the specified driven amount or more after the initiation of the drive of the first and second lens groups 11 and 12.

(2) During the third lens group 13 is re-driving in the drive from the telephoto to the wide angle, the position of the third lens group 13 approaches by a predetermined amount to the position of the first and second lens groups 11 and 12 when the first and second lens groups 11 and 12 pass the predetermined zoom point.

Moreover, if the third lens group 13 is driving, the determination for stopping the drive of the third lens group 13 is executed, if the stop is permitted, the drive of the third lens group 13 is stopped.

In the determination whether the third lens group 13 is stopped, the third lens group 13 is stopped if the following condition is satisfied: The position of the third lens group 13 is away the predetermine amount or more from the position of the first and second lens groups 11 and 12 in the drive from the telephoto to the wide angle.

That is to say, the first and second lens group 11 and 12 are actuated, if the driven amount of the first and second lens groups 11 and 12 becomes the specified amount or more, the drive of the third lens group 13 is initiated.

During simultaneous drive of the first, second and third lens groups 11, 12 and 13, if the position of the third lens group 13 is away the predetermined amount from the position of the first and second lens groups 11 and 12, the drive of the third lens group 13 is stopped.

Thereafter, the first and second lens groups 11 and 12 approach to the third lens group 13, if they approach to the third lens group 13 the specified amount or more, the drive of the third lens group 13 is re-started.

The drive and stop of the third lens group 13 are repeated in response to a positional relationship among the first and second lens groups 11 and 12, and the third lens group 13.

Thereby, it is possible to achieve the changing magnification drive while maintaining a distance among the first, second, and third lens groups 11, 12, and 13.

In actuating these lens groups, the influence of the incoming current of the first and second frames DC motor 503 can be avoided by initiating the drive of the third lens group 13 after the specified pulse or more is counted, therefore the current consumption is reduced.

When the third lens group 13 is driven to the wide angle direction, during the drive of the first and second lens groups 11 and 12, basically a control for eliminating a backlash in the movement of the third lens group 13 is required when it is stopped, but the control is not carried out during the changing magnification operation to accomplish a smooth movement of the third lens group.

If the wide angle SW signal changes from L to H before the initiation of the initial drive of the third lens group 13, the stop of the first and second lens groups 11 and 12 is controlled without the simultaneous drive of the third lens group 13 therewith.

If the first and second lens groups 11 and 12 are stopped after the stop of them is determined, if the third lens group 13 is driving, the stop operation of the third lens group 13 is initiated. The stop of the first and second lens groups 11 and 12 is also initiated.

During the stop operation of the first and second lens groups 11 and 12, a lower speed control period is set, and the drive voltage of the first and second frames DC motor 503 is lowered depending on a residual pulse number to a target position.

Thereby, the overrun amount of the first and second lens groups when reaching the target position is decreased.

If the first and second lens groups reach the target position by counting the PI signal by the first and second frames photo-interrupter 509, a breaking operation is executed in order to stop the drive of the first and second lens groups 11 and 12.

A final position of the first and second lens groups 11 and 12 is determined by further counting the overrun amount during the period of breaking.

Furthermore, a control for eliminating a backlash of the first and second lens groups 11 and 12 is executed in the movement from the telephoto to the wide angle thereof.

After the first and second lens groups 11 and 12 are stopped, a correction drive for the position of the third lens group 13 is executed.

This is configured to compute the stopping position of the third lens group 13 corresponding to the final stopping position of the first and second lens groups 11 and 12 and drive the third lens group 13 to the stopping position.

A target stopping position of the third lens group 13 corresponding to the stopping position of the first and second lens groups 11 and 12 is computed interpolatively from the positional information of the first and second lens groups every the zoom point and the positional information of the third lens group 13 every the zoom point.

In the drive in the wide angular direction of the third lens group 13, the control for eliminating the backlash of the third lens group 13 is executed after it is stopped.

Thereafter, the drive of the aperture stop is achieved so that the aperture stop is disposed in a position corresponding to the stopped zoom position of the third lens group 13.

In this example, the drive voltage of the first and second frames DC motor 503 when it is driven in the wide angle direction is set to be higher than that in the telephoto direction in the changing magnification operation between the wide angle and the telephoto.

The pulse rate of the third frame pulse motor 507 in the wide angular direction is set to be faster than that in the telephoto direction. An intermittent control for the third lens group 13 is accomplished based on the positional relationship among the first, second, and third lens groups 11, 12, and 13 in order to maintain the distance among the first, second and third lens groups 11, 12, and 13.

Therefore, the drive speed of the third lens group 13 is set to be the same as or faster than the drive speed of the first and second lens groups 11 and 12, in the movement in the telephoto direction.

Similarly, the drive speed of the third lens group 13 is set to be the same as or faster than the drive speed of the first and second lens groups 11 and 12, in the movement in the wide angle direction.

With such a structure, the third lens group 13 is driven so that the third lens group 13 is not away a predetermined amount or more from the first and second lens groups 11 and 12 in the movement in the telephoto direction, and does not contact with the first and second lens groups 11 and 12 in the movement in the wide angle direction.

Moreover, although the driving re-start timing of the third lens group 13 is set at the time of passing the predetermined zoom point in this example, the timing may be set every the time of detecting the pulse-like signal or PI signal by the first and second frames photo-interrupter 509 generating in driving the first and second lens groups 11 and 12, or every a predetermined count number of the PI signal.

Thereby, it is possible to accomplish a further fine intermittent control of the third lens group 13 and improve accuracy of the distance among the first, second and third lens groups.

As shown in FIG. 9, the solid-state image-sensing device 16 comprising a CCD (charge-coupled device) or the like is disposed adjacent to the side of an image forming plane of the fourth lens group 14. The inputting surface of the solid-state image-sensing device 16 is configured to form the subject image.

Referring to FIG. 9, the first lens group 11 is attached to the first frame 17, and the cover glass 18 and the low-pass filter 19 are disposed adjacent to an image-receiving surface of the solid-state image-sensing device 16, if needed.

The lens barrier 62 shown in FIG. 3 to FIG. 5 is disposed to cover a side of the first lens group 11 facing the subject, in the collapsed state, and protects the lens group from contaminations or damages.

The lens barrier 62 is moved in back and forth directions transverse to the optical axis by the barrier drive system 63. FIGS. 3 and 4 show a state in which the lens barrier 62 is closed, and FIG. 5 shows a state in which the lens barrier 62 is almost opened.

Figure 17A:
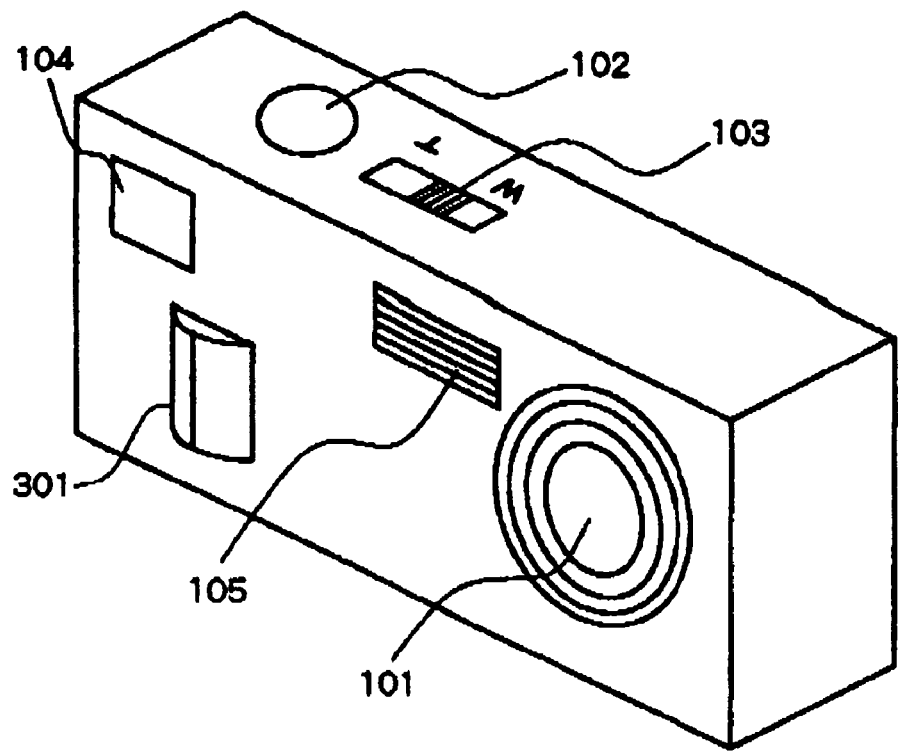
FIG. 17A is a perspective view schematically showing an exterior appearance of a digital camera according to the present invention wherein a photographing lens is collapsed in a body of the digital camera as viewed from the subject.

The barrier drive system 63 drives the lens barrier 62 between the closed position (FIGS. 3 and 4) and the opened position (a position farther from the optical axis than the position shown in FIG. 5) through the operation of a barrier-operating element (see a barrier-operating element 301 in FIG. 17A).

The barrier drive system 63 has a function to bias the lens barrier 62 in a closing direction at the closed position and in an opening direction at the opened position.

Therefore, when driving the lens barrier 62 in the closed state toward the opening direction, the lens barrier 62 is moved to the opened state semi-automatically when the lens barrier 62 passes a predetermined position.

Also, when an attempt is made to close the lens barrier 62 from the opened state, the lens barrier 62 is moved to the closed state semi-automatically when the lens barrier 62 passes a predetermined position.

The position in the closed state is not necessarily required to be the same as the predetermined position in the opened state, rather, it is preferable that the lens barrier has a certain degree of hysteresis characteristics in the movement to accomplish a smooth operation of the lens barrier 62.

The barrier control strip 61 is provided on a side of the fixed frame 21 in the direction of opening the lens barrier 62 so as to be capable of sliding in a direction along the optical axis, and is biased toward the subject by a spring or the like as needed.

In the collapsed state, an engaging portion of the barrier control strip 61 which is formed into a bent shape engages with base edge surfaces of the first rotary cylinder 22 and the first liner 23 and is biased toward the image surface against a biasing force of the spring, and hence is not in contact with the lens barrier 62.

In the photographing state, the lens barrier 62 is completely away from the respective lens groups and retaining frames thereof. In this state, engagement of the engaging portion of the barrier control strip 61 is released, and hence the barrier control strip 61 is biased toward the subject by the biasing force, and then, a barrier-intercepting portion at the distal end enters into a passage of the lens barrier 62.

In this state, when the lens barrier 62 is rapidly operated to move the lens barrel to the collapsed position, there is a possibility that the lens barrier 62 hits against the lens barrel.

However, since the barrier-intercepting portion at the distal end of the barrier control strip 61 crosses the passage of the lens barrier 62 to prevent the lens barrier 62 from entering into a moving passage of the lens barrel.

When the respective lens groups are stored and the collasped state is completed, the base edge surfaces of the first rotary cylinder 22 and the first liner 23 engage with the engaging portion of the barrier control strip 61, which is formed into the bent shape, to energize the engaging portion toward the image surface against the biasing force.

Therefore, the lens barrier 62 can be moved to the front portion of the lens barrel, and hence the lens barrier 62 is correctly set to the closed position. In this manner, the interference between the lens barrier 62 and the lens cylinders retaining the lens groups can be effectively prevented.

In the above-mentioned embodiments, the structure in which the third lens group 13 can be retracted out of the optical axis has been described.

In this structure, the retracted third lens group has the minimum outer diameter. When the third lens group having the minimum outer diameter is retracted, a projective size of the lens barrel in which the third lens group is retracted can be minimized efficiently, and the thickness of the lens barrel can be reduced.

Moreover, when the retracted lens is extended out of the fixed frame, a length of the device (at least one of the optical axis and the lead screw) for driving the retracted lens group or the third lens group is minimized by taking a structure such that the retracted lens is not way from the imaging plane possibly.

Because the retract lens group or the third lens group 13 is disposed behind and adjacent the shutter having the aperture stop function, the diameter of the lens barrel is less, and the retraction of the third lens group is simplified without considering the interference of the shutter with the lens group unit and separating the position of the shutter from the lens cylinder unit, excessively.

The first lens group 11 has a positive power, the second lens group 12 has a negative power, the third lens group 13 has a positive power, and the fourth lens group 14 has a positive power.

A changing magnification operation is achieved by changing at least one of intervals between the first and second lens groups 11 and 12, between the second and third lens groups 12 and 13, and between the third and fourth lens groups 13 and 14.

A focusing operation is achieved by moving the fourth lens group 14 along the optical axis. The shutter having the function of the aperture stop is positioned in front of the third lens group 13. The four lens groups are provided in the lens cylinder unit.

Because the third lens group having the minimum outer diameter is retracted out of the lens cylinder unit without separating from the image plane excessively, the retraction of the third lens group 13 can be accomplished with the minimum movement and the outer diameter of the lens barrel can be minimized.

In addition, the thickness of the lens barrel is decreased by retraction of at least one lens group.

Furthermore, it is possible to provide a compact lens barrel having a high changing magnification ratio, 4 times or more.

Meanwhile, the lens groups may be structured from a first lens group having a positive power, a second lens group having a negative power, and a third lens group having a positive power, and the third lens group may be retracted.

Alternatively, the lens groups may be structured by a first lens group having a negative power, a second lens group having a positive power, and a third lens group having a positive power, and the second lens group or the third lens group may be retracted. Each of the lens groups may be structured from one or more lenses, and the lens groups herein indicate integral one or more lenses.

Therefore, all the lens groups may be structured by one lens, respectively.

Figure 17B:
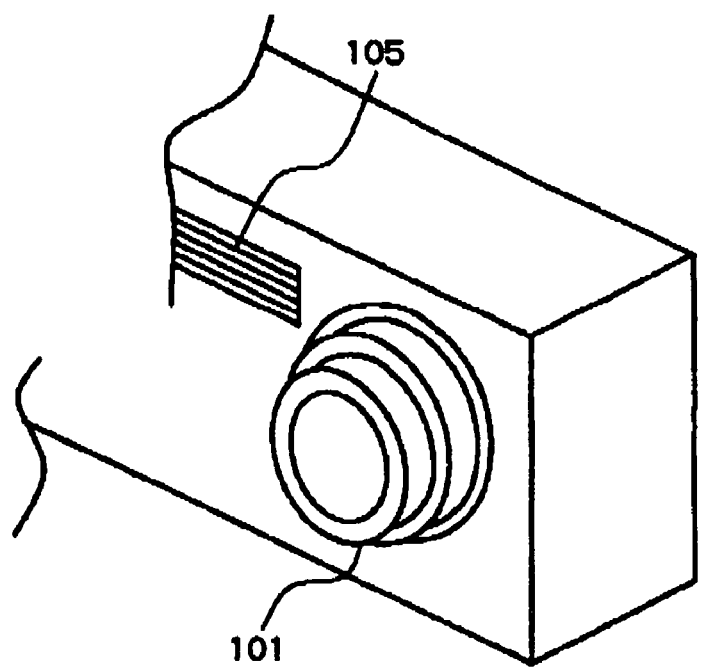
FIG. 17B is a perspective view schematically showing the exterior appearance of the digital camera according to the present invention wherein the photographing lens is projected or extended from the digital camera body as viewed from the subject.
Figure 18:
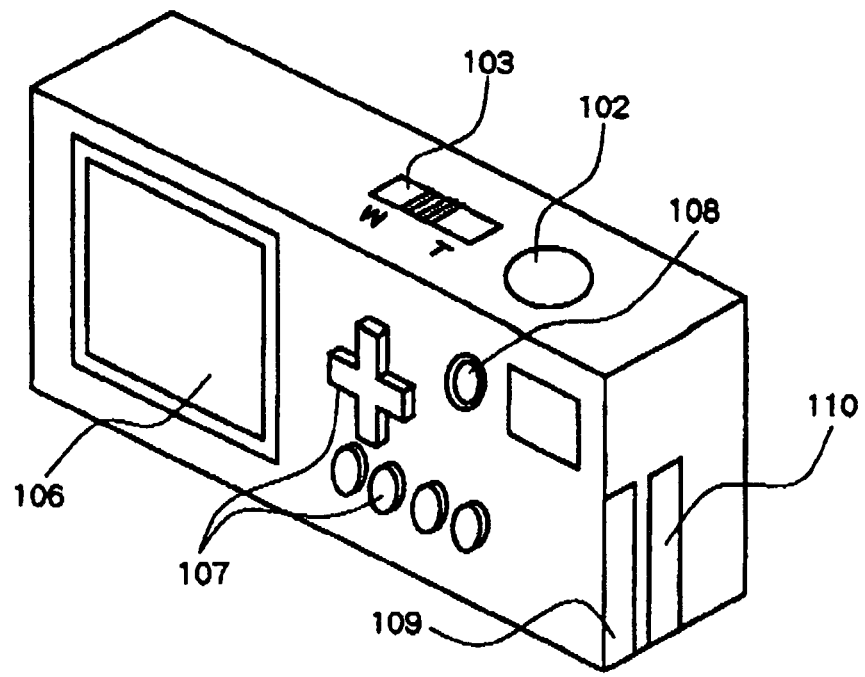
FIG. 18 is a perspective view schematically showing the exterior appearance and structure of the digital camera of FIG. 17 as viewed from a photographer.
Figure 19:
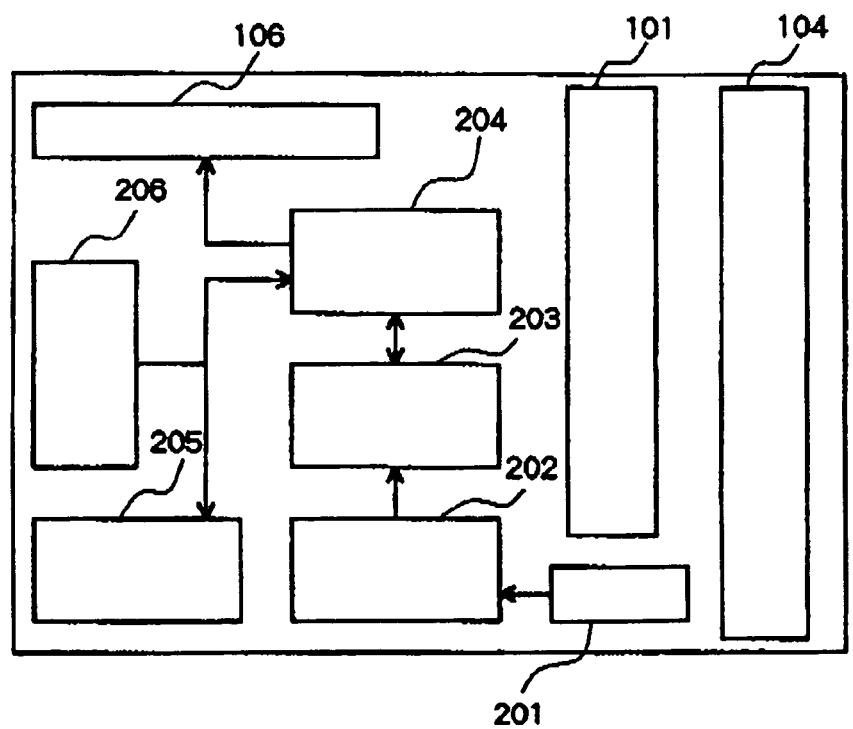
FIG. 19 is a block diagram schematically showing a functional structure of the digital camera.

Referring now to FIG. 17 to FIG. 19, a camera including an optical system device having the lens barrel according to the present invention as shown in the first embodiment will be described.

FIG. 17 shows an exterior appearance of a camera as viewed from the subject.

FIG. 18 schematically shows the exterior appearance and structure of the camera of FIGS. 17A and 17B as viewed from a photographer.

FIG. 19 is a block diagram schematically showing a functional structure of the camera.

Although the lens barrel is applied to the camera here, the lens barrel is also used to a portable information terminal such as so-called PDA (Personal Data Assistant) or a mobile phone, having a camera function or functional part installed therein.

Many of such portable information terminals have the function and the structure substantially identical to that of the camera, although the appearance is slightly different, and hence the optical system device including the lens barrel according to the present invention may be employed in such mobile information terminals.

As shown in FIG. 17 and FIG. 18, the camera includes an image pickup lens 101, a shutter button 102, a zoom lever 103, a finder 104, a strobe light 105, a liquid crystal display (LCD) 106, an operating button 107, a power switch 108, a memory card slot 109, an expansion card slot 110, the barrier-operating element 301 and so on.

Furthermore, as shown in FIG. 19, the camera also includes a photo-detector 201, a signal-processing unit 202, an image-processing unit 203, a central processing unit (CPU) 204, a semiconductor memory 205, and an expansion card 206. Although it is not shown clearly, electric power is supplied from a battery as an electric source to the above-mentioned parts to operate the parts.

The photo-detector 201 serves as an area sensor such as a CCD (charge coupled device) image pickup element or the like to read an image of a subject to be photographed, that is, of an photographing subject, formed by the image pickup lens 101, which is a photographing optical system.

As the image pickup lens 101, the optical system device including the lens barrel according to the present invention as described in the above embodiment is employed.

More specifically, the optical system device includes a plurality lens groups as optical elements and a telephoto cylinder unit retaining the lens groups, which constitute the lens barrel.

The lens barrel has a mechanism of retaining the respective lens groups in the lens cylinder such that the lens groups can be moved in response to the movement of the lens cylinder along the optical axis of the lens groups, similarly to the above-mentioned embodiment. The image pickup lens 101 to be integrated in the camera is generally integrated in the form of this optical system device.

An output from the photo-detector 201 is processed by the signal-processing unit 202, which is controlled by the central processing unit 204, and is converted into digital image information.

The image information digitized by the signal-processing unit 202 is subjected to a predetermined image processing in the image-processing unit 203 which is also controlled by the central processing unit 204, and then stored in the semiconductor memory 205 such as a non-volatile memory.

In this case, the semiconductor memory 205 may be a memory card inserted in the memory card slot 109, or may be a semiconductor memory integrated in a body of the camera.

The liquid crystal display 106 may display the photographing image or may display the image stored in the semiconductor memory 205.

An image stored in the semiconductor memory 205 can be transmitted to the outside of the camera via the expansion card 206 inserted in the expansion card slot 110.

Meanwhile, the above-mentioned central processing unit (CPU) 501 shown in FIG. 21 to control the drive of the lens groups may be included in the central processing unit 204, otherwise structured by use of other micro-processor connecting with the unit 501.

The image pickup lens 101 is embedded within the camera body into a collapsed or stored state as shown in FIG. 17A when being transported, and the lens barrier 62 is also into a closed state.

When a user operates the barrier-operating element 301 and opens the lens barrier 62, the power is turned on and the lens barrel is moved from the closed position to an opened position and projected from the camera body as shown in FIG. 17B, so that the photographing state is established.

At this time, the image pickup lens 101 within the lens barrel is set so that the respective lens groups of the optical systems constituting a zoom lens are arranged, for example, at a short focal length wide angle position.

When the zoom lever 103 is operated, the arrangement of the respective lens groups in the optical system is changed through the movement of the lens groups along the optical axis, therefore, the zoom can be varied to the telephoto position.

Preferably, an optical system of the finder 104 is configured such that the zooming is varied in association with the change of the field angle of the image pickup lens 101.

In many cases, focusing is achieved by half-pressing operation of the shutter button 102.

The focusing with the zoom lens in the lens barrel according to the present invention is achieved mainly by moving the fourth lens group 14. When the shutter button 102 is further pressed to a completely pressed state, the photographing is achieved, and subsequently the processing as described above is performed.

In order to display the image stored in the semiconductor memory 205 on the liquid crystal display 106 or transmit the same to the outside of the camera via the expansion card 206, the operating button 107 is operated in a predetermined manner.

The semiconductor memory 205 and the communication card 206 or the like are used by being inserted in a specific or multi-purpose slot such as the memory card slot 109 and the communication car slot 110.

When the image pickup lens 101 is in the stored state, the third lens group 13 is retracted out of the optical axis, and hence is collapsed in a line with the first lens group 11 and the second lens group 12 in a juxtaposed manner. Therefore, further reduction in thickness of the camera is achieved.

Generally, because a finder mechanism is disposed above of the lens barrel, therefore, certain camera operation is easy.

Moreover, if the lens barrel includes a zoom changing magnification mechanism, because the finder mechanism also needs the zoom changing magnification mechanism, it is preferable that a drive source (DC motor, pulse motor or the like) for conducting the zoom changing magnification operation and a transmission mechanism (gear connecting mechanism or the like) for transferring a driving force of the drive source to the lens groups are disposed adjacent the finder mechanism.

For example, if the finder mechanism is disposed on upper and left position of the lens barrel, the drive source and the transmission mechanism are disposed adjacent the upper and left position of the lens barrel to use a limited space effectively. When the retaining frame is retracted, the retaining frame is collapsed below the lens barrel in consideration of the left space.

The space is lower and right position or lower and left position of the lens barrel. In the embodiment, the space is disposed on the lower and right position of the lens barrel to collapse the retaining frame of the retracted third lens group.

The above-mentioned storage part of the fixed lens cylinder is disposed at the position. The drive source and the transmission mechanism for driving the lens groups are disposed at the lower and left position.

As a result, a miniaturized lens barrel can be accomplished with effective use of fourth corners, the upper and left position, the upper and right position, the lower and right position, and the lower and left position of a usual circular lens barrel.

Figure 29:
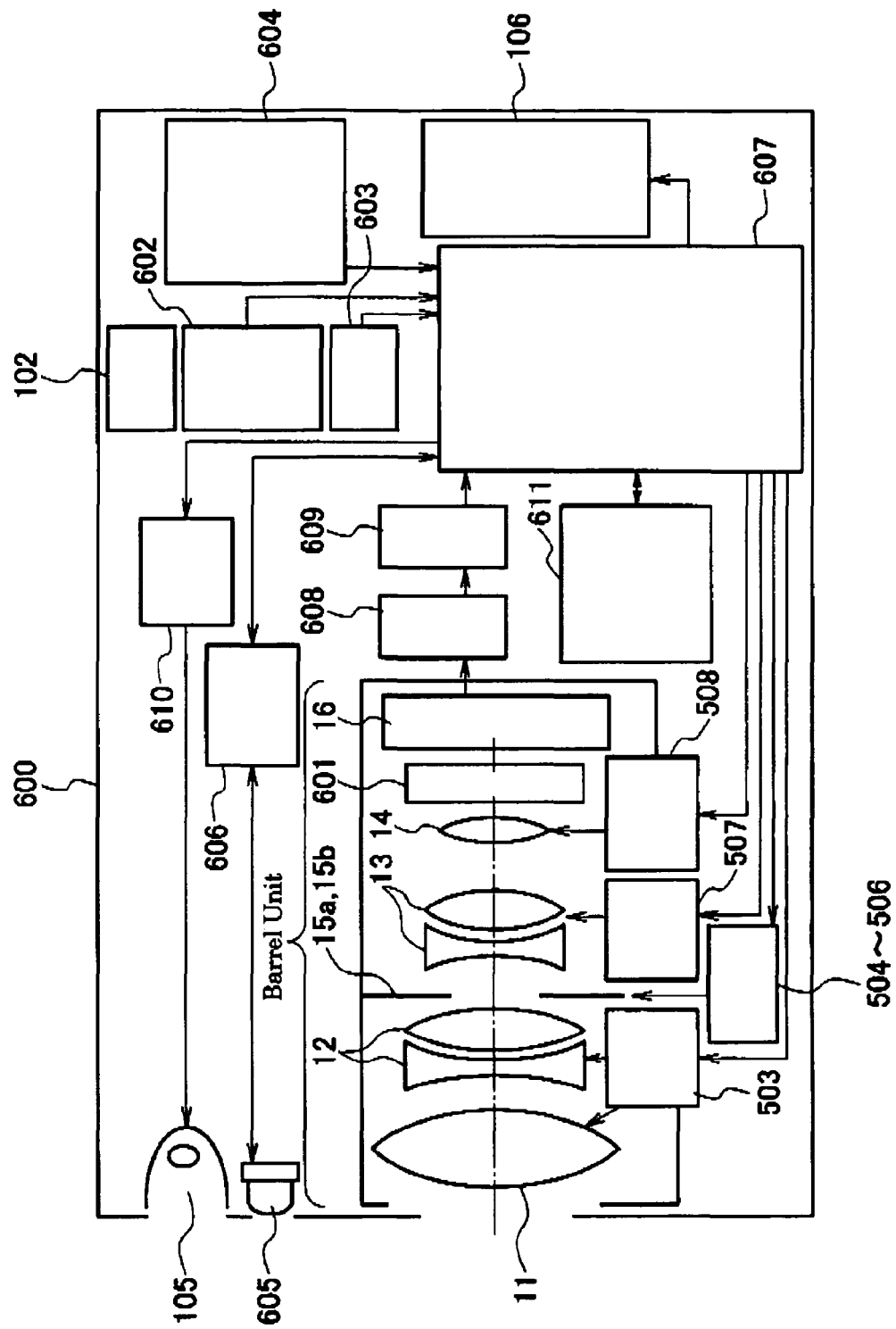
FIG. 29 is a view showing an internal configuration of the digital camera.

Hereinafter, the characteristic part of the present embodiment will be described, FIG. 29 is a view schematically showing a configuration of a digital camera 600 according to the present embodiment. The camera 600 has the lens barrel wherein there are provided with the first lens group 11, the second lens group 12, the third lens group 13 and the fourth lens group 14.

Furthermore, the lens barrel is also provided with shutter 15b/aperture 15a, the solid-state image-sensing device 16 and LPF 601.

The digital camera 600 is disposed with the first and second frames DC motor 503 which is the driving system for the first lens group 11 and the second lens group 12, the first and second aperture stop driving motors 504 and 505, the shutter motor 506 which is the driving system for the shutter 15b, the third frame driving motor 507 which is the driving system for the third lens group 13, the fourth frame pulse motor 508 which is the driving system for the fourth lens group 14.

Moreover, the digital camera 600 is disposed with the shutter button 102, a half-pressed detecting section 602, a full-pressed detecting section 603, a camera operating section 604, a distance sensor 605, a distance sensor controlling section 606 and a system controller 607.

Detecting signals or operating signals from the half-pressed detecting section 602, the full-pressed detecting section 603, the camera operating section 604, the distance sensor 605 and the distance sensor controlling section 606 are inputted into the system controller 607.

An A/D converter 608 and a image processing section 609, which is connected with the solid-state image-sensing device 16, are connected to the system controller 607 and image signals from the image processing section 609 are also inputted into the system controller 607.

Furthermore, the digital camera 600 is also disposed with the strobe light 105, a strobe controlling section 610, the liquid crystal display 106 and memory set 611.

The strobe light 105 and the liquid crystal display 106 are controlled according to signals from the system controller 607. The driving system 503-508 described above are also controlled by the signals from the system controller 607.

FIG. 31 is a view showing a state of an image quality balance between a central part and the surroundings of an image (MTF) relative to a photographing distance in a conventional technique, FIG. 32 is a view showing a state of an image quality balance between a central part and the surroundings of an image (MTF) relative to a photographing distance in the present invention.

In addition, in FIGS. 31A to 31D and 32A to 32D, graphs on the left side represent the sectional view of the upper half of the lens barrel, and graphs on the right side represent views showing variation of the image quality balance from the central part to the surroundings (MTF) with the lens groups of the lens barrel at the position showing on the left, respectively, wherein a horizontal axis represents a position on the image, 0Y and 1Y represent the central part and the surroundings of the image, respectively. The vertical graph axes of FIGS. 31A to 31D and 32A to 32D represent MTF, wherein the greater the value of MTF, the better the quality of the image.

In FIGS. 31A to 31D and 32A to 32D, the first lens group 11 and the second lens group 12 makes up a first lens set, the third lens group 13 makes up a second lens set and the fourth lens group 14 which is the focusing lens group makes up a third lens set.

Conventionally, as shown in FIGS. 31A to 31D, an interval N between the shutter/aperture stop unit 15 and the third lens group 13, which is also the same as that between the second lens group 12 and the third lens group 13, is a fixed value irrespective of the photographing distance.

Figure 31A:
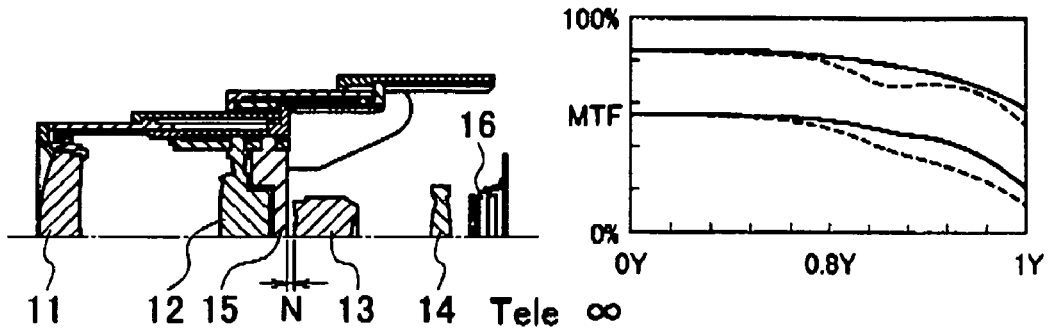
FIG. 31A is a view showing characteristics of MTF without a floating control when Tele is infinite.
Figure 31B:
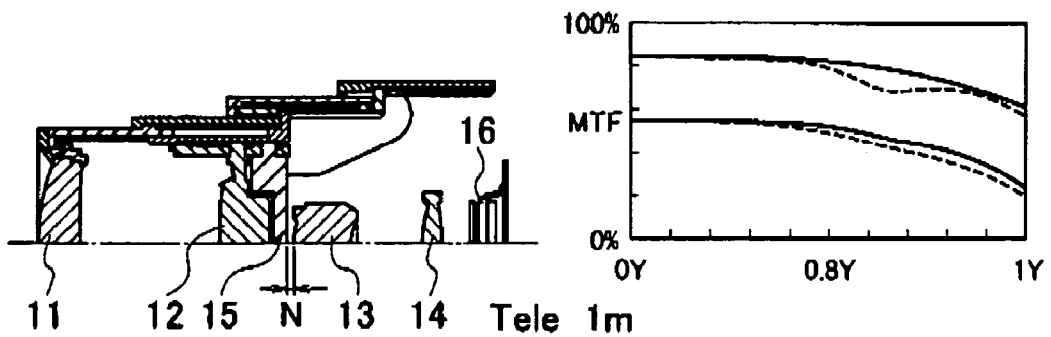
FIG. 31B is a view showing characteristics of MTF without the floating control when Tele is 1 m.
Figure 31C:
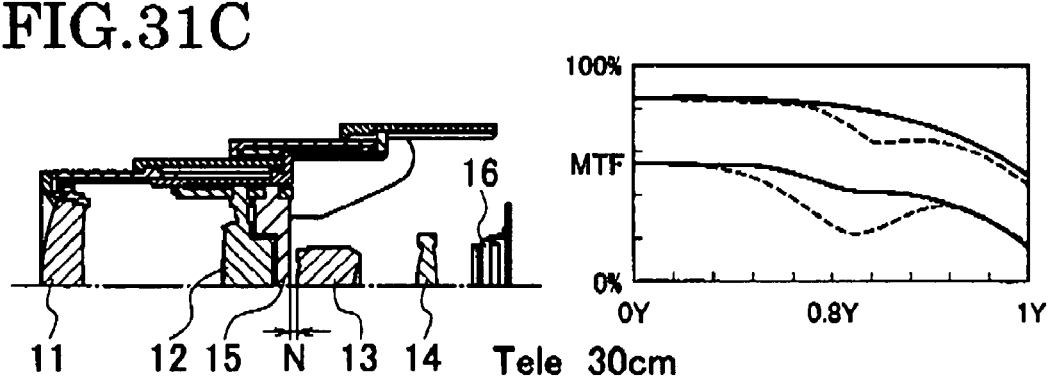
FIG. 31C is a view showing characteristics of MTF without the floating control when Tele is 30 cm.
Figure 31D:
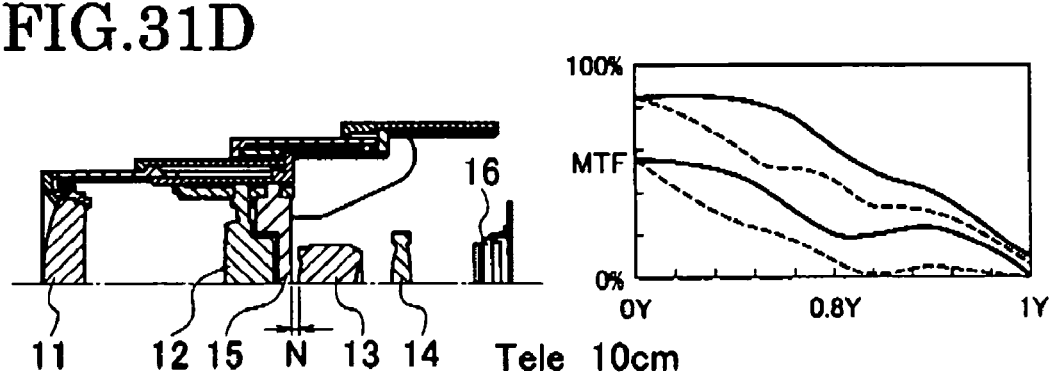
FIG. 31D is a view showing characteristics of MTF without the floating control when Tele is 10 cm.

Thus, when the photographing distance is a longer distance (Tele is infinite or 1 m), the MTF on the surroundings of the image is not really decreased as shown in FIGS. 31A and 31B, while the photographing distance is a shorter distance (Tele is 30 cm or 10 cm), the MTF on the surroundings of the image is largely decreased as shown in FIGS. 31C and 31D.

In the graphs on the right side, the upper lines and the lower lines represent low wave components and high wave components, respectively.

Figure 32A:
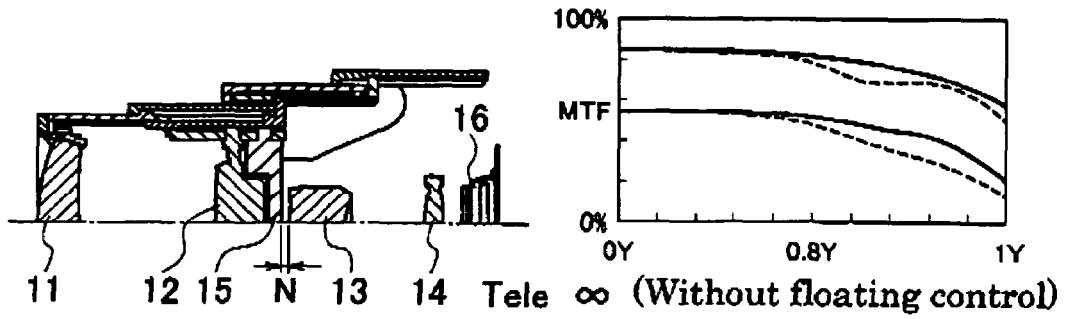
FIG. 32A is a view showing characteristics of MTF with the floating control when Tele is infinite.
Figure 32B:
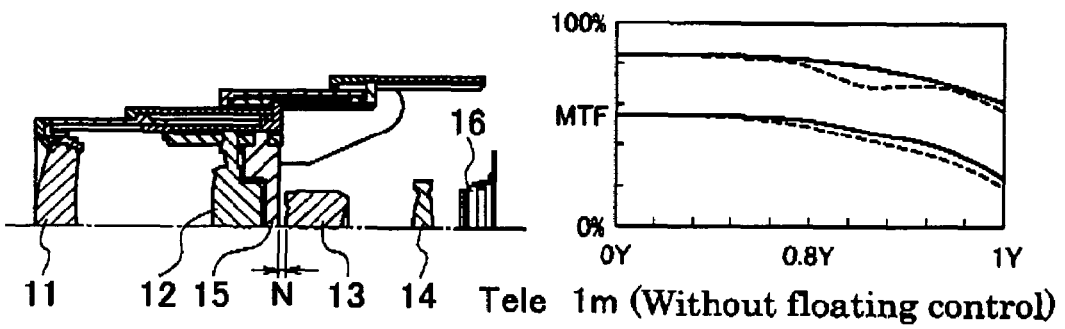
FIG. 32B is a view showing characteristics of MTF without the floating control when Tele is 1 m.
Figure 32C:
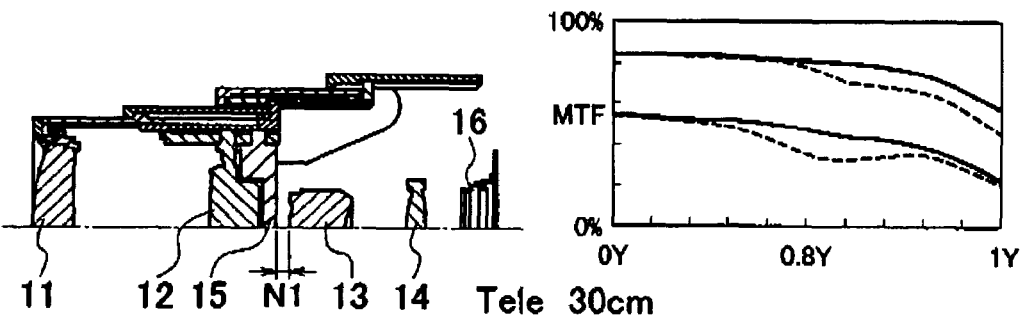
FIG. 32C is a view showing characteristics of MTF without the floating control when Tele is 30 cm.

Correspondingly, in the present embodiment, although the interval N between the shutter/aperture stop unit 15 and the third lens group 13, which is also the same as that between the second lens group 12 and the third lens group 13, is a fixed value irrespective of the photographing distance as shown in FIGS. 31A to 31B, when the photographing distance is a shorter distance (Tele is 30 cm), the interval N between the shutter/aperture stop unit 15 and the third lens group 13 is set as N1 (N1>N) as shown in FIG. 32C, and when the photographing distance is a further shorter distance (Tele is 10 cm), the interval N between the shutter/aperture stop unit 15 and the third lens group 13 is set as N2 (N2>N1).

Figure 32D:
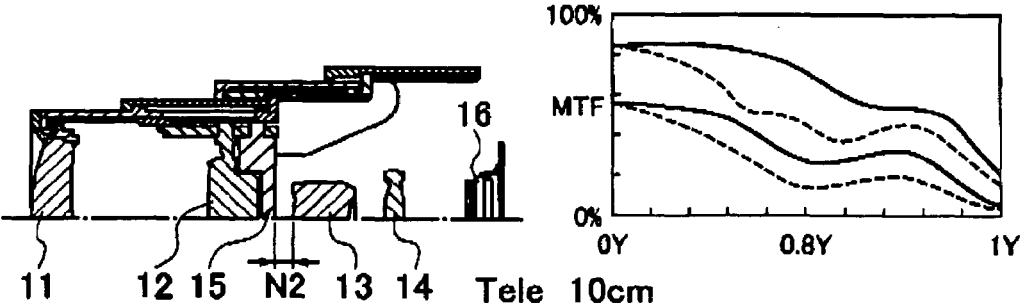
FIG. 32D is a view showing characteristics of MTF without the floating control when Tele is 10 cm.

Thus, when the interval between the shutter/aperture stop unit 15 and the third lens group 13, which is also the same as that between the second lens group 12 and the third lens group 13, changes, the MTF on the surroundings of the image is not really decreased as shown in FIG. 32C and 32D, therefore it is possible to obtain the photographing image of a relatively good image quality.

Operation concerning setting the interval between the shutter/aperture stop unit 15 and the third lens group 13 as N1 or N2 is performed by moving the third lens group 13 along the optical axis. It is also preferable to move the shutter/aperture stop unit 15 relatively.

Figure 33:
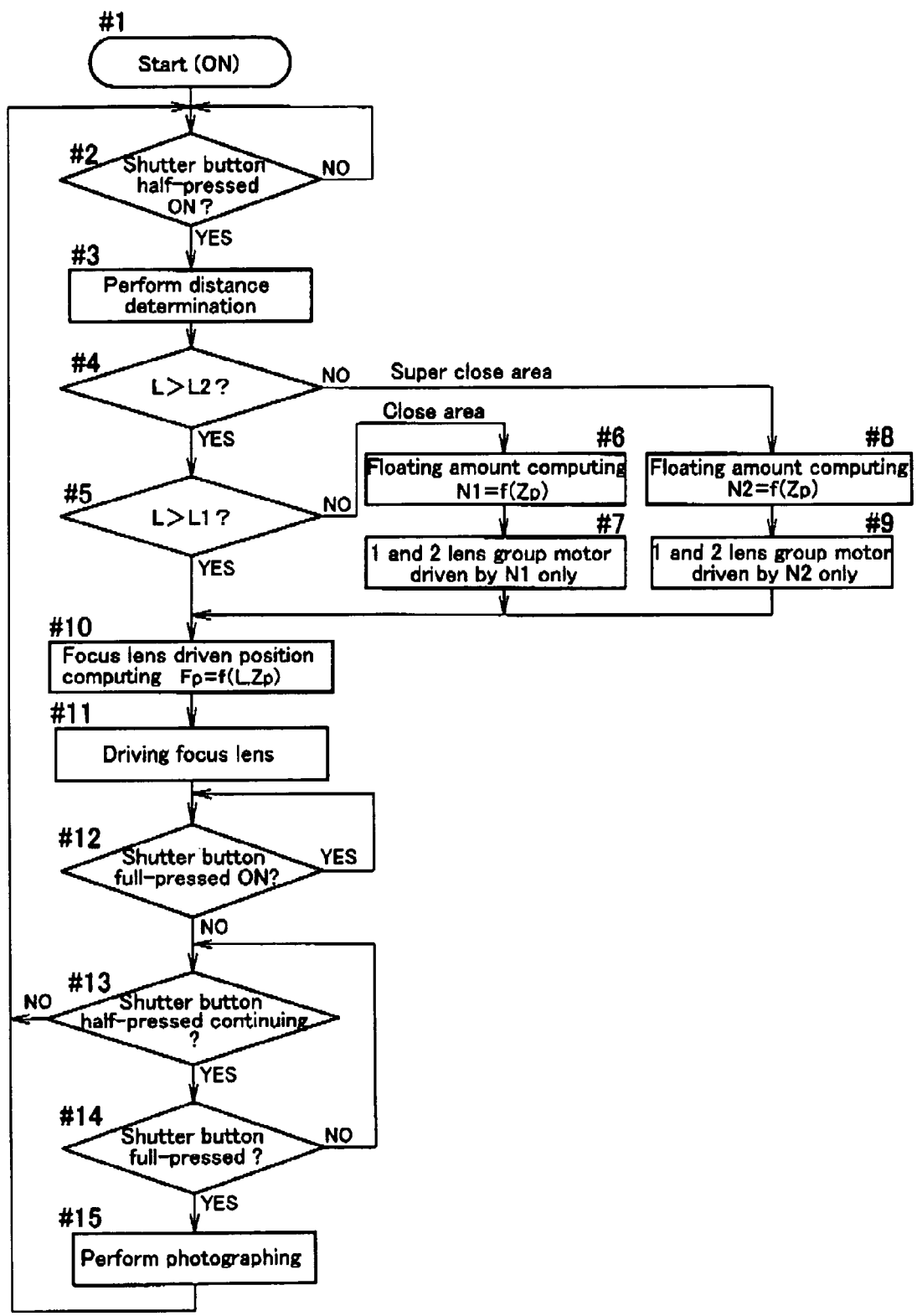
FIG. 33 is a view showing an operation flow of the digital camera according to the embodiment 1.

FIG. 33 is a view showing an operation flow of the digital camera 600 according to the present embodiment. Electrical power is ON at step #1, the half-pressed detecting section 602 detects if the shutter button 102 is on a half-pressed state at step #2. When the shutter button 102 is on the half-pressed state, the distance sensor 605 determines a distance to the subject on step #3.

In order to divide the distance to the subject into 3 parts, specific distances L1 and L2 (L1>L2) are pre-defined and the distance to the subject determined by the distance sensor 605 is set as L.

Thus, whether L>L2 is determined at step #4, if it is a Yes the operation flow moves to step #5, if it is a No the distance L belongs to a super close area and the operation flow moves to step #8. Also, whether L>L1 is determined at step #5, if it is a Yes the operation flow moves to step #10, if it is a No the distance L belongs to a super close area and the operation flow moves to step #6.

The floating amount N1 is computed at step #6 and the first and second frames motor are driven at step #7 according to Ni only.

Similarly, the floating amount N2 is calculated at step #8 and the first and second frames motor are driven at step #9 according to N2 only. As a result, the third lens group 13 is driven to move and the floating control is performed.

After the floating control, a computing operation on a drive position of the focus lens is performed at step #10, the focus lens (the fourth lens group 14) is driven quickly to the focusing position by the focus driving system 508 at step #11.

Whether the shutter button 102 is full-pressed or not is determined by the full-pressed detecting section 603 at step #12.

If the shutter button 102 is half-pressed, the operation flow returns to step #2, otherwise the operation flow moves to step #14.

When the shutter button 102 is determined to be full pressed at step #14, the photographing is performed at step #15 and the operation flow returns to step #2 afterwards.

Although the floating control is performed by dividing the distance to the subject into 3 parts in the present embodiment, it is also preferable to divide the distance to the subject into more than 3 parts.

Meanwhile, if the distance to the subject is divided into too many parts, time needed to compute the floating amount will be increased, thus it is preferable to divide it into appropriate numbers.

Embodiment 2

Figure 34:
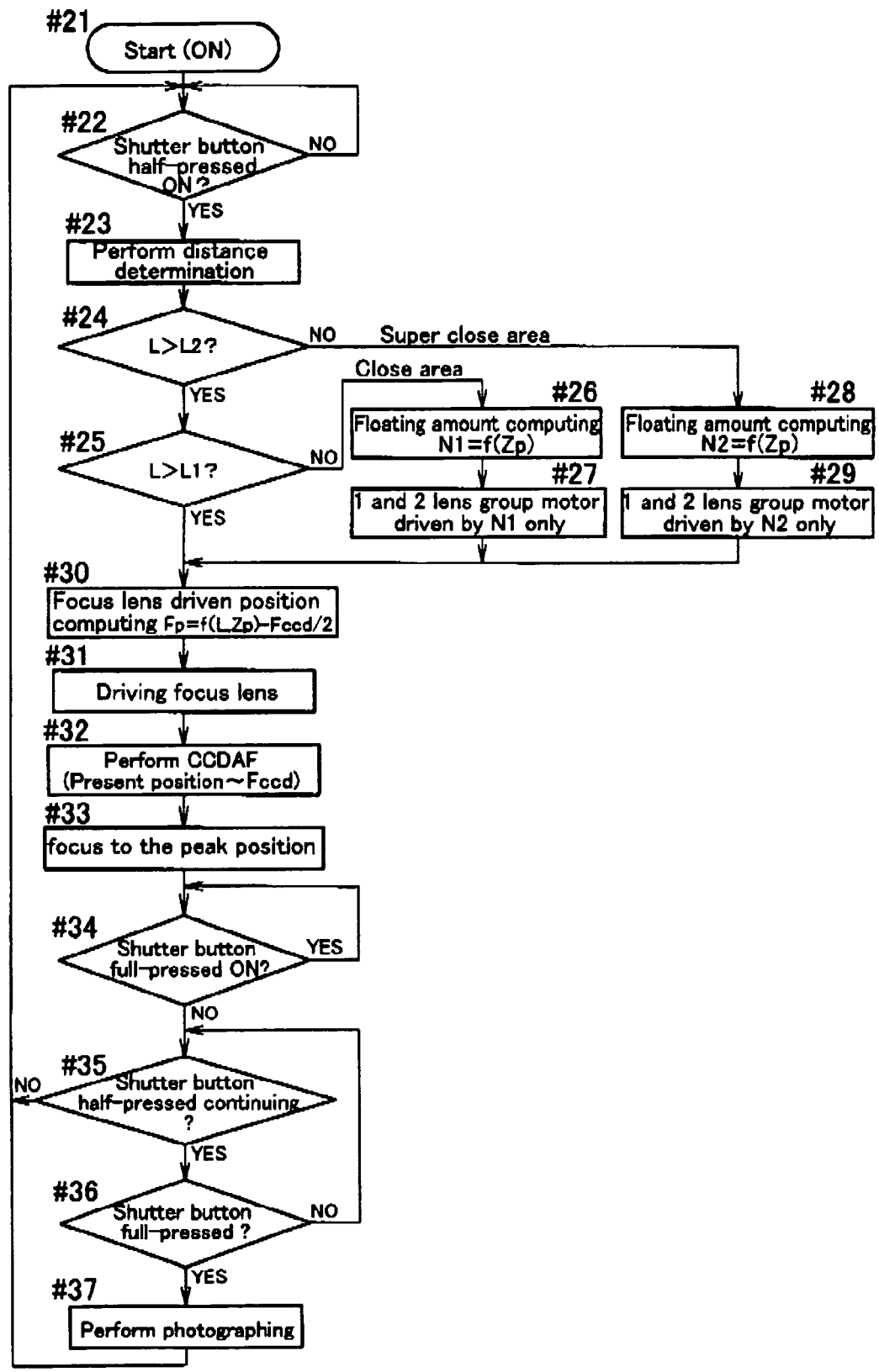
FIG. 34 is a view showing the operation flow of the digital camera according to the embodiment 2.

FIG. 34 is a view showing an operation flow of the digital camera 600 according to the embodiment 2.

In the present embodiment, the distance to the subject is determined by the distance sensor 605 and the floating control is performed according to the determination result, and after that CCDAF (CCD auto focus) is performed based on image information inputted from CCD 16, that is, HBAF (hybrid auto focus) is performed.

As shown in FIG. 34, step #21 to step #29 are the same as step #1 to step #9 in the embodiment 1. CCDAF is set from a start position to a target position based on results from a computing operation on a drive position of the focus lens at step #30.

The fourth lens group 14 is driven to focus on the CCDAF start position at step #31. Further, CCDAF is performed at step #32 and moved to focus on a peak position at step #33. Step #34 to step #37 are the same as step #12 to step #15 in the embodiment 1.

In the present embodiment, after a rough position adjustment (the floating control) is performed with respect to the third lens group 13 at step #23 to step #29, it is possible to perform a fine position adjustment (CCD auto focus control) to the fourth lens group 14 at step #30 to step #33.

Also in the present embodiment, the distance to the subject is not limited to 3 parts, it could be more.

Embodiment 3

Figure 35:
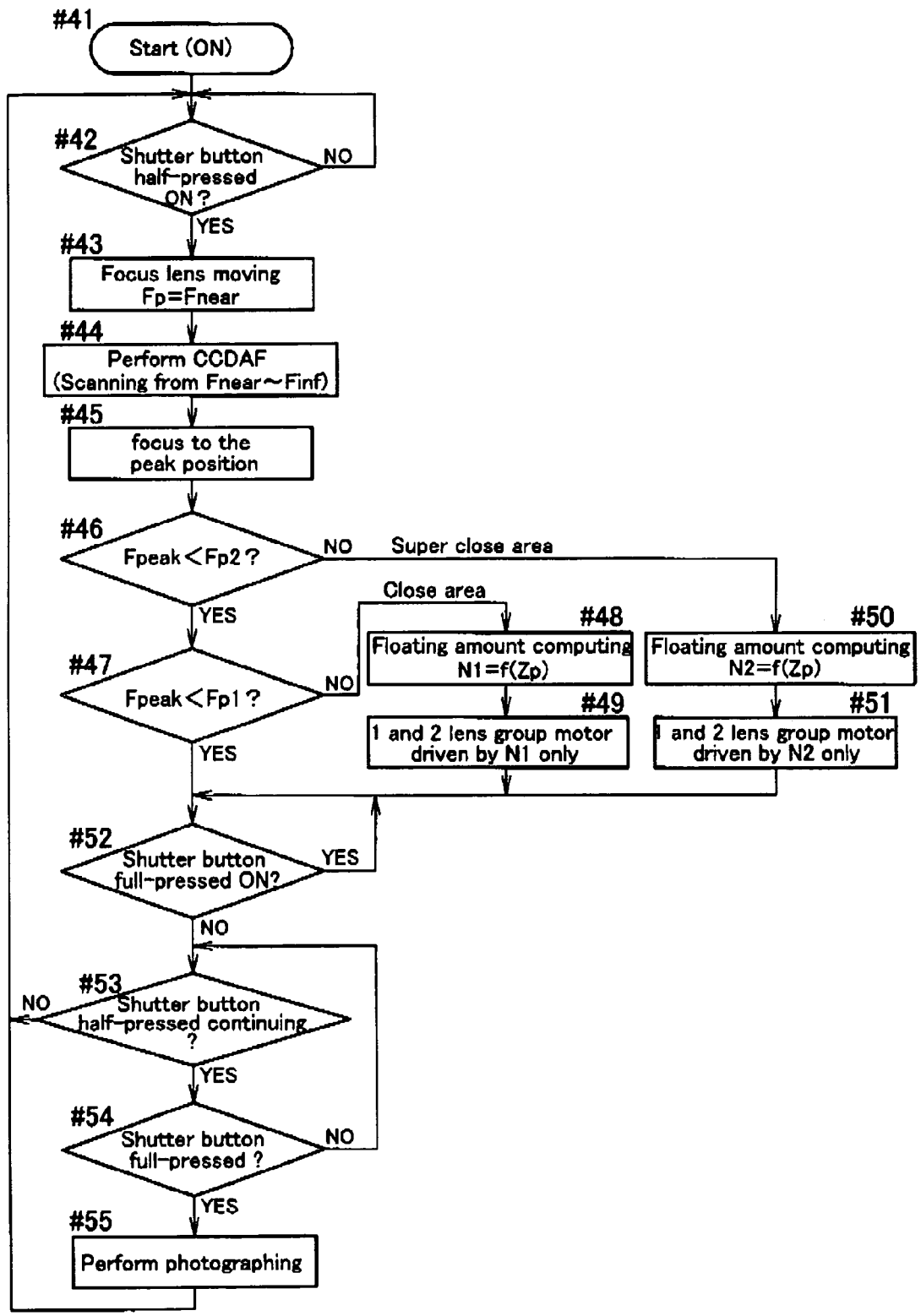
FIG. 35 is a view showing the operation flow of the digital camera according to the embodiment 3.

FIG. 35 is a view showing an operation flow of the digital camera 600 according to the embodiment 3.

Figure 30:
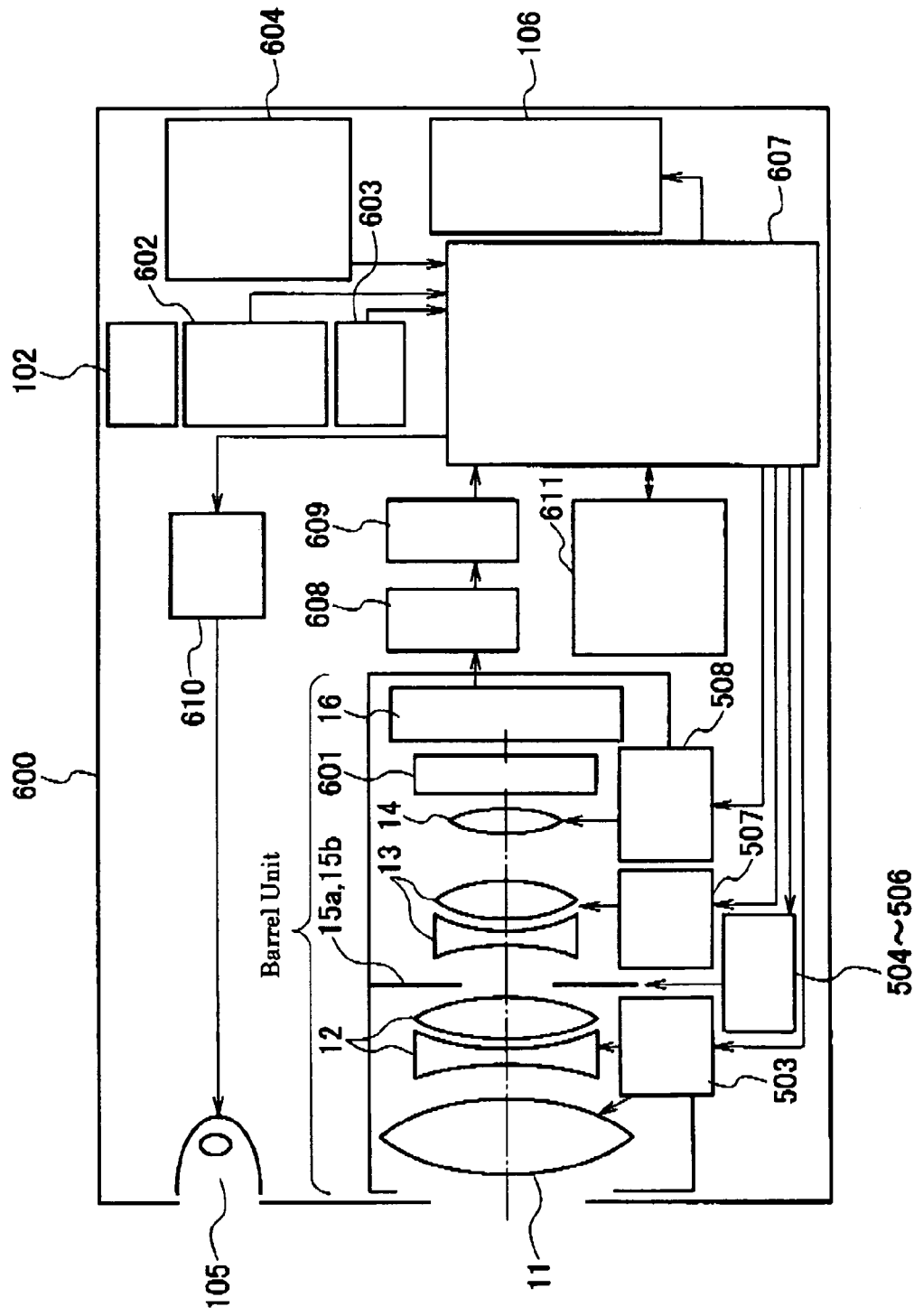
FIG. 30 is a view showing an internal configuration of a digital camera in other example.

As shown in FIG. 30, the digital camera 600 according to the present embodiment is not provided with a distance sensor or a distance sensor control section.

Thus in the present embodiment, the floating control is performed after CCDAF control.

As shown in FIG. 35, electrical power is ON at step #41, whether the shutter button 102 is on a half-pressed state or not is determined at step #42.

When the shutter button 102 is on the half-pressed state, the focus lens is driven to the CCDAF start position on step #43. Furthermore, CCDAF is performed at step #44 and the focus lens is driven to the peak position at step #45.

In order to divide the distance to the subject (focus position) into 3 parts, specific focus positions are predefined as $F_p1$ and $F_p2$ ($F_p1<F_p2$), respectively and a real focus position is set as $F_{peak}$.

Whether $F_{peak}<F_p2$ is determined at step #46, if it is Yes the operation flow moves to step #47, if it is No $F_{peak}$ belongs to a super close area and the operation flow moves to step #50.

In addition, Whether $F_{peak}<F_p1$ is determined at step #47, if it is Yes the operation flow moves to step #52, if it is No $F_{peak}$ belongs to a super close area and the operation flow moves to step #48.

The floating amount N1 is computed at step #48 and the first and second frames motor are driven at step #49 according to N1 only.

Similarly, the floating amount N2 is calculated at step #50 and the first and second frames motor are driven at step #51 according to N2 only.

As a result, the third lens group 13 is driven to move and the floating control is performed.

Step #52 to step #55 after the floating control are the same as step #12 to step #15 in the embodiment 1.

Although the floating control is performed by dividing the distance to the subject into 3 parts in the present embodiment, it is also preferable to divide the distance to the subject into more than 3 parts.

Meanwhile, if the distance to the subject is divided into too many parts, time needed to compute the floating amount will be increased, thus it is preferable to divide it into appropriate numbers.

Embodiment 4

Figure 36A:
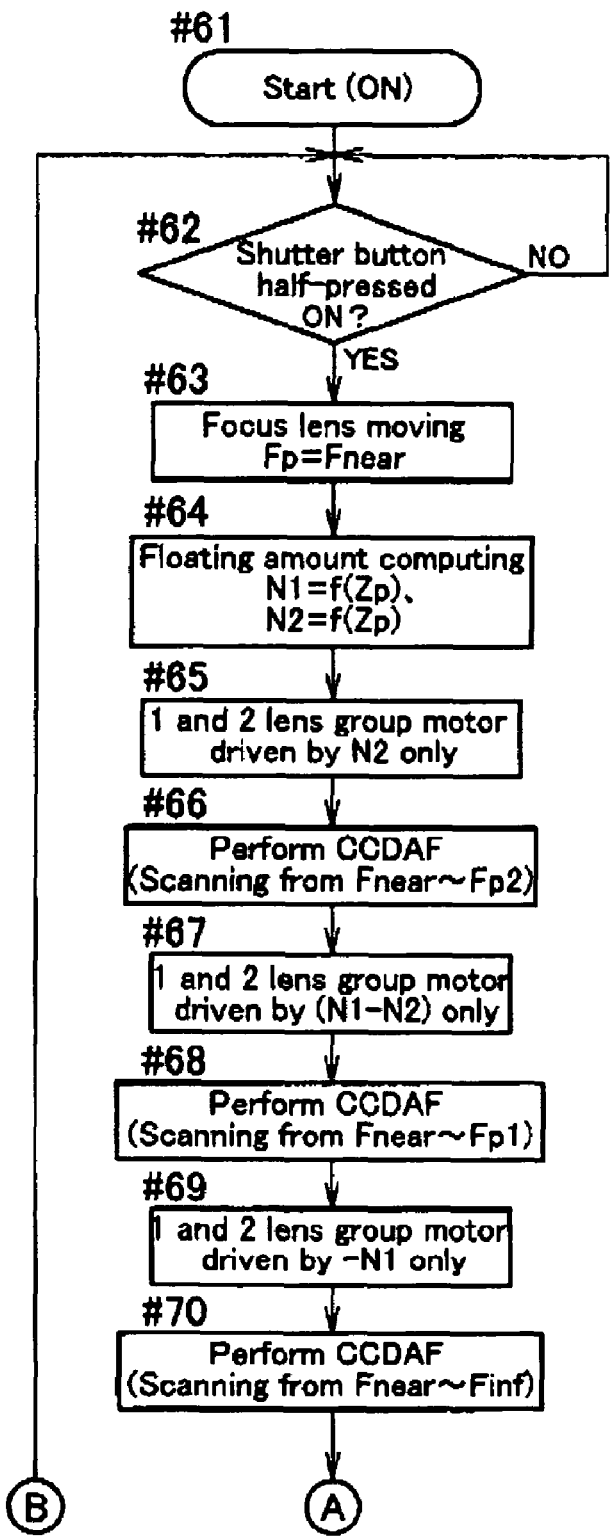
FIG. 36A is a view showing the operation flow of the digital camera according to the embodiment 4.
Figure 36B:
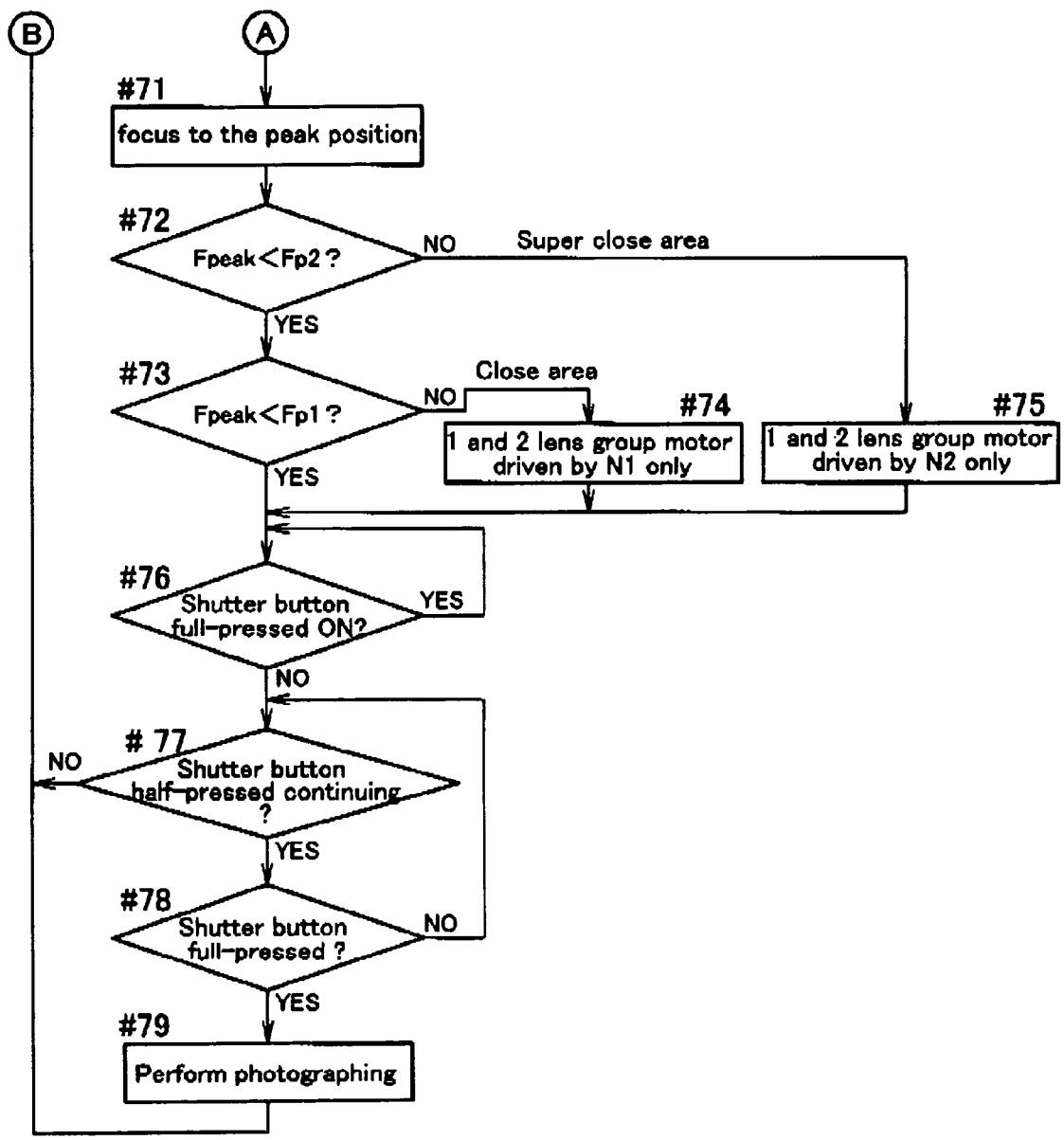
FIG. 36B is a view showing the successive operation flow in FIG. 36A.

An operation flow of the digital camera 600 according to the embodiment 4 is shown in FIG. 36A and FIG. 36B respectively.

Similar to that in the embodiment 3, the digital camera 600 according to the present embodiment is not provided with a distance sensor or a distance sensor control section.

Thus in the present embodiment, the floating control is performed during CCDAF scanning.

As shown in FIG. 36A and FIG. 36B, electrical power is ON at step #61, whether the shutter button 102 is on a half-pressed state or not is determined at step #62.

When the shutter button 102 is on the half-pressed state, the focus lens is driven to the CCDAF start position on step #63.

Then the floating amount N1, N2 are computed at step #64 and the first and second frames motor are driven at step #65 according to N2 only.

As a result, the floating control for the super close area is performed. Then, CCDAF is performed to scan the super close area at step #66.

The first and second frames motor is driven at step #67 by (N1−N2). As a result, the floating control for the super close area is performed. Then, CCDAF is performed to scan the super close area at step #68.

The first and second frames motor is driven at step #69 by −N1. As a result, it is possible for the first lens group 11 and the second lens group 12 to return to a position for normal distance area (no floating).

Continuously CCDAF is performed to scan the normal distance area at step #70 and the focus lens is moved to the peak position at step #71.

In order to divide the distance to the subject (focus position) into 3 parts, specific focus positions are predefined as $F_p1$ and $F_p2$ ($F_p1<F_p2$), respectively and a real focus position is set as $F_{peak}$.

Whether $F_{peak}<F_p2$ is determined at step #72, if it is Yes the operation flow moves to step #73, if it is No $F_{peak}$ belongs to the super close area and the operation flow moves to step #75.

In addition, Whether $F_{peak}<F_p1$ is determined at step #73, if it is Yes the operation flow moves to step #76, if it is No $F_{peak}$ belongs to the super close area and the operation flow moves to step #74.

The first and second frames motor is driven at step #69 by N1 at step #74 and by N2 at step #75, respectively.

Step #76 to step #79 performed after the floating control is the same as step #12 to step #15 in the embodiment 1.

Although the distance to the subject is divided into 3 parts in the present embodiment, it is also preferable to divide the distance to the subject into more than 3 parts.

In addition, it is possible for the digital camera according to the above mentioned embodiments to be applied to a mobile information terminal apparatus.

Although the preferred embodiments have been mentioned, the present invention is not limited to the embodiments, various modifications and changes can be made to these embodiments.

What is claimed is:

1. A digital camera comprising:
   a first lens group disposed on an optical axis and configured to be related to operations concerned with changing overall relative magnification;
   a second lens group disposed on the optical axis and configured to be related to operations concerned with changing overall relative magnification and being retracted from the optical axis when a lens barrel is at a collapsed position;
   a first driving device configured to drive the first lens group;
   a second driving device configured to drive the second lens group;
   a photographing device disposed on the optical axis and configured to photograph a subject;
   a distance determining device configured to determine a distance to the subject; and
   a floating control device configured to control the first and second lens groups which are concerned with changing overall relative magnification,
   wherein the floating control device is configured to drive at least one of the first driving device and the second driving device based on distance information obtained from the distance determining device to execute a zoom operation of the first lens group and the second lens group in a manner to maintain an image quality balance between a central and a surrounding part of the image of the subject or in a manner to maintain an image quality balance between a radial direction and a concentric direction of the image of the subject.

2. A digital camera comprising:

a first lens group disposed on an optical axis and configured to be related to operations concerned with changing overall relative magnification;

a second lens group disposed on the optical axis and configured to be related to operations concerned with changing overall relative magnification and being retracted from the optical axis when a lens barrel is at a collapsed position;

a third lens group disposed on an optical axis and configured to be on a image side of the second lens group;

a first driving device configured to drive the first lens group;

a second driving device configured to drive the second lens group;

a photographing device disposed on the optical axis and configured to photograph subject;

a third driving device configured to drive at least one of the third lens group and the photographing device in a direction of the optical axis;

a distance determining device configured to determine a distance to the subject;

a floating control device configured to control the first and second lens groups which are concerned with changing overall relative magnification; and a CCD auto-focus control device to detect a focus position by causing the third driving device to move continuously or intermittently based on image information obtained from the photographing device, wherein the floating control device is configured to drive at least one of the first driving device and the second driving device based on information obtained from the distance determining device to execute a zoom operation of the first lens group and the second lens group in a manner to maintain an image quality balance between a central and a surrounding part of the image of the subject or in a manner to maintain an image quality balance between a radial direction and a concentric direction of the image of the subject; and wherein the CCD auto-focus control device detects the focus position after the zoom operation of the first lens group and the second lens group executed by the floating control device.

3. A digital camera comprising:

a first lens group disposed on an optical axis and configured to be related to operations concerned with changing overall relative magnification, a second lens group disposed on the optical axis and configured to be related to operations concerned with changing overall relative magnification and being retracted from the optical axis when a lens barrel is at a collapsed position, a third lens group disposed on an optical axis and configured to be on an image side of the second lens group, a first driving device configured to drive the first lens group, a second driving device configured to drive the second lens group, a photographing device configured to photograph a subject at the optical axis a third driving device configured to drive at least one of the third lens group and the photographing device in a direction of the optical axis, a floating control device configured to control the first and second lens groups which are concerned with changing overall relative magnification, and a CCD auto-focus control device to sense a focus position by making the third driving device move continuously or intermittently based on image information obtained from the photographing device, wherein the floating control device is configured to drive at least one of the first driving device and the second driving device to execute a zoom operation of the first lens group and the second lens group based on an absolute position information of the third driving device determined by the CCD auto-focus control device in a manner to maintain an image quality balance between a central and a surrounding part of the image of the subject or in a manner to maintain an image quality balance between a radial direction and a concentric direction of the image of the subject.

4. A digital camera comprising:

a first lens group disposed on an optical axis and configured to be related to operations concerned with changing overall relative magnification, a second lens group disposed on the optical axis and configured to be related to operations concerned with changing overall relative magnification and being retracted from the optical axis when a lens barrel is at a collapsed position, a third lens group disposed on an optical axis and configured to be on an image side of the second lens group, a first driving device configured to drive the first lens group, a second driving device configured to drive the second lens group, a photographing device disposed on the optical axis and configured to photograph a subject, a third driving device configured to drive at least one of the third lens group and the photographing device in a direction of the optical axis, a floating control device configured to control the first and second lens groups which are concerned with changing overall relative magnification, and a CCD auto-focus control device to sense a focus position by making the third driving device move continuously or intermittently based on image information obtained from the photographing device, wherein the floating control device is configured to drive at least one of the first driving device and the second driving device to execute a zoom operation of the first lens group and the second lens group based on an absolute position information of the third driving device during a scanning operation of the CCD auto-focus control device operated by the CCD auto-focus control device in a manner to maintain an image quality balance between a central and a surrounding part of the image of the subject or in a manner to maintain an image quality balance between a radial direction and a concentric direction of the image of the subject.

5. The digital camera set forth in claim 1, further comprising a mode setting device configured to set a specific mode to change an interval between the first lens group and the second lens group to execute the zoom operation.

6. The digital camera set forth in claim 2,
further comprising a mode setting device configured to set a specific mode to change an interval between the first lens group and the second lens group to execute the zoom operation.

7. The digital camera set forth in claim 3,
further comprising a mode setting device configured to set a specific mode to change an interval between the first lens group and the second lens group to execute the zoom operation.

8. The digital camera set forth in claim 4,
further comprising a mode setting device configured to set a specific mode to change an interval between the first lens group and the second lens group to execute the zoom operation.

9. A digital camera comprising:
a first lens group disposed on an optical axis and configured to be related to operations concerned with changing overall relative magnification;
a second lens group disposed on the optical axis and configured to be related to operations concerned with changing overall relative magnification and being retracted from the optical axis when a lens barrel is at a collapsed position;
a first driving device configured to drive the first lens group;
a second driving device configured to drive the second lens group;
a photographing device disposed on the optical axis and configured to photograph a subject;
a distance determining device configured to determine a distance to the subject;
a floating control device configured to control the first and second lens group which are concerned with changing overall magnification; and
a mode setting device configured to set a specific mode to change an interval between the first lens group and the second lens group when a zoom operation of the first and second lens groups is executed,
wherein the floating control device is configured to drive at least one of the first driving device and the second driving device based on distance information obtained from the distance determining device to execute the zoom operation of the first lens group and the second lens group in a manner to maintain an image quality balance between a central and a surrounding part of the image of the subject or in a manner to maintain an image quality balance between a radial direction and concentric direction of the image of the subject,
wherein the specific mode is a high image quality mode.

10. The digital camera set forth in claim 5, wherein the specific mode is a close-up mode.

11. The digital camera set forth in claim 1, wherein an interval between the first lens group and the second lens group varies along with a zoom position.

12. A digital camera comprising:
a first lens group disposed on an optical axis and configured to be related to operations concerned with changing overall relative magnification;
a second lens group disposed on the optical axis and configured to be related to operations concerned with changing overall relative magnification and being retracted from the optical axis when a lens barrel is at a collapsed position;
a first driving device configured to drive the first lens group;
a second driving device configured to drive the second lens group;
a photographing device disposed on the optical axis and configured to photograph a subject;
a distance determining device configured to determine a distance to the subject; and
a floating control device configured to control the first and second lens group which are concerned with changing overall relative magnification,
wherein the floating control device is configured to drive at least one of the first driving device and the second driving device based on distance information obtained from the distance determining device to execute a zoom operation of the first lens group and the second lens group in a manner to maintain an image quality balance between a central and a surrounding part of the image of the subject or in a manner to maintain an image quality balance between a radial direction and a concentric direction of the image of the subject,
wherein the zoom operation of the first lens group and the second lens group is executed along with an aperture stop value.

13. A mobile information terminal apparatus comprising the digital camera set forth in claim 1.

14. A digital camera comprising:
a first lens group disposed on an optical axis and configured to be related to operations concerned with changing magnifications;
a second lens group disposed on the optical axis and configured to be related to operations concerned with changing magnification and being retracted from the optical axis when a lens barrel is at a collapsed position;
a third lens group disposed on the optical axis;
a first driving device configured to drive the first lens group;
a second driving device configured to drive the second lens group;
a photographing device disposed on the optical axis and configured to photograph a subject;
a distance determining device configured to determine a distance to the subject; and
a floating control device configured to drive at least one of the first driving device and the second driving device based on distance information obtained from the distance determining device to change an interval between the first lens group and the second lens group,
wherein the third lens group is a focus lens,
wherein the second lens group is configured to be capable of moving along the optical axis and to constitute a zoom lens,
wherein the second driving device drives the second lens group along the optical axis independently of the first driving device, and
wherein the floating control device is configured to change the interval between the first lens group and the second lens group while maintaining a focal length of the photographing device constantly.

* * * * *